United States Patent
Schnapp et al.

(10) Patent No.: US 9,588,892 B2
(45) Date of Patent: Mar. 7, 2017

(54) DATA ACCESS METHOD IN A STORAGE ARCHITECTURE

(71) Applicant: Infortrend Technology, Inc., New Taipei (TW)

(72) Inventors: Michael Gordon Schnapp, New Taipei (TW); Ching-Hua Fang, Taipei (TW)

(73) Assignee: INFORTREND TECHNOLOGY, INC., New Taipei (TW)

( * ) Notice: Subject to any disclaimer, the term of this patent is extended or adjusted under 35 U.S.C. 154(b) by 0 days.

(21) Appl. No.: 14/074,734

(22) Filed: Nov. 8, 2013

(65) Prior Publication Data

US 2014/0068200 A1 Mar. 6, 2014

Related U.S. Application Data

(62) Division of application No. 12/691,752, filed on Jan. 22, 2010, now Pat. No. 8,612,679.

(60) Provisional application No. 61/146,659, filed on Jan. 23, 2009, provisional application No. 61/185,578, filed on Jun. 9, 2009.

(51) Int. Cl.
*G06F 12/08* (2016.01)
*G06F 3/06* (2006.01)

(52) U.S. Cl.
CPC ........ *G06F 12/0808* (2013.01); *G06F 3/0605* (2013.01); *G06F 3/0631* (2013.01); *G06F 3/0665* (2013.01); *G06F 3/0689* (2013.01)

(58) Field of Classification Search
CPC .... G06F 3/0689; G06F 3/0665; G06F 3/0605; G06F 3/0631; G06F 12/0808

USPC .................................................. 71/114, 144
See application file for complete search history.

(56) References Cited

U.S. PATENT DOCUMENTS

| | | | | |
|---|---|---|---|---|
| 7,243,196 | B2 * | 7/2007 | Uratani et al. | ................. 711/161 |
| 8,229,985 | B2 * | 7/2012 | Turner | .............. G06F 17/30067 |
| | | | | 707/791 |
| 2008/0086616 | A1 | 4/2008 | Asano et al. | |

FOREIGN PATENT DOCUMENTS

| | | |
|---|---|---|
| CN | 1725169 A | 1/2006 |
| CN | 1849577 A | 10/2006 |

\* cited by examiner

*Primary Examiner* — Jasmine Song
(74) *Attorney, Agent, or Firm* — CKC & Partners Co., Ltd.

(57) ABSTRACT

A method for generating a virtual volume (VV) in a storage system architecture. The architecture comprises a host and one or more disk array subsystems. Each subsystem comprises a storage controller. One or more of the subsystems comprises a physical storage device (PSD) array. The method comprises the following steps: mapping the PSD array into a plurality of media extents (MEs), each of the MEs comprises a plurality of sections; providing a virtual pool (VP) to implement a section cross-referencing function, wherein a section index (SI) of each of the sections contained in the VP is defined by the VP to cross-reference VP sections to physical ME locations; providing a conversion method or procedure or function for mapping VP capacity into to a VV; and presenting the VV to the host. A storage subsystem and a storage system architecture performing the method are also provided.

19 Claims, 31 Drawing Sheets

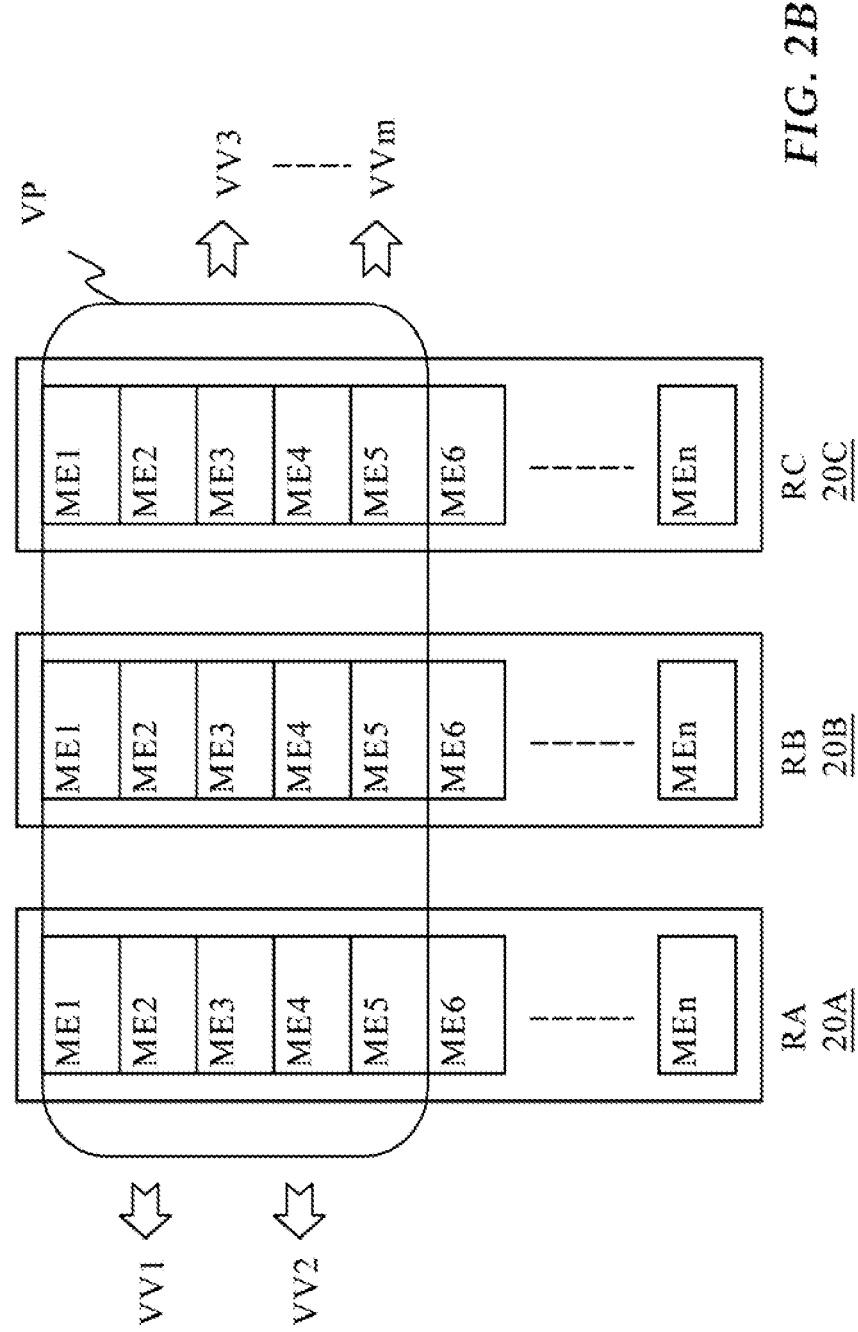

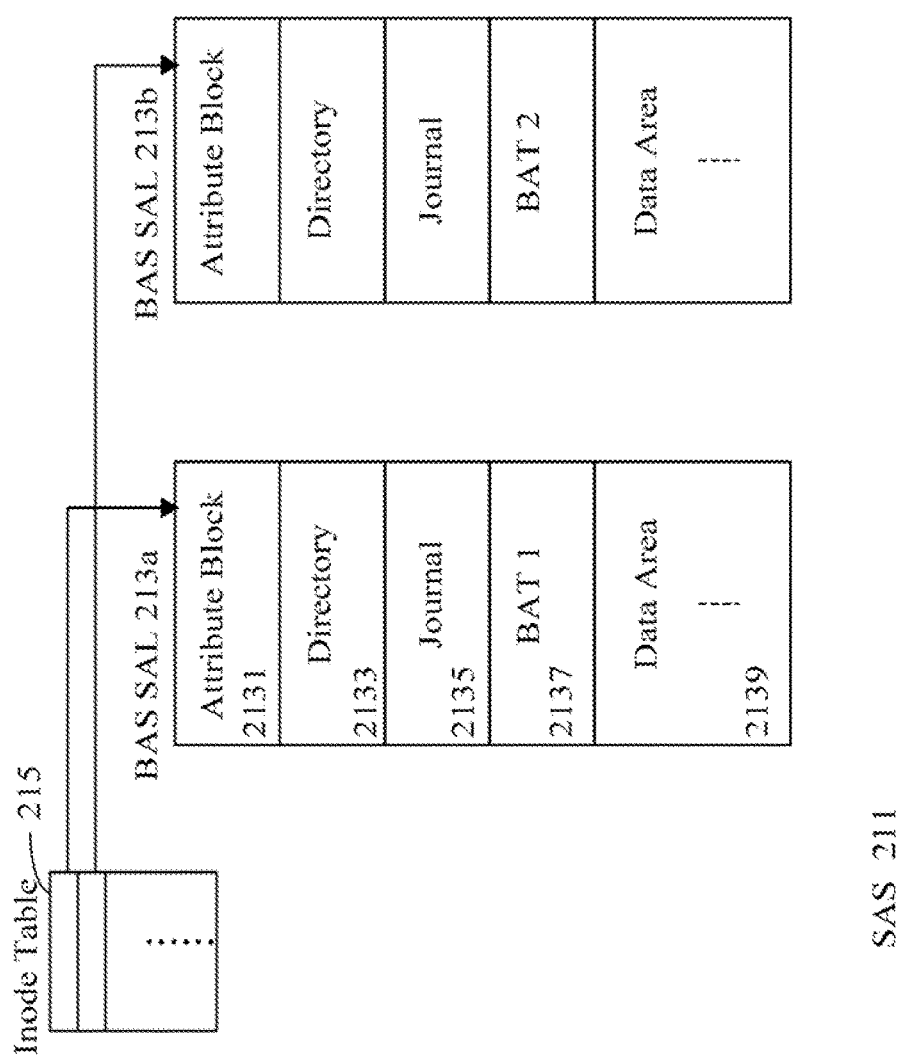

| PSI 81 | ME ID 82 | Start Add (LBA) 83 | Sector Count 84 |
|---|---|---|---|
| 001 | RA-ME1 | 00001 | 100 |
| 002 | RA-ME1 | 00101 | 100 |
| ⋮ | ⋮ | ⋮ | ⋮ |
| 100 | RA-ME1 | 09901 | 100 |
| 101 | RB-ME1 | 00001 | 100 |
| ⋮ | ⋮ | ⋮ | ⋮ |
| 200 | RB-ME1 | 09901 | 100 |
| 201 | RC-ME1 | 00001 | 100 |
| ⋮ | ⋮ | ⋮ | ⋮ |
| 299 | RC-ME1 | 09801 | 100 |
| 300 | RC-ME1 | 09901 | 100 |

BAT1 (VV1) ← 2137

| VBI 41 | Location Index 42 | BAB 43 |
|---|---|---|
| 001 | 001 | 1 |
| 002 | 002 | 1 |
| 003 | 101 | 1 |
| 004 | 201 | 1 |
| 005 | 0 | 0 |
| 006 | 0 | 0 |
| 007 | 299 | 1 |

FIG. 4B

BAT1 (VV1)

| VBI 41 | Location Index 42 | BAB 43 |
|---|---|---|
| 001 | 001 | 1 |
| 002 | 002 | 1 |
| 003 | 101 | 1 |
| 004 | 201 | 1 |
| 005 | 0 | 0 |
| 006 | 0 | 0 |
| 007 | 299 | 1 |
| 008 | 0 | 0 |
| 009 | 0 | 0 |
| 010 | 0 | 0 |

BAT1 (VV1)

| VBI 41 | Location Index 42 | BAB 43 |
|---|---|---|
| 001 | 001 | 1 |
| 002 | 101 | 1 |
| 003 | 201 | 1 |
| 004 | 002 | 1 |
| 005 | 102 | 1 |

FIG. 4D

BAT1 (VV1)

| VBI 41 | Location Index 42 | BAB 43 |
|---|---|---|
| 001 | 001 | 1 |
| 002 | 101 | 0 |
| 003 |  | 0 |
| 004 |  | 0 |
| 005 |  | 0 |

FIG. 4C

| V2P table 5135 | |
|---|---|
| Virtual Index 61 | Physical Index 63 |
| 001 | 002 |
| 002 | 001 |
| 003 | |
| 004 | |
| 005 | 006 |
| 006 | 007 |
| 007 | |
| 008 | |
| 009 | 009 |
| 010 | |

FIG. 7A

| V2P table 5135 | |
|---|---|
| Virtual Index 61 | Physical Index 63 |
| 1 | 002 |
| 2 | 001 |
| 3 | |
| 4 | |
| 5 | 006 |
| 6 | 007 |
| 7 | |
| 8 | |
| 9 | 009 |
| 10 | |

FIG. 7B

DATA ACCESS METHOD IN A STORAGE ARCHITECTURE

CROSS REFERENCE TO RELATED APPLICATION(S)

This application is a Divisional of U.S. patent application Ser. No. 12/691,752, filed on Jan. 22, 2010, which claims the benefit of provisional Application No. 61/185,578, filed on Jun. 9, 2009 and provisional Application No. 61/146,659, filed on Jan. 23, 2009, the entirety of which are incorporated by reference herein.

BACKGROUND OF THE INVENTION

Field of the Invention

The present invention relates to a method for performing storage virtualization; and more particularly, relates to a method for performing storage virtualization which may flexibly expand the storage capacity.

Descriptions of the Related Art

In the conventional technologies, the logical drives (LDs)/partitions mapped from a RAID subsystem is presented as physical volumes (PVs) on the host channel for the host to access. The host uses the LBA of the LDs/partitions to access the PVs. Therefore, once the RAID subsystem presents the PVs to the host, it is difficult to change the configuration of the PVs and the associated LDs/partitions. Particularly, it is impossible to reduce the capacity of a PV and the associated LD/partition. Such architecture is subject to some restrictions on the flexibility of the utilization of the RAID subsystem, so the utilization of the storage space of the subsystem is greatly restricted.

For example, assume that a RAID subsystem has a capacity of 800 GB and was originally configured into two 400 GB logical drives, LD1 and LD2, and presented as PV1 and PV2 to the hosts for data access. After a while, it is found that only 100 GB is needed for the utilization of PV1, while the space required for the utilization of PV2 has been consistently increasing and the 400 GB capacity would be insufficient finally. In the conventional technologies, because the configuration of PV1 is unchangeable, only 100 GB capacity thereof will be used while the other 300 GB capacity will be left idle and can not be used. On the contrary, because there is no enough space in PV2, it is necessary to buy some more storage device. It is a waste of resource.

In addition, under some of the conventional data storage system architectures, either data can not be migrated between disk array subsystems or the system performance of data migration therebetween is quite low, which has a negative influence on the utilization flexibility of the resources of and/or the system performance of the data storage system.

Moreover, under some of the conventional data storage system architectures, although data can not be migrated between the disk array subsystems, the disk array subsystems lack RAID function protection, which is not acceptable to the modern information age having high-level data availability demand.

Furthermore, under some conventional data storage system architectures, IO access commands must all be issued through a master storage node in order to be properly executed, even when the data itself which is associated with the IO access commands is not situated in a physical storage device belonging to the node. Under conditions of heavy IO loading, the performance of the system may end up being determined solely by the IO processing power of the master storage node.

Therefore, how to increase the flexibility of utilization of a storage subsystem so as to avoid waste of resources is a big issue in the storage industry.

SUMMARY OF THE INVENTION

In accordance with the above reasons, the objective of the present invention is to provide a storage virtualization subsystem, storage system architecture, and method thereof to solve the aforesaid problems of the conventional technologies and to improve the elasticity of usage for RAID subsystem.

Another objective of the present invention is to provide a storage virtualization subsystem, storage system architecture, and method thereof to avoid resource-wasting problem.

According to one embodiment of the present invention, a method for generating a virtual volume in a storage system architecture is provided. The storage system architecture comprises a host and at least one disk array subsystem, which includes a disk array controller and a physical storage device array. The method comprises the steps of: mapping the physical storage device array into one or more media extents; providing a virtualization module in one of the at least one disk array subsystem so that said one disk array subsystem becomes a master disk array subsystem; selecting, by the virtualization module, at least one of the one or more media extents to form a virtual pool, according to a section allocation mechanism; forming, by the virtualization module, at least one virtual volume and managing the at least one virtual volume, according to the section allocation mechanism; and, presenting, by the virtualization module, the at least one virtual volume to the host.

According to one embodiment of the present invention, the step of mapping the physical storage device array into the one or more media extents further comprises the step of: providing a validity check module in each of the at least one disk array subsystem, for checking the validity of an IO access command from the host to determine the correctness of an address of the IO access command.

According to one embodiment of the present invention, the step of mapping the physical storage device array into the one or more media extents further comprises the steps of: mapping the physical storage device array into one or more physical volumes with redundant array of independent disks (RAID) protection mechanism; and, mapping each of the one or more physical volumes into one or more media extents.

According to one embodiment of the present invention, the step of forming the at least one virtual volume and managing the at least one virtual volume further comprises the steps of: setting a virtual capacity as a storage capacity of the at least one virtual volume, wherein a sum of the virtual capacity of all the at least one virtual volume is larger than or equal to a sum of the storage capacity of the physical storage device array; and, assigning a storage space of the physical storage device array to the at least one virtual volume when the virtualization module receives the IO access command and needs unassigned storage space of the virtual volume.

According to one embodiment of the present invention, the step of forming the at least one virtual volume and managing the at least one virtual volume further comprises the steps of: setting a reserved capacity as a reserved storage capacity of the at least one virtual volume; allocating a storage space of the physical storage device array as the reserved storage space of the at least one virtual volume, wherein a size of the allocated storage space of the physical storage device array is equal to the reserved storage capacity of the at least one virtual volume; and, assigning the reserved storage space of the physical storage device array to the virtual volume when the virtualization module receives the IO access command and needs unassigned storage space of the at least one virtual volume.

According to one embodiment of the present invention, the step of forming the at least one virtual volume and managing the at least one virtual volume comprises: setting an actual capacity as a storage capacity of the at least one virtual volume; and, assigning a storage space of the physical storage device array as an actual storage space of the at least one virtual volume, wherein a size of the assigned storage space of the physical storage device array is equal to a storage space of the actual capacity.

According to one embodiment of the present invention, a method for generating a virtual volume in a storage system architecture is provided. The method further comprises the step of: generating, by the virtualization module, an event notification to the disk array controller when a used storage capacity of the at least one virtual volume reaches a threshold value.

According to one embodiment of the present invention, a method for generating a virtual volume in a storage system architecture is provided. The method further comprises the step of: generating, by the virtualization module, an event notification to the disk array controller when the sum of the used capacity of the virtual pool reaches a threshold value.

According to one embodiment of the present invention, a method for generating a virtual volume in a storage system architecture is provided. The method further comprises the step of: checking the validity of the IO access command from the host according to a validity check sequence number.

According to one embodiment of the present invention, the step of checking the validity of the IO access command further comprises the step of: accessing the physical storage device array according to the IO access command when the IO access command is valid.

According to one embodiment of the present invention, the step of checking the validity of the IO access command further comprises the step of: sending an error indication to the host when the IO access command is not valid.

According to one embodiment of the present invention, the step of checking the validity of the IO access command further comprises the step of: sending, by the host, a data location query command to the virtualization module to obtain a new validity check sequence number when the host receives the error indication.

According to one embodiment of the present invention, the step of checking the validity of the IO access command further comprises the steps of: storing, by the validity check module in the disk array subsystem, one or more validity check sequence numbers for each of the one or more media extends belonging to the disk array subsystem, in the virtualization module, wherein each of the one or more validity check sequence numbers corresponds to one or more physical sections; and, comparing a validity check sequence number in the IO access command with a latest validity check sequence number of the stored validity check sequence numbers for the media extent which is associated with the IO access command of the host.

According to one embodiment of the present invention, the step of comparing a validity check sequence number in the IO access command with a latest validity check sequence number of the stored validity check sequence numbers for the media extent which is associated with the IO access command of the host further comprises the steps of: determining the IO access command is not valid when the latest validity check sequence number is less than the validity check sequence number in the IO access command.

According to one embodiment of the present invention, the step of comparing a validity check sequence number in the IO access command with a latest validity check sequence number of the stored validity check sequence numbers for the media extent which is associated with the IO access command of the host further comprises the steps of: retrieving a data access address of the IO access command when the validity check sequence number in the IO access command is greater than or equal to the latest validity check sequence number; retrieving an first validity check sequence number according to the data access address of the access command; and, comparing the first validity check sequence number with the validity check sequence number in the IO access command.

According to one embodiment of the present invention, the step of comparing the first validity check sequence number with the validity check sequence number in the IO access command further comprises the steps of: determining the IO access command is not valid when the validity check sequence number in the IO access command is less than the first validity check sequence number.

According to one embodiment of the present invention, the step of comparing the first validity check sequence number with the validity check sequence number in the IO access command further comprises the steps of determining the IO access command is valid when the validity check sequence number in the IO access command is greater than or equal to the first validity check sequence number.

According to one embodiment of the present invention, a method for generating a virtual volume in a storage system architecture is provided. The method further comprises the step of: sending a new validity check sequence number associated with a specific physical section location of the at least one virtual volume to all slave disk array subsystems; returning, by the master disk array subsystem, a special validity check sequence number to the host when the master disk array subsystem receives the data location query command from the host; and, sending, by the host, an IO access command associated with the specific physical section location to the master disk array subsystem according to the special validity check sequence number.

According to one embodiment of the present invention, a method for generating a virtual volume in a storage system architecture is provided. The method further comprises the step of: performing, by the master disk array subsystem, a data service procedure associated with the specific physical section location when the master disk array subsystem receives the 10 access command associated with the specific physical section location, wherein the data service procedure is a virtual volume snapshot procedure.

According to one embodiment of the present invention, a method for generating a virtual volume in a storage system architecture is provided. The method further comprises the step of: performing, by the master disk array subsystem, a re-synchronization procedure to synchronize the validity check sequence numbers of the at least one disk array subsystem when a validity check sequence number of the second disk array subsystem is inconsistent with the validity check sequence numbers of the master disk array subsystem.

According to one embodiment of the present invention, a method for generating a virtual volume in a storage system architecture is provided. The method further comprises the step of: performing, by the master disk array subsystem, a re-synchronization procedure to synchronize the validity check sequence numbers of the at least one disk array subsystem when one of a reset, a power-cycling, and a fail-over event occurs.

According to one embodiment of the present invention, the step of performing a re-synchronization procedure further comprises the steps of: sending, by the virtualization module, a command to the second disk array subsystem to clear the validity check sequence numbers of the second disk array subsystem; and, sending, by the virtualization module, a latest validity check sequence number to the second disk array subsystem.

According to one embodiment of the present invention, a method for generating a virtual volume in a storage system architecture is provided, and the storage system architecture comprises a host and a plurality of storage nodes. The method comprises the steps of: checking whether or not a data location information of an IO access command that is to be issued is in a cache memory of the host; sending, by the host, the IO access command to a target storage node of the storage nodes according to the data location information when the data location information is in the cache memory, wherein the IO access command comprises a first validity check information; checking, by the target storage node, the validity of the IO access command according to the first validity check information to determine the correctness of the address of the IO access command; and, executing, by the target storage node, the IO access command when the IO access command is valid.

According to one embodiment of the present invention, a method for generating a virtual volume in a storage system architecture is provided, and the storage system architecture comprises a host and a plurality of storage nodes. The method comprises the steps of: providing a validity check sequence number agent in the target storage node for checking the validity of the first validity check information of the IO access command.

According to one embodiment of the present invention, a method for generating a virtual volume in a storage system architecture is provided, and the storage system architecture comprises a host and a plurality of storage nodes. The method comprises the steps of: generating, by the host, a data location query command to a master storage node of the storage nodes when the data location information is not in the cache memory; returning, by the master storage node, the data location information to the host according to the data location query command, wherein the data location information comprises the first validity check information; updating, by the host, the data location information in the cache memory; and, sending, by the host, an IO access command to the target storage node of the storage nodes according to the data location information, wherein the IO access command comprises the first validity check information.

According to one embodiment of the present invention, a method for generating a virtual volume in a storage system architecture is provided, and the storage system architecture comprises a host and a plurality of storage nodes. The method comprises the step of: returning, by the target storage node, an error indication to the host when the IO access command is not valid.

According to one embodiment of the present invention, a method for generating a virtual volume in a storage system architecture is provided, and the storage system architecture comprises a host and a plurality of storage nodes. The method comprises the step of: generating a media-extent-identifier-to-storage-node cross-reference table by scanning the storage space of the storage nodes when the host is initialized; and, determining the target storage node according to a media extent ID and the media-extent-identifier-to-storage-node cross-reference table, wherein the data location information comprises the media extent ID.

According to one embodiment of the present invention, the step of checking the validity of the IO access command further comprises the step of: checking, by the target storage node, the consistency between the first validity check information of the IO access command and a second validity check information from the master storage node.

According to one embodiment of the present invention, the step of checking the validity of the IO access command further comprises the step of: returning an error indication to the host when the first validity check information is inconsistent with the second validity check information.

According to one embodiment of the present invention, the step of checking the validity of the IO access command further comprises the step of: checking, by the target storage node, a life of the first validity check information of the IO access command.

According to one embodiment of the present invention, a method for generating a virtual volume in a storage system architecture is provided, and the storage system architecture comprises a host and a plurality of storage nodes. The method comprises the step of: invalidating, by the host, all data location information or the data location information in the cache memory of the host when the life of the first validity check information exceeds a valid lifetime; generating, by the host, a data location query command to the master storage node of the storage nodes; and, returning, by the master storage node, the data location information to the host according to the data location query command, wherein the data location information comprises a first validity check information (VCI).

According to one embodiment of the present invention, a method for generating a virtual volume in a storage system architecture is provided, and the storage system architecture comprises a host and a plurality of storage nodes. The method comprises the step of: sending, by the host, a data location query command to a master storage node of the storage nodes; sending, by the master storage node, a data location information to the host when the master storage node receives the data location query command, wherein the data location information comprises a first validity check information (VCI): sending, by the host, an IO access command to a target storage node of the storage nodes according to the data location information, wherein the IO access command comprises a first validity check information; checking, by the target storage node, the validity of the IO access command according to the first validity check information to determine the correctness of an address of the IO access command; and, executing, by the target storage node, the IO access command when the IO access command is valid.

According to one embodiment of the present invention, a method for generating a virtual volume in a storage system architecture is provided, and the storage system architecture comprises a host and a plurality of storage nodes. The method comprises the step of: providing a validity check sequence number agent in the target storage node for checking the validity of the first validity check information of the IO access command.

According to one embodiment of the present invention, a method for generating a virtual volume in a storage system architecture is provided, and the storage system architecture comprises a host and a plurality of storage nodes. The method comprises the step of: sending, by the target storage node, an error indication to the host when the IO access command is not valid.

According to one embodiment of the present invention, a method for generating a virtual volume in a storage system architecture is provided, and the storage system architecture comprises a host and a plurality of storage nodes. The method comprises the step of: generating a media-extent-identifier-to-storage-node cross-reference table by scanning a storage space of the storage nodes when the host is initialized.

According to one embodiment of the present invention, a method for generating a virtual volume in a storage system architecture is provided, and the storage system architecture comprises a host and a plurality of storage nodes. The method comprises the step of: determining the target storage node according to a media extent ID and the media-extent-identifier-to-storage-node cross-reference table, wherein the data location information comprises the media extent ID.

According to one embodiment of the present invention, a method for generating a virtual volume in a storage system architecture is provided, and the storage system architecture comprises a host and a plurality of storage nodes. The step of checking the validity of the IO access command further comprises: comparing, by the target storage node, the first validity check information of the IO access command with a second validity check information from the master storage node.

According to one embodiment of the present invention, the step of comparing the first validity check information with the second validity check information comprises the step of: determining the IO access command is valid when the first validity check information is consistent with the second validity check information.

According to one embodiment of the present invention, the step of comparing the first validity check information with the second validity check information comprises the step of: determining the IO access command is not valid when the first validity check information is inconsistent with the second validity check information.

BRIEF DESCRIPTION OF THE DRAWINGS

FIG. 2B is a diagram that depicts a relationship between the virtual pool, the media extents, and the virtual volumes in the storage system architecture 30 of FIG. 2A;

FIG. 2C is a diagram that depicts a data structure of a section allocation system (SAS) for a virtual pool according to an embodiment of the present invention;

FIG. 3D is a diagram illustrating a further embodiment of a data structure of a physical section included in the virtual pool according to FIG. 3A of the present invention;

FIG. 4A is a diagram that depicts the BAT 2137 according to an embodiment of the present invention;

FIG. 4B is a diagram that depicts BAT 2137 according to another embodiment of the present invention;

FIGS. 4C and 4D are diagrams that depict distributed data function of an embodiment of the present invention;

FIG. 7A is a diagram that depicts a V2P table 5135 of an embodiment of the present invention;

FIG. 7B is a diagram that depicts a V2P table 5135 of another embodiment of the present invention;

FIG. 5C is a diagram that depicts the mapping relationship between the VBI and its corresponding physical section LBA when only the P2V table exists but the V2P table does not exist;

DESCRIPTION OF THE PREFERRED EMBODIMENT

Figure 1A:
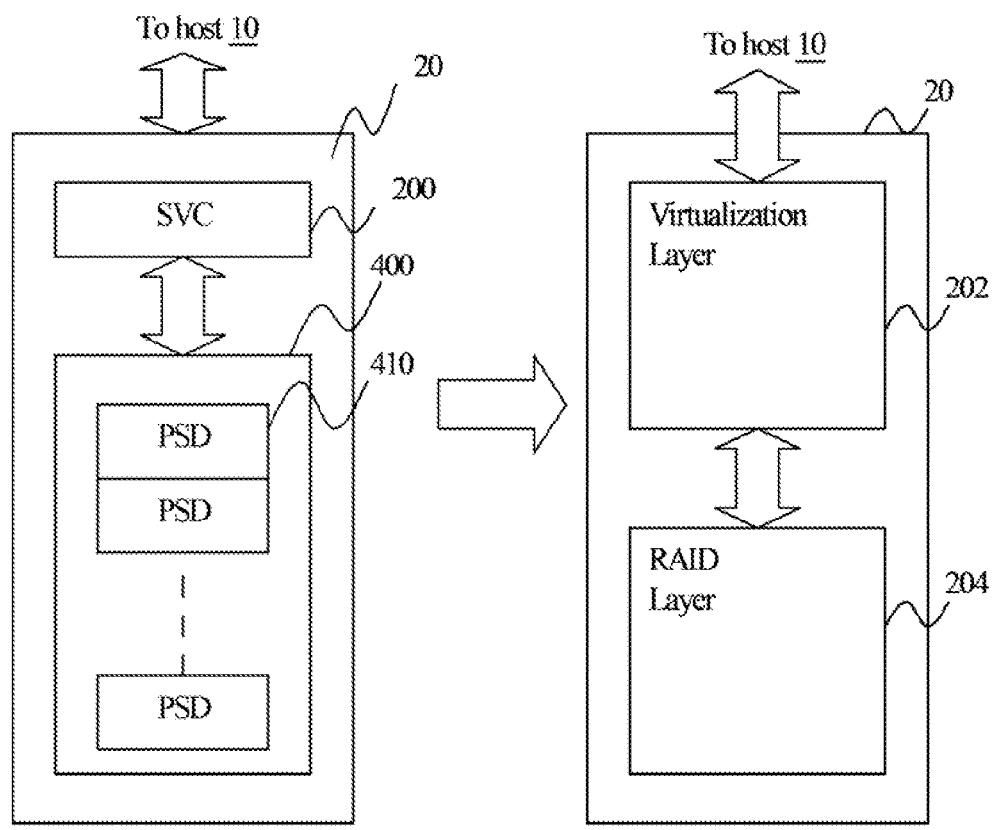
FIG. 1A is a data storage system architecture comprising a RAID subsystem in accordance with an embodiment of the present invention.

With reference to FIG. 1A, which is a data storage system architecture 1 (abbreviated storage system architecture) in accordance with an embodiment of the present invention. The storage system architecture 1 comprises a host 10 and a redundant array of independent disks subsystem 20 (abbreviated RAID subsystem) connected through a communication channel. The RAID subsystem 20 comprises a storage virtualization controller (SVC) 200 and a PSD array 400 having a plurality of physical storage devices 410 (PSD). The PSDs 410 can be any of the following storage devices: HDD, CD, VCD, DVD, TAPE, SSD, Flash Memory, and EEPROM. In accordance with another embodiment of the present invention, a RAID subsystem includes a plurality of storage virtualization controllers 200, which are redundantly configured. When one of the storage virtualization controllers 200 fails, another RAID controller 200 may still work normally and take over the tasks of the failed controller 200.

According to an embodiment of the present invention, a virtualization layer 202 is provided above the RAID layer 204 in a RAID subsystem 20, hereafter called subsystem 20, by the RAID controller 200 and application programs. That is to say, there is a virtualization layer 202 provided between the RAID layer 204 and the host 10. Thus, IO requests which are from the host 10 to access the PSD array 400 will be processed by the virtualization layer 202 before they can be processed by the RAID layer 204. It should be noted that, the virtualization layer 202 and the RAID layer 204 are included in the storage virtualization controller 200. In addition, hereafter, the virtualization layer is also called virtualization module and the RAID layer is also called RAID module.

Figures 1B, 1C, 1D:
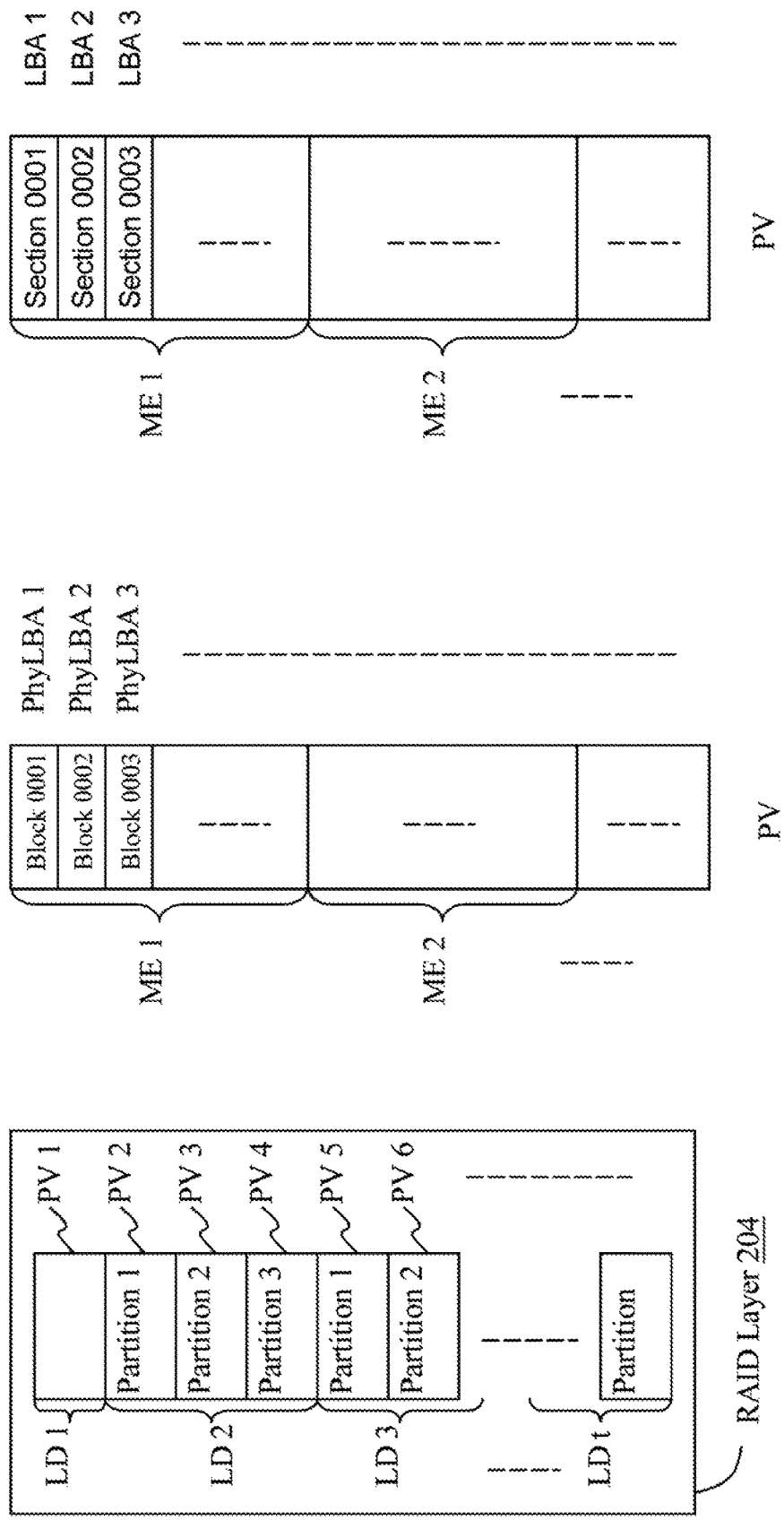
FIG. 1B is a relationship between the logical drives mapped by the RAID layer 204 and the physical volumes according to an embodiment of the present invention.
FIG. 1C is a relationship between the physical volumes and the media extents and sectors therein according to an embodiment of the present invention.
FIG. 1D is a relationship between the physical volumes and the media extents and physical sections therein according to an embodiment of the present invention.

Please refer to FIG. 1B, FIG. 1C, and FIG. 1D, wherein FIG. 1B illustrates a relationship between logical drives mapped by the RAID layer 204 and the physical volumes according to an embodiment of the present invention; FIG. 1C is a relationship between the physical volumes and the media extents and sectors therein according to an embodiment of the present invention; and FIG. 1D is a relationship between the physical volumes and the media extents and sections therein according to an embodiment of the present invention. As shown in FIG. 1B, in the RAID layer 204, one or more logical drives (LD) are composed of the blocks (or sectors) of the one or more PSDs. Each LD can be further divided into one or more partitions. Each LD or partition includes a plurality of blocks. Each block corresponds to a logical block address (LBA), which is also called a physical LBA (phyLBA). The phyLBAs, like PhyLBA1, PhyLBA2, and PhyLBA3 shown in FIG. 1C, are contiguously addressable. Each LD or partition corresponds to a physical volume (PV). Each PV can be divided into one or more physical media extents (hereafter, abbreviated ME) to be provided to the virtualization layer 202. Each ME uses a section as a unit for storing data. Each physical section includes one or more blocks. In the aspect of storage media, such as hard disks, the section is substantially equal to the sector. Each section of the ME respectively corresponds to a LBA representing a starting address and a sector count representing the length of a sector. For the aforesaid reasons, LBA1, LBA2, and LBA3 of FIG. 1D are not necessarily contiguously addressable. The virtualization layer 202 is used to manage the MEs represented by the RAID layer 204 to generate a virtual pool (VP) (not shown), which comprises one or more MEs and generates one or more virtual volumes (VV) (not shown), and the VVs are presented to the host 10 for data accessing by the IO requests. The VP and the VVs will be described below in detail by means of an embodiment in FIG. 2A.

Figure 2A:
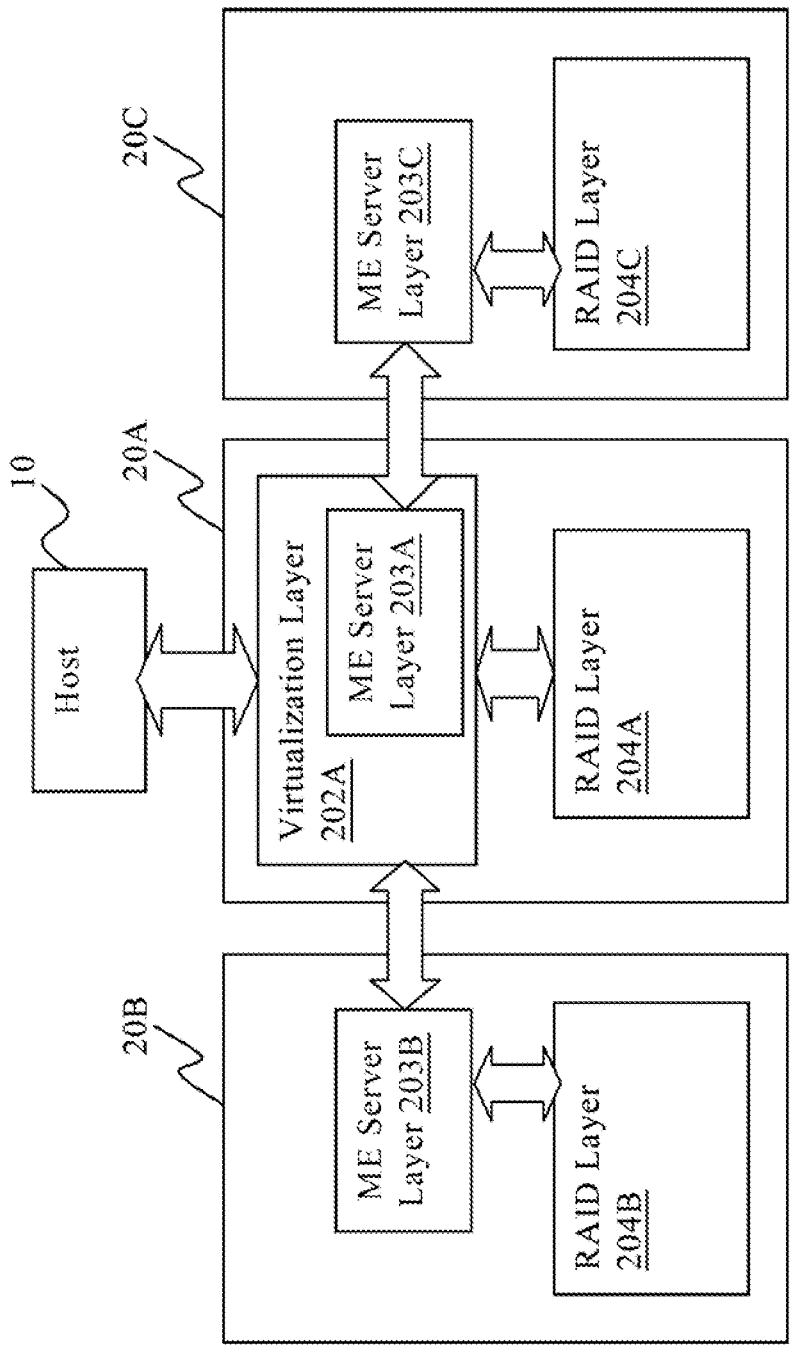
FIG. 2A illustrates a storage system architecture 30 in accordance with another embodiment of the present invention.

Please refer to FIG. 2A, which illustrates a storage system architecture 30 according to another embodiment of the present invention. The storage system architecture 30 is formed by a plurality of RAID subsystems 20 through a communication channel. The communication channel may be LAN, WAN, SAN, Internet, communication interconnect, or other communication channel for sending messages between two RAID subsystems 20. In the storage system architecture 30, it is necessary to provide the virtualization layer 202 in only one RAID subsystem 20A to virtualize the storage space of all the subsystems 20 into one or more VVs to the host 10 for data accessing. The RAID subsystem 20 provided with a virtualization layer 202A is called master RAID subsystem 20A, abbreviated as master subsystem 20A, and other RAID subsystems 20 which are managed by the master subsystem 20A are called slave RAID subsystem 20B, 20C, abbreviated as slave subsystem 20B, 20C. In each of the master subsystems 20A, 20B, and 20C, a ME Server Layer 203A, 203B, and 203C, respectively, is provided above each RAID layer 204A, 204B, and 204C so that the MEs of the RAID layer 204A, 204B, and 204C can be used by the virtualization layer 202A in the master subsystem 20A or other devices, such as the host 10. In the present embodiment, the ME Server Layer 203A can be provided inside the virtualization layer 202A of the master subsystem 20A or independent from the virtualization layer 202A (not shown in the figure). The RAID subsystem 20B and 20C are slave subsystems because of no virtualization layer provided therein. In the storage system architecture 30, the host 10 can merely communicate with the RAID subsystem 20A, and the RAID subsystem 20A can communicate with the RAID subsystem 20B and the RAID subsystem 20C. All IO requests from the host 10 to the storage system architecture 30 are received by the virtualization layer 202A of the RAID subsystem 20A. The virtualization layer 202A checks data associated with the IO requests to determine which of the RAID subsystems 20A, 20B, 20C the data belongs to, and then issues associated I/O requests to the virtualization layer 204A, 204B, 204C of the RAID subsystems to perform data access according to the IO requests, and the virtualization layer 202A returns the results to the host.

In accordance with another embodiment of the present invention, a master subsystem can be a RAID HEAD without equipping any PSD. In the aforesaid condition, the slave subsystems have to provide storage space to the master subsystem.

In order to further describe the detailed operation of the embodiment of the present invention shown in FIG. 2A, please refer to FIG. 2B. FIG. 2B is a diagram that depicts a relationship between the virtual pool, the media extents, and the virtual volumes in the storage system architecture 30 shown in FIG. 2A The diagram of allotment of the media extents of the storage system architecture 30 depicts that the RAID subsystems 20A, 20B, and 20C each include ME1, ME2 . . . and MEn. The ME1, ME2 . . . and MEn are managed by the virtualization layer 202A to generate a virtual pool (VP), which includes one or more MEs, such as RA-ME1 through RA-ME5, RB-ME1 through RB-ME5, and RC-ME1 through RC-ME5, wherein RA, RB, and RC indicate RAID subsystems 20A, 20B and 20C, respectively. The VP generates one or more virtual volumes (VVs), such as VV1, VV2, VV3 . . . and VVm, etc. The virtualization layer 202A presents the VVs to the host 10 for data accessing by the IO requests.

In accordance with an embodiment of the present invention, after the storage system architecture 30 is created, the volume capacities of the VVs presented to the host 10 are virtual capacities and are saved as an attribute of the Block Association Set (BAS) associated with each of the VVs. The storage space, however, is not actually allocated or assigned to the VV until a write IO request from the host 10 occurs, and then, the storage space of the VP will be actually assigned to the associated VV from the VP. The aforesaid mechanism is called thin provisioning. In accordance with another embodiment of the present invention, when the storage system architecture 30 is created, the volume capacity of the VVs presented to the host are actual capacities, which mechanism is called full provisioning. The smallest unit of the storage space that can be assigned to the VVs from the VP is a physical section. Each section includes one or more blocks (or called sectors).

Additionally, in accordance with an embodiment of the present invention, after the originally generated VVs have been presented to the host 10 for the data accessing by the IO requests, while the resource of the VP is still sufficient, new VVs can be added and provided to the host 10 for different usages. Moreover, in accordance with another embodiment of the present invention, after the originally generated VVs have been presented to the host 10 for data accessing by the IO requests, if the original usage of one of the VVs does not exist anymore so that there is no need for the one VV to exist anymore, the VV can be removed from the VP and its capacity can be released to the VP and used by other VVs in the VP.

In addition, in accordance with another embodiment of the present invention, when the capacity of a VP is insufficient for a VV and there are still available MEs in the storage system architecture 30, the MEs can be added to the VP so that the capacity of the VP can be increased to provide more storage space to the VVs. Furthermore, in accordance with another embodiment of the present invention, if one ME in a VP is not used by any VV in the VP, it can be removed from the VP. If the used capacity of one ME in a VP (such as ME1) is less than that of the other ME in the VP (such as ME2), the ME1 can be removed from the VP after the valid data in the ME1 are migrated to the ME2.

Please refer to FIG. 2C, which is a diagram that depicts a data structure of a section allocation system (SAS) for a virtual pool according to an embodiment of the present invention. The master RAID subsystem 20A generates one or more VPs in the virtualization layer 202A. Each VP has a section allocation system (abbreviated SAS) that manages the operations of the VVs. Please also refer to the embodiment shown in FIG. 2B. When the master RAID subsystem 20A manages the media extents RA-ME1 through RA-ME5, RB-ME1 through RB-ME5, and RC-ME1 through RC-ME5 of the RAID subsystem 20A, 20B, 20C, the media extents RA-ME1 through RA-ME5, RB-ME1 through RB-ME5, and RC-ME1 through RC-ME5 are associated with the virtualization layer 202A or the master RAID subsystem 20A.

In accordance with an embodiment of the present invention, the SAS 211 has file-system-like structure, including one or more MEs, and each one of the MEs are formed by dividing one or more physical volumes, which are used as media section providers. Each SAS 211 includes one or more block association sets section allocation lists (abbreviated BAS SAL) 213a, 213b and an inode table 215. The inode table 215 is used to record the information about the locations where the BAS SALs 213a, 213b is stored, i.e., the pointers to the contents of the BAS SALs 213a, 213b, such that the system may retrieve the contents of BAS SALs 213a, 213b through the inode table 215 correctly. The SAS 211 and the associated MEs each have a unique identity (ID). The BAS SALs 213a, 213b can be regarded as, in an analogous way, files of the SAS 211, and there are many types of files of the SAS, while the BAS SALs 213a, 213b is a type of them used for a specific purpose.

In accordance with an embodiment of the present invention, the BAS SALs 213a, 213b are data structure of the VV. Each BAS SALs 213a, 213b maps to an VV and comprises: attribute block 2131 for recording ID, the capacity, and its configuration information about the BAS SALs 213a, 213b; a directory field 2133 for recording reference and management information about the sections of the BAS SALs 213a, 213b; a journal field 2135 for storing operation journal for recovery when system failure or power failure occurs, a block association table (BAT) 2137 for storing reference information pointing to the data area 2139; and the data area 2139 for storing data of the IO requests issued by the host 10. The locations storing the data of the IO requests are recorded in the BAT 2137 included in the BAS SALs 213a, 213b. In accordance with another embodiment of the present invention, the SAS 211 also includes other types of SALs, not limited to the aforesaid BAS SAL.

In accordance with an embodiment of the present invention, the first step for establishing a VV is to create a VP, which is accomplished by creating a SAS associated with the VP. Then, the BAS SAL and the BAT should be created, and the associated VV is mapped onto the CH/ID/LUN of the host channel. After the above steps, when a write I/O request from the host occurs, the virtualization layer will ask the SAS for sufficient storage space to store the I/O data, and information about the location where the I/O data is stored will be recorded in the BAT.

When a VP is created, one or more MEs should be assigned to the VP, and the MEs and their associated physical LBAs (phyLBAs) are stored in the metadata field of the SAS.

Figures 3A, 3B, 3C:
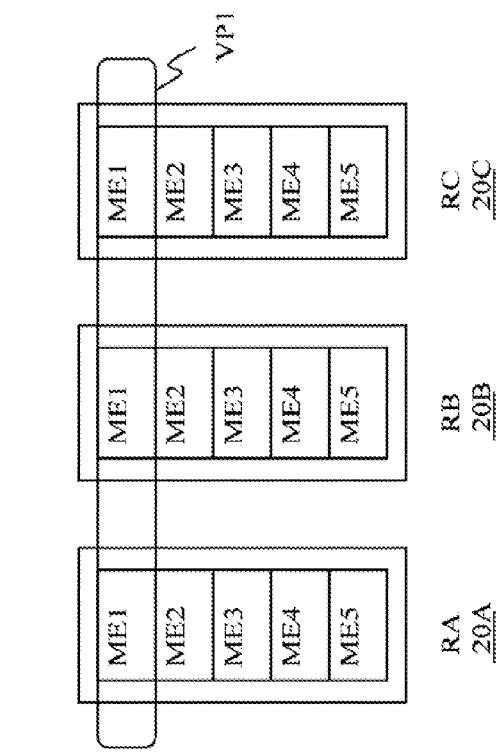
FIG. 3A is a diagram that a virtual pool is formed by the MEs of a plurality of RAID subsystems according to an embodiment of the present invention.
FIG. 3B is a diagram illustrating an embodiment of a data structure of a physical section included in the virtual pool according to FIG. 3A of the present invention.
FIG. 3C is a diagram illustrating another embodiment of a data structure of a physical section included in the virtual pool according to FIG. 3A of the present invention.

Please refer to FIG. 3A, which is a diagram that a virtual pool is formed by the MEs of a plurality of RAID subsystems according to an embodiment of the present invention. The storage system architecture 30 shown in FIG. 3A has three subsystems RA 20A, RB 20B, and RC 20C, each of which corresponds to ME1, ME2, ME3, ME4, and ME5. Each ME includes 10000 physical sections, and each section corresponds to a LBA, which is called physical section LBA (phyLBA). Therefore, each ME corresponds to 10000 physical section LBAs. Taking RA ME1, RB ME3, and RC ME4 as examples, the storage space of them corresponds to RA-ME1-00001 through RA-ME1-10000, RB-ME3-00001 through RA-ME1-10000, and RC-ME4-00001 through RA-ME1-10000, respectively. The reason of terming the LBA of each physical section of the MEs as the physical section LBA is that, in the conventional technologies where there is no virtualization layer 202A, after the subsystem RA 20A, RB 20B, and RC 20C presents its LDs/partitions to the host 10 as the physical volumes, the host accesses the data from the physical volumes according to said LBA. Because the LBA is called the physical section LBA, its associated sections are called physical sections.

Assume that when a VP (i.e., VP1) is built, VP1 is configured to comprise ME1 of RA, ME1 of RB, and ME1 of RC. The foregoing MEs and the physical sections contained therein will be recorded in METADATA (not shown) of SAS 211, such as recorded by a physical LBA list shown in FIG. 3B, or recorded by a physical section index (PSI) to a physical section LBA list shown in FIG. 3C and FIG. 3D.

FIG. 3B is a diagram illustrating an embodiment of a data structure of a physical section included in the virtual pool according to FIG. 3A of the present invention. In the embodiment shown in FIG. 3B, each entry of the physical LBA list includes three fields, which are a first field used to store the index or ID of a ME, a second field used to store the start address (or called the base block address) of the ME pointing to the start LBA of the ME, and a third field used to store the section count of the ME. In accordance with the sequence of the MEs in the physical LBA list and the sequence of the MEs in the sections, the sequence of the sections in the VP can be determined. Further, the sequence of the sections and the start address of the sections can be determined using the block count of each section. Here, the sequence of the sections is defined as a physical section index (PSI) of the section in the VP.

FIG. 3C and FIG. 3D are diagrams illustrating another two embodiments of the data structure of a section included in the virtual pool according to FIG. 3A of the present invention, wherein the data structure stores the PSI and cross-referencing information of physical section by a physical section index to physical section table (PSI2PS table). The table includes four fields: PSI field 81, ME ID field 82, start address field 83, and sector count field 84. The PSI field 81, the ME ID field 82, the start address field 83, and the sector count field 84 respectively represent the PSI 81, the ME ID 82 of the physical sections associated with the PSI, the LBA 83 of the physical sections associated with the PSI, and the sector count 84 of the physical sections. Specifically, in the embodiment of FIG. 3C, it is assumed that each section includes one sector, and therefore the first entry indicates that the physical section of PSI=0001 corresponds to a sector starting from RA-ME1-00001, and the last entry indicates that the physical section of PSI=10000 corresponds to a sector starting from RC-ME1-1000.

In the embodiment of FIG. 3D, it is assumed that each section includes 100 sectors, and therefore, the first entry indicates that the physical section of PSI=001 corresponds to 100 sectors starting from RA-ME1-00001, the second entry indicates that the physical section of PSI=002 corresponds to 100 sectors starting from RA-ME1-00101, and the last entry indicates that the physical section of PSI=300 corresponds to 100 sectors starting from RC-ME1-09901, respectively.

In the embodiments shown in FIG. 3C and FIG. 3D, each record includes a PSI and its corresponding physical section LBA of the physical media extent. In implementation the present invention, the embodiments shown in FIG. 3C and FIG. 3D can be stored in other ways and the corresponding relationship can be obtained by calculation, such as the way of the embodiment shown in FIG. 3B.

In addition to the approaches of FIG. 3B, FIG. 3C, and FIG. 3D, any approach or function that can be used to find the mapping relationship between the PSI and its corresponding physical LBA of the physical media extent, such as a specific operation relationship or a formula, can be utilized in the present invention.

Although in the embodiment shown in FIG. 3A, the VP1 is formed by the first MEs in each of the three subsystems RA 20A, RB 20B, and RC 20C, in accordance with another embodiment, the number of MEs in the VP can be other numbers, such as 4, 5, etc, and it is not necessary to add the MEs to the VP1 from the three subsystem in a round robin way. Moreover, the MEs can be added to the VP1 without following the order of the MEs in the subsystem. For example, if there are five MEs in a VP1, the sequence of the MEs can be RA ME1, RB ME1, RA ME3, RB ME2, and RA ME2.

Although, the number of the MEs and sections in each subsystem RA 20A, RB 20B, and RC 20C of the embodiments shown in FIG. 3A and FIG. 3D are equal, in which the numbers are 5 and 100, respectively, according to another embodiment of the present invention, the number of the MEs in each subsystem, the number of the sections in each ME, and the number of the sections in each subsystem RA 20A, RB 20B, and RC 20C, can all be different from each other. For example, there are 5, 4, and 6 MEs in RA. RB, and RC respectively. The number of sections of RA ME1 is 100, and the number of sections of RA ME2-ME5 is 50. The number of sections of RB ME-ME2 is 60, and the number of sections of RB ME3-ME4 is 80. The number of all the sections of RC ME1-ME6 is 50.

Regarding the BAT 2137, please refer to FIG. 4A which is a diagram that depicts the BAT 2137 according to an embodiment of the present invention. Each entry of the BAT 2137 has three fields: a Volume Block Index (VBI) 41, a location index field 42, and a block association bitmap (BAB) 43, which store the VBI, the section index (abbreviated SI), and the BAB, respectively. The VBI is the sequence of the volume block used in virtual volume VV1. The location index is the SI corresponding to the volume block. In accordance with an embodiment of the present invention, the location index is the start PSI of physical section corresponding to the volume block, in case there is no V2P mapping table. In accordance with another embodiment of the present invention, the location index points to a start virtual index of virtual section to which the volume block corresponds in case there is a V2P mapping table, wherein the V2P table will be described in detail hereafter. The BAB is used to determine whether physical section to which the PSI corresponds is utilized by the VV1 or not.

The size of the volume block can be the size of one or more sections. When the size of a VV1 is determined, if the size of the volume block is increased, the number of the volume block will be decreased, and the number of the corresponding VBI will be decreased as well, and thus, the number of the entry will also be decreased, the result is that the size of the BAT 2137 becomes smaller. On the contrary, if the size of the volume block is decreased, the number of the VBI will be increased, and therefore, the size of the BAT 2137 becomes larger. When a volume block merely includes one section, the start SI to which the VBI corresponds is the SI of the sections to which the volume block corresponds. When a volume block includes a plurality of sections, the start SI to which the VBI corresponds is the first SI of the sections to which the volume block corresponds, and other sections to which the volume block corresponds can be obtained using the SI.

For example, FIG. 4A depicts an instance that one volume block corresponds to one section. In the first entry through fourth entry and the seventh entry, the BAB field 43 is "1", which means that the physical section corresponding to the location indices in the location index fields 42 of these five entries, i.e., 001, 002, 101, 201, and 299, have already been utilized by VV1, and its corresponding VBIs in the VBI field 41 are 001, 002, 003, 004, and 007, respectively. The BABs in the fifth entry and sixth entry are 0, which means that the location indices are not used by VV1 since location index fields 42 of the fifth entry and sixth entry do not correspond to any section. If VV1 notifies the host 10 that there are 10 VBIs in VV1, but the volume blocks with 008, 009, and 010 in location index field 42 are not utilized yet, then according to a first implementation of the present invention, the BAT 2137 may have 10 entries but the BAB field 43 corresponding to 008, 009, and 010 in the location index field 42 is filled with value 0. According to a second implementation of the present invention, the BAT 2137 may have only 7 entries, and the seventh entry is recorded as the last entry.

It is necessary to note that, the foregoing data structure with the BAB is merely an embodiment of the present invention. In accordance with another embodiment of the present invention, the BAT can be merely stored in a cache buffer and does not use the BAB.

Please refer to FIG. 4B, which is a diagram that depicts BAT 2137 according to another embodiment of the present invention. Each entry of the BAT 2137 has two fields: a location index field 42 and a block association bitmap (BAB) field 43, which are used to store PSI and BAB, respectively, and the sequence of the entries may corresponds to the VBI. For example, if VV1 notifies the host 10 that there are 10 VBIs, the number of the location index and the number of the BAB both have to be 10 to correspond to the 10 VBIs, no matter whether or not they have already been used by VV1 (i.e., BAB is 1). The advantage of this embodiment is that it can save the space occupied by the VBI field 41.

Since a volume block comprises one or more physical sections (such as m physical sections) and a physical section comprises one or more sectors (such as n sectors), the volume block comprises m multiplying n (i.e., m×n) sectors. Since LBA used in the host is a contiguous address and the size of storage space corresponded to each LBA is equal to the size of a sector, the relationship of the VBI corresponded to the IO request of the host is VBI=host LBA/(m×n).

Although FIGS. 4A and 4B are used to explain the data structure of the BAT 2137, any approach that can find the mapping between VBI and the location index actually used in VV1, i.e., location index in field 41 in which the BAB value is 1, is within this scope of the present invention.

According to an embodiment of the thin provisioning mechanism of the present invention, when a virtual volume VV is created and presented to the host 10 but has not received a write IO request from the host 10, there is not any actual capacity assigned to the VV, because there is no data in the VV, and therefore, all the BAB of the BAT in the VV is 0 and not any PSI is used in the virtual volume VV. However, a virtual capacity is stored as a BAS attribute and presented to the host 10. Thus, the host 10 will regard the virtual capacity as the storage capacity of the virtual volume.

In accordance with an embodiment of the present invention, if there is enough cache buffer (not shown) in virtualization layer 202A, the whole metadata, BAS SAL 213a, 213b, a physical-to-virtual section index mapping table (abbreviated physical-to-virtual mapping table or P2V table) 5135 and a virtual-to-physical section index mapping table (abbreviated virtual-to-physical mapping table or V2P table) 5137 of the virtual pool VP (including VP1) can be stored in the cache buffer, the latency of the IO access processing will be small, which will reduce the overhead of the storage virtualization. The P2V table and V2P table will be described hereafter.

In accordance with another an embodiment of the present invention, when a VV is created, a reserved capacity of the VV can be set to ensure that the VV can have a minimum storage capacity. For example, if the virtual capacity of the VV is 400 GB but the reserved capacity thereof is 100 GB, the minimum storage capacity of the VV is 100 GB. This can be realized by using SAS section reservation mechanism. When the actual storage capacity of the VV does not reach the reserved capacity, the storage capacity difference between the reserved capacity thereof and the actual storage capacity thereof will be reserved by the SAS section reservation mechanism, and the reserved capacity thereof will be decreased in accordance with the increase of the actual storage capacity thereof, until the actual storage capacity thereof is equal to the reserved capacity thereof.

In accordance with an embodiment of the full provisioning mechanism of the present invention, when the storage system architecture 30 is created, the storage space of the storage capacity of the volume will be allocated to the VV. Therefore, the storage capacity presented to the host 10 is the actual storage capacity, which ensures that the storage capacity presented to the host 10 has already been there for the VV to use.

In accordance with an embodiment of the provisioning mechanism of the present invention, there are three exemplary implementations: the first, section reservation mechanism; the second, section allocation mechanism; and the third, section assignment mechanism.

In performing the no provisioning mechanism in accordance with the section reservation mechanism of the first implementation, the virtual capacity of the virtual volume is kept by setting a value for virtual capacity and no storage space is actually allocated or assigned to the VV. Thus, the operation of the first implementation can be performed very fast, and the actual storage space of the VV is allocated and assigned when the IO requests from the host occur. If some space needs to be released from the VV, the only thing to do is to modify the set value for the virtual capacity. For the above-mentioned reasons, the virtual capacity of the VV is easy to change and the operation is fast.

In performing the full provisioning mechanism in accordance with the section allocation mechanism of the second implementation, the virtual capacity of the VV is allocated first, but has not been actually assigned yet. Thus, the operation of the second implementation is slower than the operation of the first implementation, and the actual storage space of the VV is assigned when the IO requests from the host occur. For the aforesaid reasons, to change the virtual capacity of the VV in the second implementation is hander than in the first implementation. According to an embodiment of the present invention, the section allocation mechanism records the allocated sections by using an allocated section list. Later, when a host IO request is received and additional storage space that is outside the storage space assigned to the virtual volume is required, data section from the allocated section list will be provided to the VV.

In performing the full provisioning mechanism in accordance with the section assignment mechanism of the third implementation, the capacity of the VV is actually assigned at the beginning. Thus, the operation of the third implementation is slower than the first and the second implementation, but the sequential data can be stored contiguously to provide a better sequential access performance when IO requests from the host is executed. In accordance with an embodiment of the present invention, section assignment is accomplished by filling location index into the BAT of the VV, and the embodiments are shown in FIG. 4A and FIG. 4B and the relevant description. Because the capacity has already been assigned to a VV, the assigned space can not be released. Only when the assigned space is recorded by using other mechanism, such as the BAB, can the space utilized by the host IO requests be released (e.g., using the data migration functionality).

In accordance with an embodiment, an event notification can be activated by a VP according to the used capacity or the remaining storage capacity. The event notification threshold can be set in accordance with the storage capacity level or the storage percentage. For example, assume that the total storage capacity of a VP is 800 GB. It is predetermined that the event notification is activated when the used capacity reaches 700 GB, or when the used capacity reaches 80% (i.e., 560 GB), or when either event occurs. In accordance with another embodiment of the present invention, the event notification threshold can be set in accordance with a proportion of the storage capacity of a specific VV to the total storage capacity of the VP. For example, the average storage capacity of a VV is ten percent of the VP when there are 10 VVs in a VP. Thus, the event notification can be activated when the used storage space of a VV reaches twenty percent or thirty percent of the total storage capacity of the VP; that is to say, the used storage capacity of a VV reaches double or triple of the average storage capacity of a VV. Further, the event notification can be activated when the used storage capacity of a VV reaches fifty percentage of the total storage capacity of the VP, that is to say, the used storage capacity of a VV reaches half of the total storage capacity of a VV.

In accordance with an embodiment of the present invention, the storage system architecture 30 manages allocations and usages of the storage capacity of a plurality of subsystems or a plurality of volumes by using a single management window, which has the advantage of convenience in the storage capacity management. In accordance with an embodiment of the present invention, the storage system architecture 30 can increase the storage capacity presented to the host 10 when the storage capacity, either for a virtual capacity or for an actual capacity, of the VV is not enough. In accordance with an embodiment of the present invention, when the storage space of the VP is insufficient, the VP can ask the ME provider to provide extra MEs to increase the storage space of the VP. In accordance with an embodiment of the present invention, when the storage space of a VP (such as VP1) is insufficient for usage while another VP (such as VP2) has extra available storage space, the extra available space of the another VP (i.e., VP2) can be freed and used by the VP (i.e., VP1). For example, when the storage space of the VP1 is insufficient for usage, one of the MEs of the VP2 can be removed using migration functionality and the removed ME can then be added to the VP1 to increase the available ME storage space of the VP1.

In accordance with an embodiment of the present invention, when the storage space of the storage system architecture 30 is insufficient, a new RAID subsystem can be added to the storage system architecture 30 by a simple configuration setting to be used by the VPs and VVs.

A VP can map one or more VVs by using the thin provisioning mechanism of the present invention. The total virtual capacity of the VVs can be larger than the total actual storage capacity of the VP so that the subsystem or the storage system architecture 30 has great flexibility in utilizing the storage capacity.

For example, when the total storage capacity of a VP is 800 GB, the VP can be mapped into many VVs, such as VV1, VV2, and VV3, each has a virtual capacity presented to the host 10. For example, the virtual capacity of VV1 is 400 GB, the virtual capacity of VV2 is 500 GB, and the virtual capacity of VV3 is 700 GB. The total virtual capacity of VV1, VV2, and VV3 is 1600 GB, which is larger than the total actual storage capacity of the VP, but actual storage capacity used by each VV depends on the actual data amount of the IO request written in each VV. For example, assume it is decided at the beginning that VV1, VV2, and VV3 respectively need 200 G, 250 GB, and 350 G in capacity and thus the capacities are set so. When working for a while, it is found that the usage of the VV for storage capacity is only 100 GB; the usage of the VV2 for storage capacity has been increasing all the time and could be up to 500 GB eventually, and the storage capacity of the VV3 has never been used because of IT budget change. Thus, the storage capacity of the VV1, the VV2, and the VV3 which are actually been used are respectively 80 GB, 470 GB, and 0 GB. At this time, since only 550 GB out of the 800 GB the total storage capacity in the VP is used and there is still 250 GB left in the VP, a new VV, such as VVm, can be generated from the VP if necessary.

Therefore, the advantages of storage virtualization reside in the convenience in management and the capacity expansibility for storage system.

For the ME server layers 203A, 203B and 203C, in accordance with an embodiment of the present invention, an ME is only associated with the virtualization layer 202A of one master subsystem 20A, and is managed and used by the virtualization layer 202. In accordance with an embodiment of the present invention, the ME server layers 203A, 203B and 203C are created above the RAID layer 204A, 204B, 204C (in each subsystem 20A, 20B, 20C, respectively, so as to present MEs from the RAID layer 204A, 204B, 204C to the associated virtualization layers 202 for management and usage. Further, the ME server layers is also in charge of finding out the MEs associated with the virtualization layer 202 of the subsystem 20A, 20B, 20C where the ME server layers 203A, 203B and 203C are located for management and usage by the virtualization layer 202. The ME server layer 203 records the information about the master subsystem 20 associated with each of the MEs located in the subsystem 20 associated with the ME server layer 203. In accordance with an embodiment of the present invention, the embodiment of FIG. 1A also has a ME server layer (not shown).

In accordance with an embodiment of the present invention, the media extents can be from a virtual pool, which is explained below.

First, data in media extent sections is migrated to sections in other media extents. Migration destination is determined by the "Distributed Data" attribute of the virtual volume with which the section is associated. (Also see topic entitled "Section Migration" & "Distributed Data".) Then, the emptied sections are then swapped out of the BAS SALs to which they are linked. Finally, after all sections in the media extent to be removed have been freed in this way, the media extent is then removed from the SAS.

Figure 9:
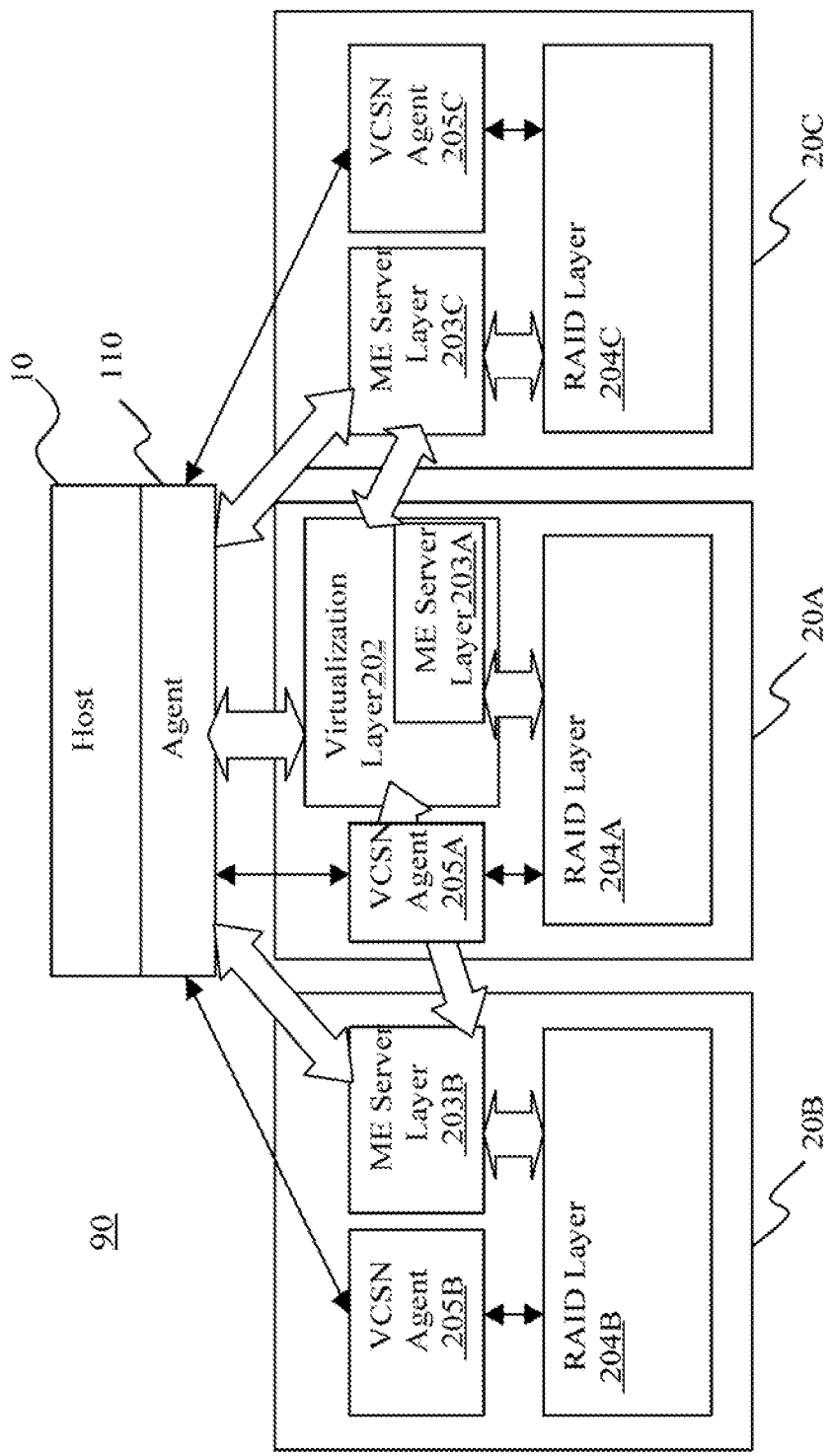
FIG. 9 is diagram that depicts a storage system architecture 90 according to another embodiment of the present invention.

Please refer to FIG. 9, which is a diagram that depicts a storage system architecture 90 according to another embodiment of the present invention. The storage system architecture 90 is similar to the embodiment shown in FIG. 2 either in its architecture, operation or data structure. Therefore, the same portions of two embodiments will not be described again herein, but the differences between them will be described below.

The storage system architecture 90 is formed by connecting a plurality of RAID subsystems RA 20A, RB 20B, RC 20C and a host 10. Compared with the embodiment shown in FIG. 2A, the embodiment shown in FIG. 9 has an agent (or a host agent) 110 provided in the host 10, and the host 10 can directly communicate with all the subsystems, like RA 20A, RB 20B, and RC 20C, to access data therein. Thereby, the problem that the master subsystem 20 will be the bottleneck of the system performance can be improved. In accordance with an second embodiment of the present invention, the communication between master subsystem 20A and slave subsystems 20B, 20C can be performed by the assistance of the host agent 110 and the ME server layers 203A, 203B, 203C. The details will be described below.

Each of the slave subsystems 20B, 20C must make its physical media extents accessible to the host agents 110 that have access to virtual volume to which the media extents belong. These media extents must be masked from view by the host upper level and from view by the others. The aforementioned function is executed by the ME servers.

The host agent 110 will issue a data location query command to the virtualization layer 202A of the master subsystem 20A to inquire the location of the data which the host 10 wants to access. According to one embodiment of the present invention, the data location query command can be a proprietary data distribution query SCSI command. Then the host performs data access directly on the subsystems 20A, 20B, 20C the data resides on, in accordance with the response of the virtualization layer 202A of the master subsystem 20A. The detailed explanation will be described as the following. The data distribution query SCSI command from the host agent 110 provides the LBA/Block-Count defining virtual range to be accessed. The subsystems 20A, 20B, 20C response a list of physical ME-ID/LBA Block-Count/VCSN after receiving the data distribution query SCSI command, and the list covered the range which is queried. On the other hand, the host agent 110 further communicates with the ME server layer 203A of subsystem 20A, the ME server layer 203B of subsystem 20B, and the ME server layer 203C of subsystem 20C to obtain the relevant information about the MEs made accessible by subsystems 20A, 20B, 20C, respectively, to determine that ME II) in the aforesaid list belongs to which of the subsystems 20A, 20B, 20C. Next, the host agent 110 directly issues read/write IO requests (also called IO access commands) to the subsystems 20A, 20B, and 20C associated with the ME ID in the list by using the proprietary Read/Write SCSI commands, according to the aforementioned information. Except for LBA/Block-Count, the proprietary Read/Write SCSI commands further includes a Validity Check Sequence Number (VCSN) in the command descriptor block (CDB) (not shown), for the subsystems that receive the commands to verify the validity of commands. The RAID subsystems 20A, 20B, 20C are accessed according to the IO requests when the IO requests are valid commands, and reject the IO requests when the IO requests are invalid commands. According to another embodiment of the present invention, the data location query command can be a data location query command defined according to other communication protocols.

In accordance with an embodiment of the present invention, a VCSN module is provided above the RAID layer 204A of the subsystem 20A, the RAID layer 204B of the subsystem 20B, and the RAID layer 204C of the subsystem 20C, respectively. For this embodiment, the VCSN modules are VCSN agents 205A, 205B, and 205C, respectively, which are bridges between the host agent 110 and the RAID layers 204A, 204B, and 204C, respectively to process Read/Write IO request (or called IO access command). More specifically, the VCSN agents 205A, 205B, and 205C verify the validity of VCSN of Read/Write SCSI command sent from the host agent 110 to determine the correctness of the address of the IO access command. In the master subsystem 20A, VCSN agent 205A can be provided outside or inside the virtualization layer 202A (not shown). The VCSN agents 205A, 205B, and 205C can be provided independent from the ME server layers 203A, 203B, 203C, respectively, or can be integrated with the ME server layers 203A, 203B, 203C, respectively (not shown).

In accordance with an embodiment of the present invention, each ME may be further provided with a VCSN parameter when data migration functionality is implemented in the present invention. The VCSN value of the VCSN parameter is determined by the virtualization layer 202A of the master subsystem 20A and the virtualization layer 202A of the master subsystem 20A will inform the VCSN agents 205A, 205B, 205C of the subsystems 20A, 20B, 20C where the ME is located. Then, the VCSN agents 205A, 205B, 205C will use the VCSN value to determine the validity of the IO request (or called IO access command) they received. For example, each time when a migration operation is performed, the virtualization layer 202A of the master subsystem 20A increments the VCSN of the ME performing the migration operation by 1 and informs the VCSN agents 205A, 205B, 205C of the subsystem to which the ME belongs for the VCSN agents 205A, 205B, 205C to verify the validity of data access in accordance with a new VCSN value. The details will be described later. In accordance with an embodiment of the present invention, a migration operation can be performed on one physical section at a time. If the data in a location has been changed from the time the data location is inquired by the host 10 or the host agent 110 to the time the IO request is actually issued by the host 10 or the host agent 110, the provision of the VCSN agents 205A, 205B, 205C can assure that the slave subsystems may detect the change and reject IO request, so as to force the host 10 or the host agent 110 to inquire the related information of the master subsystem 20A. In addition, in one embodiment of the present invention, the master subsystem 20A responds to the inquiry of the host 10 or the host agent 110 by a special VCSN (or called reserved VCSN) such as but not limited to null (or "0"). The special VCSN means that the IO request from the host 10 or the host agent 110 must be processed by the master subsystem 20A.

Further, in this embodiment, the VCSN will be changed every time when the master subsystem 20A requires the host 10 or the agent 110 inquire it before deciding how to process IO requests from the host 10. For instance, VCSN will be changed when the master subsystem 20A requires the host 10 or the agent 110 to change IO request address, or when the master subsystem 20A performs other data operation before the host 10 or the agent 110 issues the IO request, or when the data will be written in several locations with different addresses, or when the IO request should be processed by the master subsystem 20A. In accordance with an embodiment of the present invention, the master subsystem 20A may purge a VCSN cache of the slave subsystems such that there is no VCSN data in the VCSN cache of the slave subsystems, and thus the VCSN carried by the IO requests from the host 10 or the agent 110 can not pass the consistency check so that all IO requests will be rejected.

The description of the points of validity check sequence number is as the following.

(1) VCSN is incremented at master subsystem but checked at slave subsystem that is actually servicing IO (Read/Write) request.

(2) According to an embodiment of the present invention, each time when a migration operation is performed, Validity Check Sequence Number (VCSN) is incremented and sent to the slave subsystem via a proprietary in-band SCSI command. According to another embodiment of the present invention, the VCSN is changed every time when the master subsystem requires the host agent query it before deciding how to perform the host 10 request.

(3) The VCSN is returned together with physical ME-ID/ LBA/Block-Count in response to Data Distribution Query SCSI command to Host Agent.

(4) The host agent includes the VCSN in the proprietary IO (Read/Write) SCSI command issued to the subsystem on which the ME ID resides.

(5) The slave subsystem checks the VCSN in CDB against the latest VCSN received from the master subsystem. If they are different, slave subsystem rejects request with sense data indicating reason.

(6) The host agent must then re-query for updated mapping.

(7) According to one embodiment of the present invention, Validity Check Sequence Number (VCSN) has a valid lifetime associated with it that is dependent on the number of bits. For example, if we assume 100 migration operations per second and a 16-bit SN, then the SN valid lifetime is something less than $2^{**}16/100$ seconds.

(8) The host agent must monitor the VCSN lifetime if it caches mapping information. The start of a VCSN lifetime should be measured from when the query returning the VCSN is issued, not from when the response is received.

(9) If the valid lifetime is exceeded, the host agent must flush its mapping cache and re-query. If it is possible that the valid lifetime will be exceeded during the execution of an IO request, the host agent should re-query before issuing the IO request.

In accordance with another embodiment, the VCSN mechanism need not be created, such as when the storage system architecture does not perform the migration operation. In such a situation, it is not necessary to provide the VCSN agent 205A, 205B, 205C above the RAID layers 204A, 204B, 204C of the subsystems 20A, 20B, and 20C, respectively. Alternatively, it is not necessary to provide the VCSN agent when the storage system architecture performs the migration operation via the master subsystem; this is because the master subsystem knows the actual location of the physical sections of the data associated with it.

In accordance with another embodiment of the present invention, the VCSN mechanism is provided when the storage system architecture does not perform the migration operation. For example, when the master subsystem requires the host agent inquire it before deciding how to perform the host IO request, the VCSN is changed. Or, when the host inquires the master subsystem (which may be rejected by the slave subsystems due to the IO request, or may inquire it directly) and the master subsystem return a reserve VCSN to the host, the host issues IO request to the "master subsystem" directly.

Figure 10:
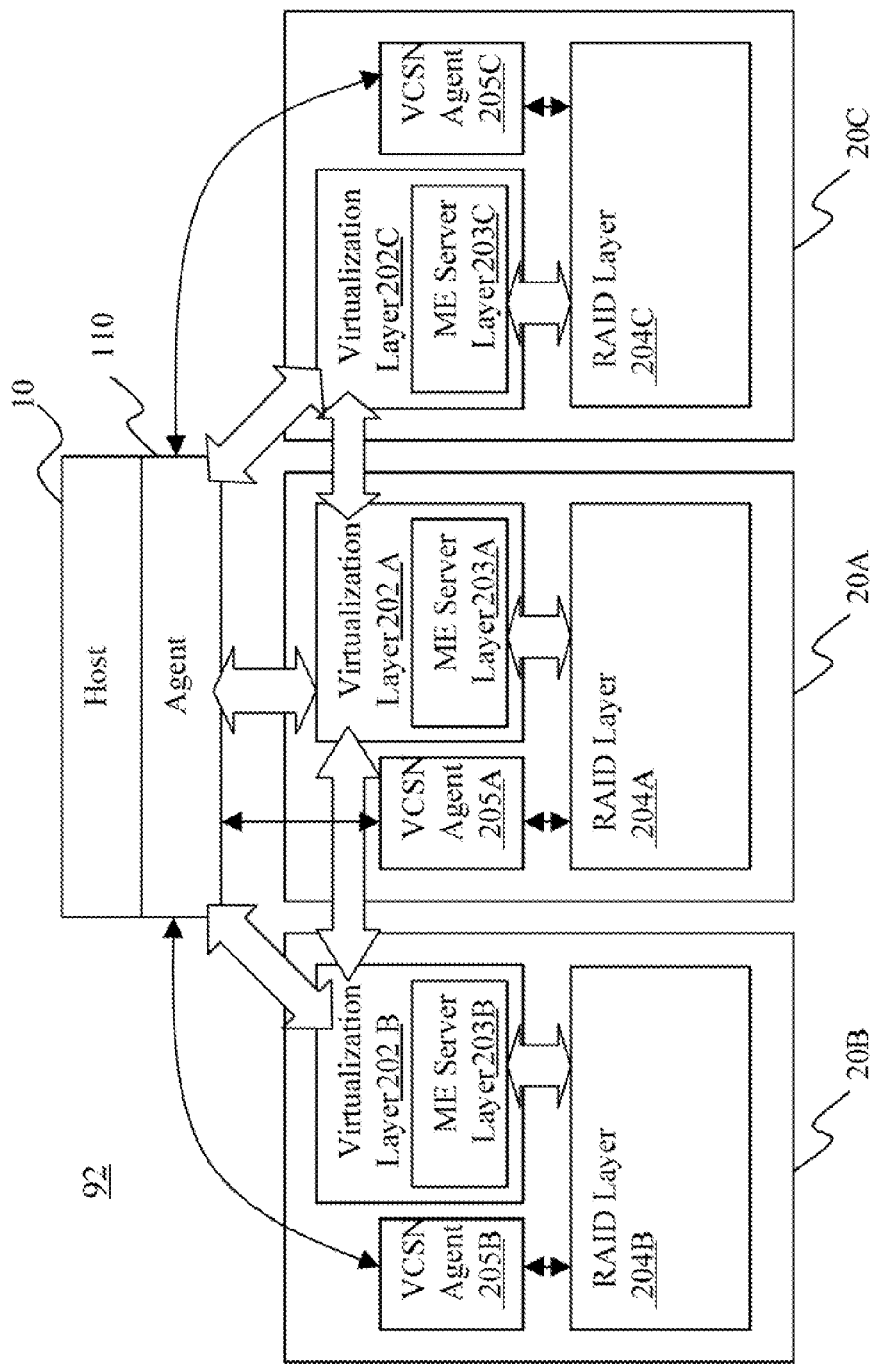
FIG. 10 is a diagram that depicts a storage system architecture 92 according to yet a further embodiment of the present invention.

Please refer to FIG. 10, which is a diagram that depicts a storage system architecture 92 according to yet a further embodiment of the present invention. The storage system architecture 92 is formed by connecting a plurality of RAID subsystems 20A, 20B, 20C and a host 10, and the host 10 has a host agent 110 provided therein. Compared with the embodiment shown in FIG. 9, not only the host 10 in the embodiment shown in FIG. 10 may communicate with the subsystems 20A, 20B, 20C under the assistance of the host agent 110, the subsystems 20A, 20B, 20C include the virtualization layers 202A, 202B, 202C, respectively (i.e., they can be the master subsystems). Therefore, the host 10 can access the subsystems 20A, 20B, 20C directly with the assistance of the agent 110, which alleviates the potential problem that the master subsystem 20A of the storage system architecture 90 could be the bottleneck of system performance and enhances the flexibility of the utilization of the system resources.

Figure 11:
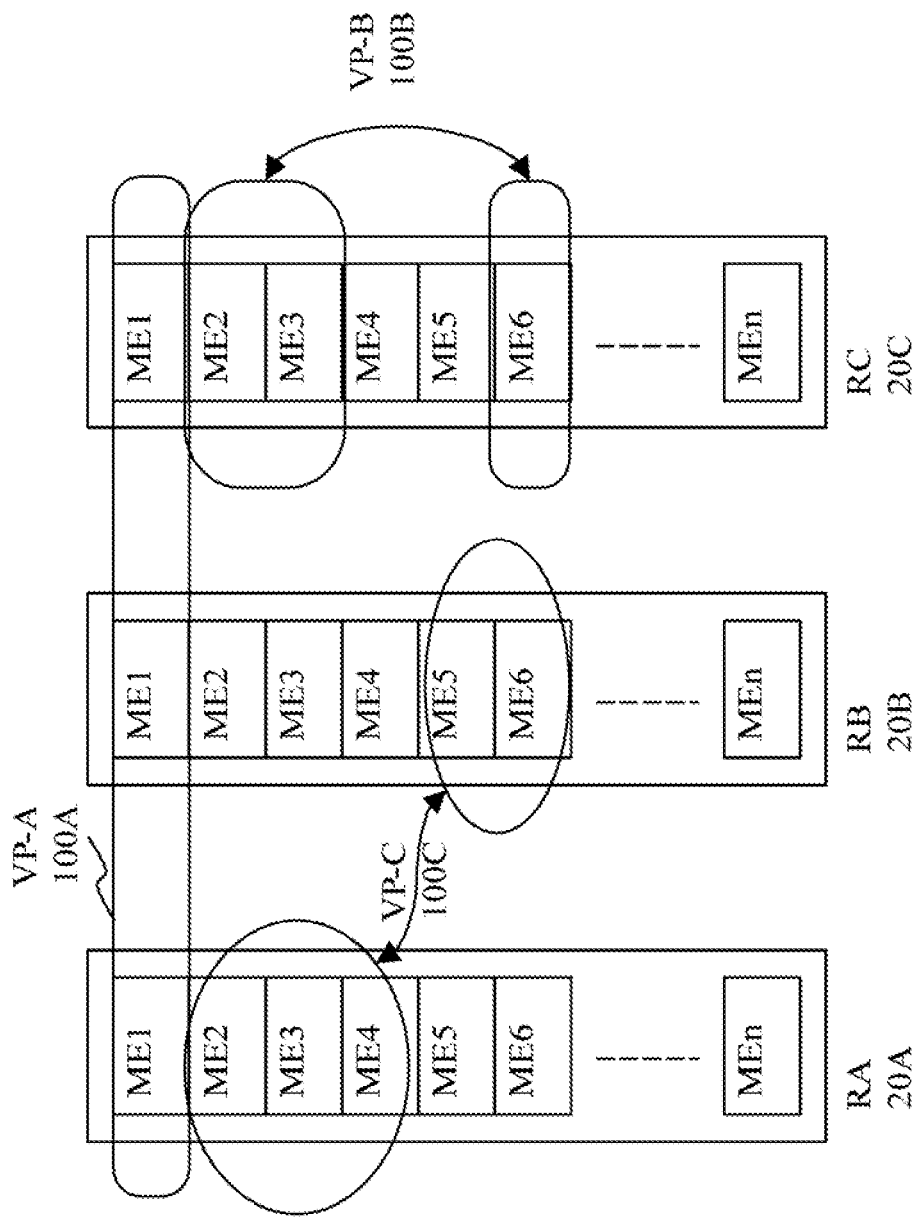
FIG. 11 is a diagram that depicts the media extent allocation according to an embodiment of the present invention for the storage system architecture 92 embodiment shown in FIG. 10.

Please refer to FIG. 11, which is a diagram that depicts the media extent allocation according to an embodiment of the present invention for the storage system architecture 92 embodiment shown in FIG. 10. The subsystems 20A, 20B, 20C of the storage system architecture 92, respectively, generate VP-A 100A, VP-B 100B, and VP-C 100C. In addition to the MEs respectively belong to VP-A 100A, VP-B 100B, and VP-C 100C, the other MEs can be assigned to any one of VP-A 100A, VP-B 100B, and VP-C 100C.

According to one embodiment of the present invention, the storage system architecture can be provided with a "Distributed Data" attribute, which will activate distributed data functionality under certain condition to store data in the storage system architecture in a distributed manner. According to one embodiment of the present invention, "Distributed Data" attribute is supported per Virtual Volume. According to another embodiment of the present invention, "Distributed Data" attribute is set for the Virtual Pool so that either all or none of the virtual volumes thereof supports the Distributed Data" functionality.

According to one embodiment of the present invention, each of the sections is allocated for a BAS SAL from different media extents in a round robin fashion.

For example, in the embodiments of FIG. 3A and FIG. 3D, the way that a VV1 requests more storage space from the VP is depicted as below using FIG. 4C and FIG. 4D. The virtualization layer retrieves available sections from RA-ME1, RB-ME1, and RC-ME1 in turn when an IO write request occurs for the first time. Assume that the IO request only needs to use 2 sections, and then the two sections with PSIs 001 and 101 will be assigned to VV1, as shown in FIG. 4C. After a while, when another IO write request from the host is received the storage space of VV1 is not enough. It is assumed that VV1 needs 5 sections, which have the PSI values 201, 002, and 102 as shown in FIG. 4D. Because the sections used in VV are substantially distributed uniformly with respect to MEs, the IO request from the host will be distributed over MEs to be executed so that the IO access from the host is distributed over the subsystems. Thus, the work loading of each subsystem is more balanced. Accordingly, the storage system architecture has the functionality of load balancing.

According to another embodiment of the present invention, when "Distributed Data" attribute is set for a virtual volume in the virtual pool to which the media extent is being added, then adding media extent to virtual pool engages operation of migrating some of the data in the BAS SAL to physical sections in the newly-added media extent. Details regarding Data Migration functionality will be explained later.

According to still another embodiment of the present invention, when the data in a physical section of a media extent is migrated to a physical section of another media extent, migration destination is determined by the "Distributed Data" attribute of the virtual volume with which the physical section is associated. Details regarding Data Migration functionality will be explained later.

In an embodiment of the present invention, the storage system architecture has the section migration functionality and the section migration functionality is activated under some situations.

According to one embodiment of the present invention, Data Section Migration operation is engaged when adding media extent to a virtual pool and "Distributed Data" attribute is set for any virtual volume.

According to another embodiment of the present invention, Data Section Migration operation is engaged during removal operation of media extent from virtual pool to free sections belonging to media extents being removed.

According to one embodiment of the present invention, the implementation points of the Data Migration functionality are as follows.

(1) Provide a physical—section-versus-virtual-section cross-referencing mechanism in the SAS for data section migration functionality. According to one implementation of the present invention, the physical-section-versus-virtual-section cross-referencing mechanism can be accomplished by providing a Physical-to-virtual (P2V) section index mapping table (P2V table). According to another implementation of the present invention, the physical-section-versus-virtual-section cross-referencing mechanism can be accomplished by providing a Physical-to-virtual (P2V) section index mapping table (P2V table) and a Virtual-to-physical (V2P) section index mapping table (V2P table). The Physical-to-virtual (P2V) section index mapping table and/or the Virtual-to-physical (V2P) section index mapping table consists of a Section Allocation List (SAL) in SAS. A SAS does not support section migration function if it did not contain P2V/V2P SAL.

(2) Interface between SAS Client (such as BAS SAL) and SAS management layer is done using virtual section indices, not physical section indices. This virtual section index will not change during section migration.

(3) A Virtual-to-physical section index mapping table serves to accelerate the conversion of virtual section indices to physical section indices. Each Host IO request accessing a data section of a BAS SAL (or VV) must reference the virtual-to-physical section index mapping table to find the physical section index where the actual data is located.

(4) During section migration, all SAS section data updates are paused. This is accomplished via a locking mechanism. Similarly, prior to acquiring the lock, migration daemon cannot proceed with migration.

(5) Conversion of virtual section indices to physical section indices may require reading meta-data and therefore becomes a blocking operation.

(6) In implementing the virtual section index, the SAS provides the client to use unchanging virtual section index (VSI) rather than the migrating physical section index.

(7) Physical to virtual mapping data is stored in a Section Allocation Table (SAT) of each media extent or in a separate table similar to a SAT. The purpose of maintaining a Physical-to-virtual mapping table is to speed up cross-referencing during migration and other maintenance operations.

(8) Virtual-to-physical mapping table is stored in a reserved SAL in the SAS. Virtual section indices are allocated based on available entries in the virtual-to-physical mapping table. During migration, only the section index mapping entries are modified. There is no need for SAS to modify section indices, as the SAS uses unchanging virtual indices for its clients.

(9) According to one implementation of the present invention, the Virtual-to-physical and Physical-to-virtual mapping tables are stored in duplicate to make sure media errors do not cause fatal loss of mapping information. According to another implementation of the present invention, the Virtual-to-physical and Physical-to-virtual mapping tables can be stored without a duplicated copy.

(10) According to one embodiment of the present invention, the SAS journaling covers the P2V/V2P mapping table SAL. According to another implementation, SAS journaling does not have to cover the P2V/V2P mapping table SAL.

In accordance with an embodiment of the present invention, if a new ME is added to a virtual pool (VP) and the VP has the "distributed data" attribute set, or if a ME might need to be removed from the VP, a section migration operation will be activated accordingly. In order to maintain an unchanging virtual section corresponding relationship between the VBI and its location index of each of the volume blocks in the ME (referring to FIGS. 4A and 4B) before and after the section migration operation, according to an embodiment of the present invention, a "virtual-to-physical (V2P) section index mapping table" (abbreviated as a V2P Table) and a "physical-to-virtual (P2V) section index mapping table" (abbreviated as a P2V Table) are adopted for recording the mapping relationship of the virtual indexes to the physical indexes and mapping relationship of the physical indexes to the virtual indexes, respectively.

Figure 5:
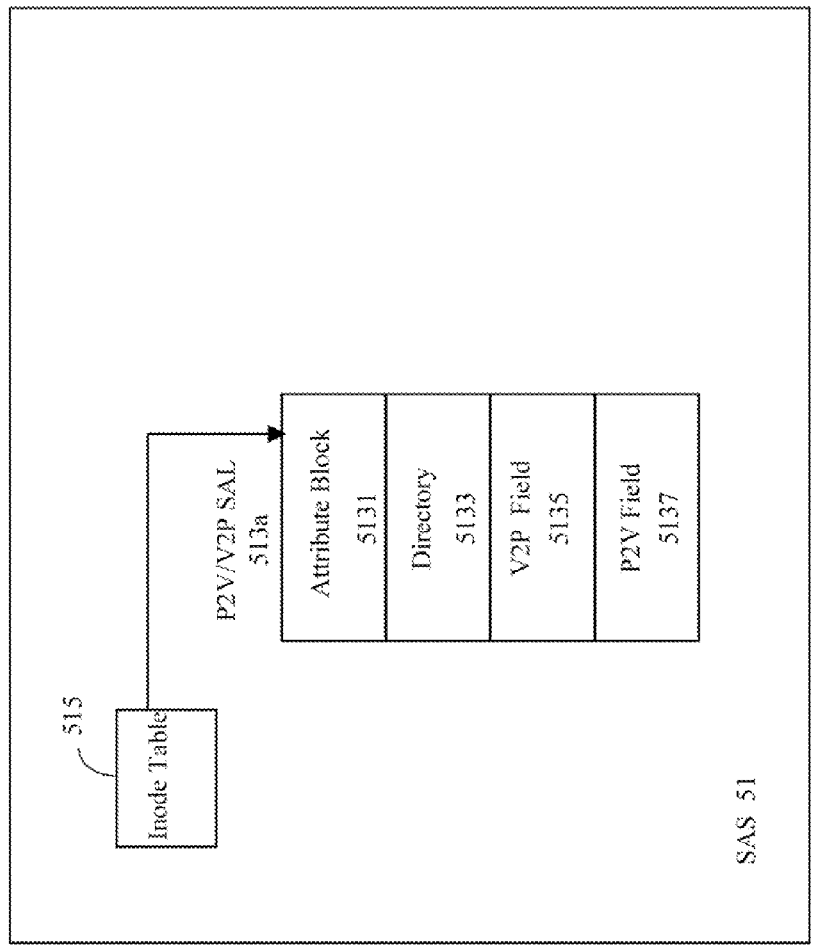
FIG. 5 is a diagram that depicts a data structure of a V2P table and a P2V table for a SAS of a virtual pool.

Please refer to FIG. 5. The V2P table and the P2V table in the SAS are stored in the form of a section allocation list (SAL) that corresponds to an Inode table. The SAL which stores the V2P table and the P2V table is specifically provided to the SAS itself for management usage, rather than presented to the host for data access. The SAL has an attribute block used to record information such as the SAS ID and other information related to its configuration, a directory field used to record reference and management information about the sections in the SAL, a field storing the V2P table, and a field storing the P2V table.

Figures 6A, 6B:
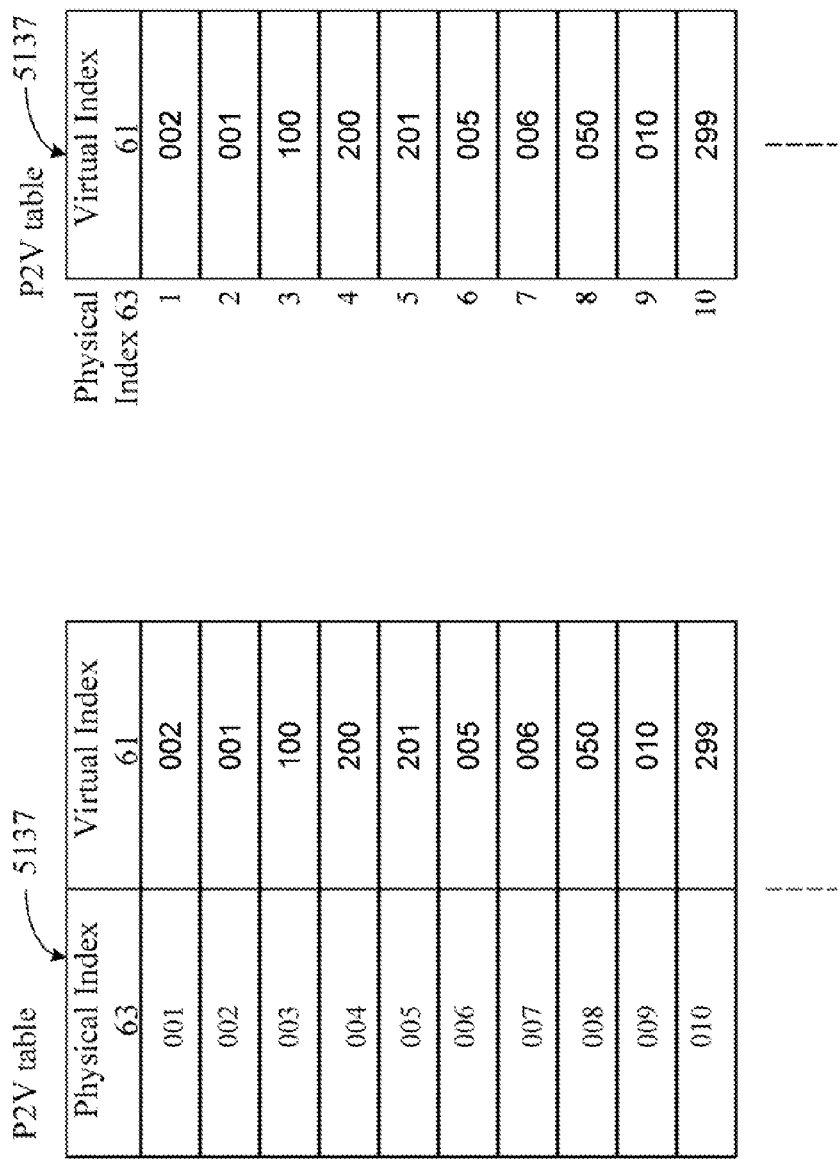
FIG. 6A is a diagram that depicts a P2V table 5137 of an embodiment of the present invention.
FIG. 6B is a diagram that depicts a P2V table 5137 of another embodiment of the present invention.

In accordance with an embodiment of the present invention, the data format of the P2V table 5137 is shown in FIG. 6A and FIG. 6B. Both of them record the mapping relationships between the physical index and the virtual index. The difference is in that, however, FIG. 6B does not have a field recording the virtual index like the one in FIG. 6A, but obtains the corresponding virtual index according to the sequence of the entries of the virtual index.

In accordance with an embodiment of the present invention, the data format of the V2P table 5135 is shown in FIG. 7A and FIG. 7B. Both of them record the mapping relationships between the virtual index and the physical index. The difference is in that, however, FIG. 7B does not have a field recording the virtual index like the one in FIG. 7A, but obtains the corresponding virtual index according to the sequence of the entries of the physical index.

For example, the present invention utilizes the V2P table 5135 and P2V table 5137 to maintain an unchanging virtual section mapping relationship between the VBI of each volume block index field 41 and the location index of the location index field 42 in the VV before and after the data section migration operation such that the block index information for the upper-layer application will not be affected while performing the data section migration operation. An example is taken as below to illustrate how to use V2P table 5135 and P2V table 5137 to maintain the unchanging virtual section corresponding relationship. Please refer to FIGS. 4A and 4B. Assume that the host 10 issues an I/O request to the virtualization layer 202A of the volume block of VBI=001 for data access. First, in the virtualization layer 202A, the BAB entry corresponding to VBI=001 is checked to get aware that the volume block of VBI=001 has been used by the VV1. Then a location index corresponding to VBI=001 is found to be 001. In the situation that there is the V2P table 5135, the location index in FIGS. 4A and 4B corresponds to the virtual index 61 in FIGS. 6A and 6B. Accordingly, the physical index 63 corresponding to the virtual index 61 that equals to 001 ("1" depicted in the figures) is found to be 002. With the physical index, a table such as one shown in FIG. 3C or 3D can be looked up, or a specific calculation rule or formula is performed to obtain the physical section location corresponding to the physical index 63 equal to 002. Taking FIG. 3D as an example, in which the physical index 63 is represented as PSI 81, by looking up the table (or performing a specific calculation rule or formula instead) the physical section location corresponding to the physical index 63 equal to 002 is obtained and which is located at 100 successive sectors with the starting address (LBA) of 101 and with the ME ID of RA-ME1. If the data in the master subsystem 20A is migrated to another ME (such as RB-ME1), the physical index 63 in the V2P table 5135 will be changed according to the migration operation. For example, the physical index 63 corresponding to the virtual index 61 equal to 001 ("1" depicted in the figures) may be changed from 002 to PSI=101. Therefore, the virtual corresponding relationship between the VBI and the location index does not change, and the new data location after the migration operation can still be successfully found by the conversion using the V2P table 5135. For example, the new data location moves to the 100 successive sectors with the starting address (LBA) of 001 and with the ME ID of RB-ME1.

Figure 8A:
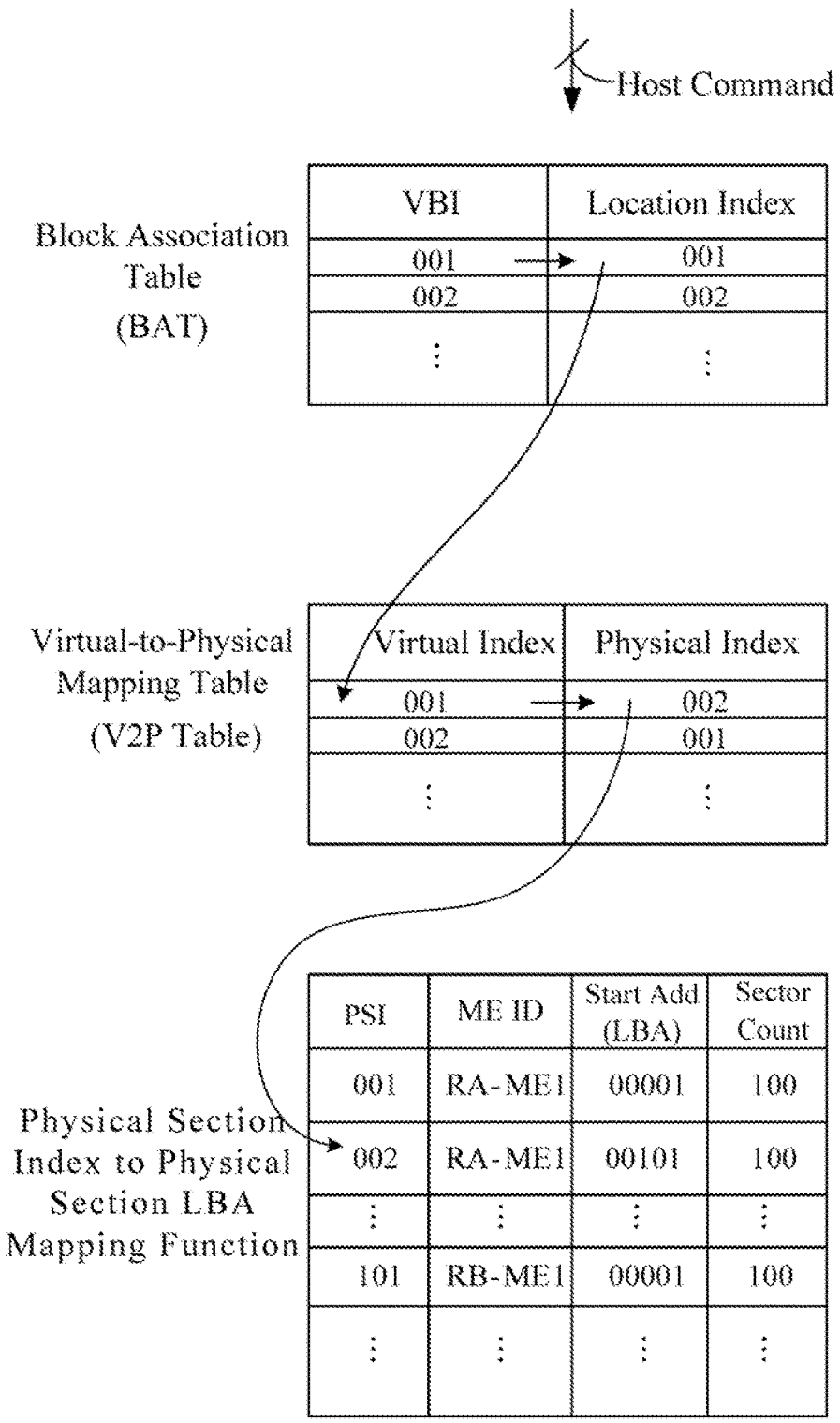
FIG. 8A is a diagram that depicts a mapping relationship between the VBI and its corresponding physical section LBA when the V2P table exists.

Please refer to FIG. 8A which is a diagram that depicts a mapping relationship between the VBI and its corresponding physical section LBA when the V2P table exists. In a master subsystem with the V2P table, the virtualization layer uses the block association table (BAT), the V2P table, and the physical section index to physical section LBA mapping function (or table) 8 to obtain the mapping relationship between the VBI and its corresponding physical section LBA. When a VBI is given, the corresponding location index is found by using the BAT, and the virtual index of the V2P table is found according to the location index, and then the corresponding physical index is found, and the physical index is used as the section index to find the corresponding physical section address by using the physical section index to physical section LBA mapping function.

The following explanations describe how to use the aforementioned the mapping relationship between the VBI and its corresponding physical section LBA to obtain from a LBA in a host command its corresponding physical section LBA and sector address. When a master subsystem receives a command from a host, the LBA carried in the command (for example, the LBA of an IO access command or the LBA to be queried in a data location query command) is converted into its corresponding VBI and related address information (such as section information and/or sector information). Then the physical LBA corresponded to the VBI is found by using the aforementioned method, and the corresponding sector address is found by using the related address information (such as the section information and/or the sector information).

Figure 8B:
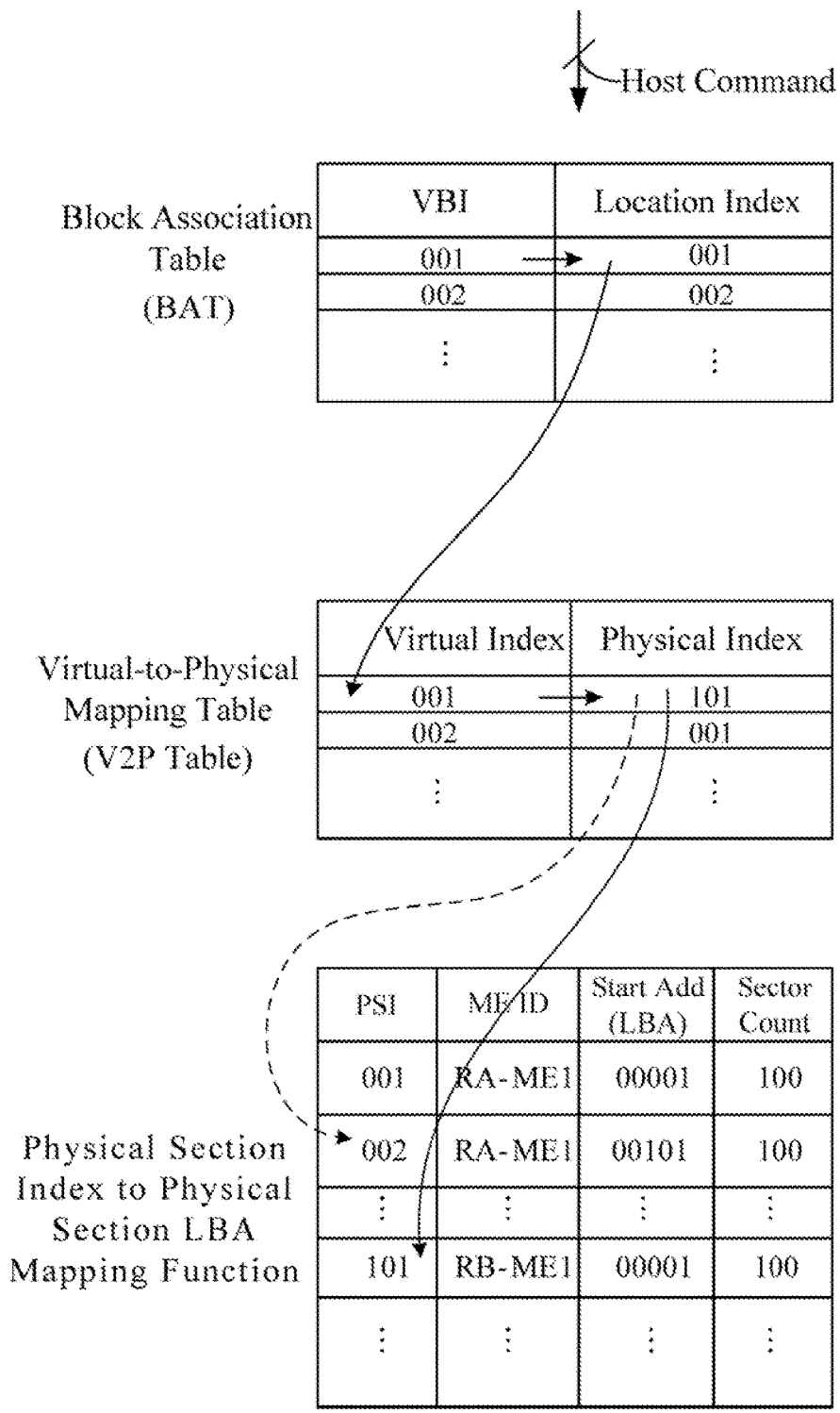
FIG. 8B is a diagram that depicts the change of the mapping relationship between the VBI and its corresponding physical section LBA when migration of the data section occurs.

Please refer to FIG. 8B, which is a diagram that depicts the change of the mapping relationship between VBI and its corresponding physical section LBA when migration of the data section occurs. When the migration of the data in a virtual pool occurs after the state of FIG. 8A, if the data located in a section is migrated from one sector of PSI=002 of RA-ME1 to another sector of PSI=101 of RB-ME, the physical index is changed from 002 into 101 in the V2P table but the BAT does not change.

Figure 8C:
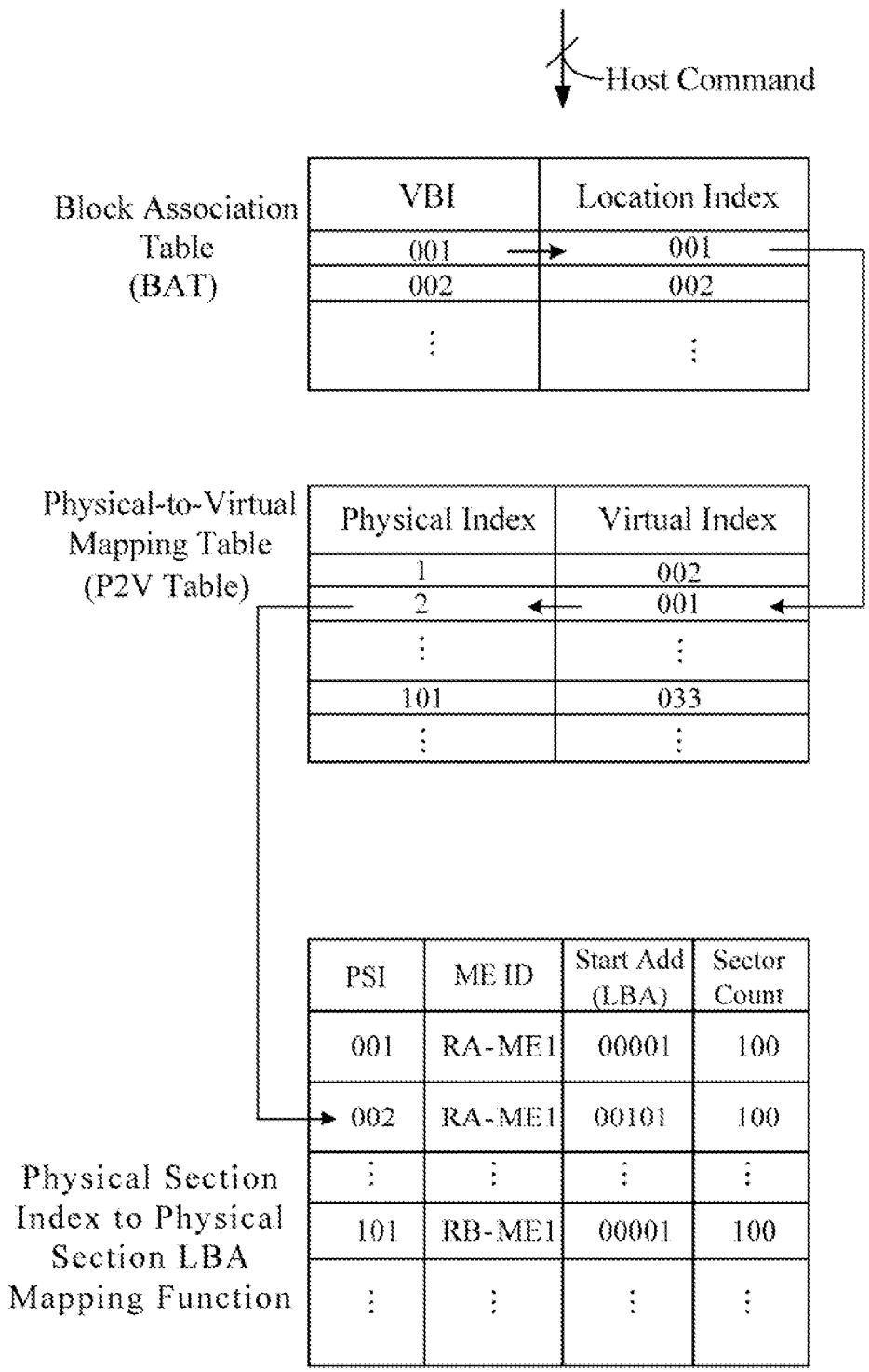
FIG. 8D is a diagram that depicts change of the mapping relationship between VBI and its corresponding physical section LBA when only the P2V table exists but the V2P table does not exist while migration of the data section occurs.

Please refer to FIG. 8C, which is a diagram that depicts the mapping relationship between VBI and its corresponding physical section LBA when only the P2V table exists but the V2P table does not exist. In a master subsystem with P2V table, the virtualization layer uses the block association table (BAT), the P2V table, and the physical section index to physical section LBA mapping function to obtain the mapping relationship between the VBI and its corresponding physical section LBA. When a VBI is given, the corresponding location index is found by using the BAT, and the virtual index of the P2V table is found according to the location index, and then the corresponding physical index is found, and the physical index is used as the section index to find the corresponding physical section address by using the physical section index to physical section LBA mapping function. Since the virtual index value is recorded in the P2V table according to the sequence of the physical index, there is no way to find out in the P2V table a virtual index that is the same as the location index directly, and the contents of the physical indices have to be retrieved to compare with the location index.

Please refer to FIG. 5D, which is a diagram that depicts change of the mapping relationship between VBI and its corresponding physical section LBA when only the P2V table exists but the V2P table does not exist while migration of the data section occurs. When the data located in a section is migrated from one sector of PSI=002 of RA-ME1 to another sector of PSI=101 of RB-ME1, the original corresponding in the P2V that physical index=002 corresponds to virtual index=001 is changed into that physical index=101 corresponds to virtual index=001 table but the BAT does not change.

Figure 8D:
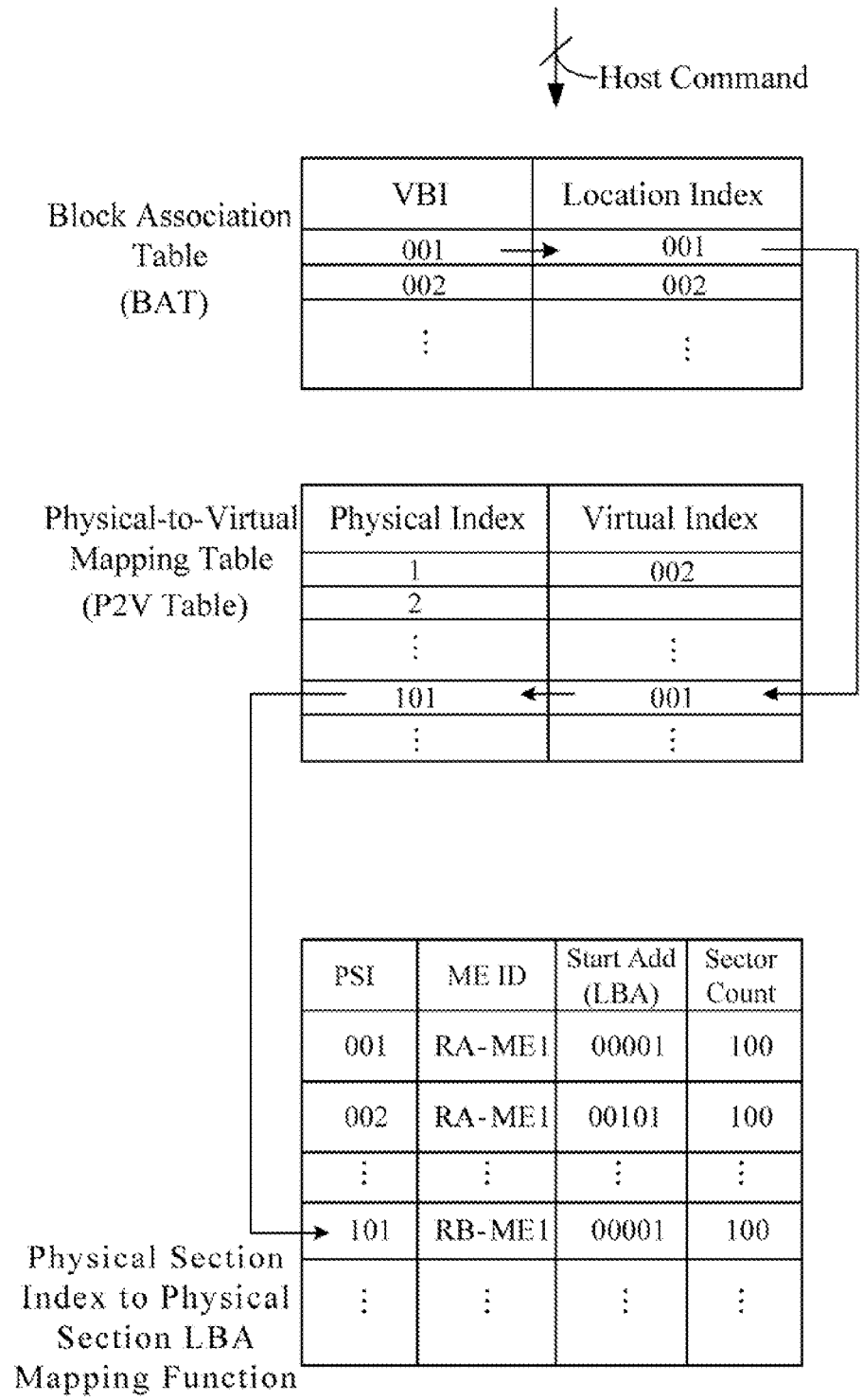

From FIG. 8C and FIG. 8D, it can be known that when if we search the PI value that corresponds to VI=001, we may find it faster when PI=002 but slower when PI=101. This is because that the VI values shown in FIG. 8C and FIG. 5D are arranged at random so that the contents of the physical indices have to be retrieved to compare with the location index while searching, which costs more time.

It should be noted that, in an embodiment of the present invention, if the migration operation is not a consideration and no V2P table 5135 or P2V table 5137 is involved, the location index shown in FIGS. 4A and 4B is the physical section index (PSI), i.e., the PSI shown in FIGS. 3C and 3D.

Figure 12A:
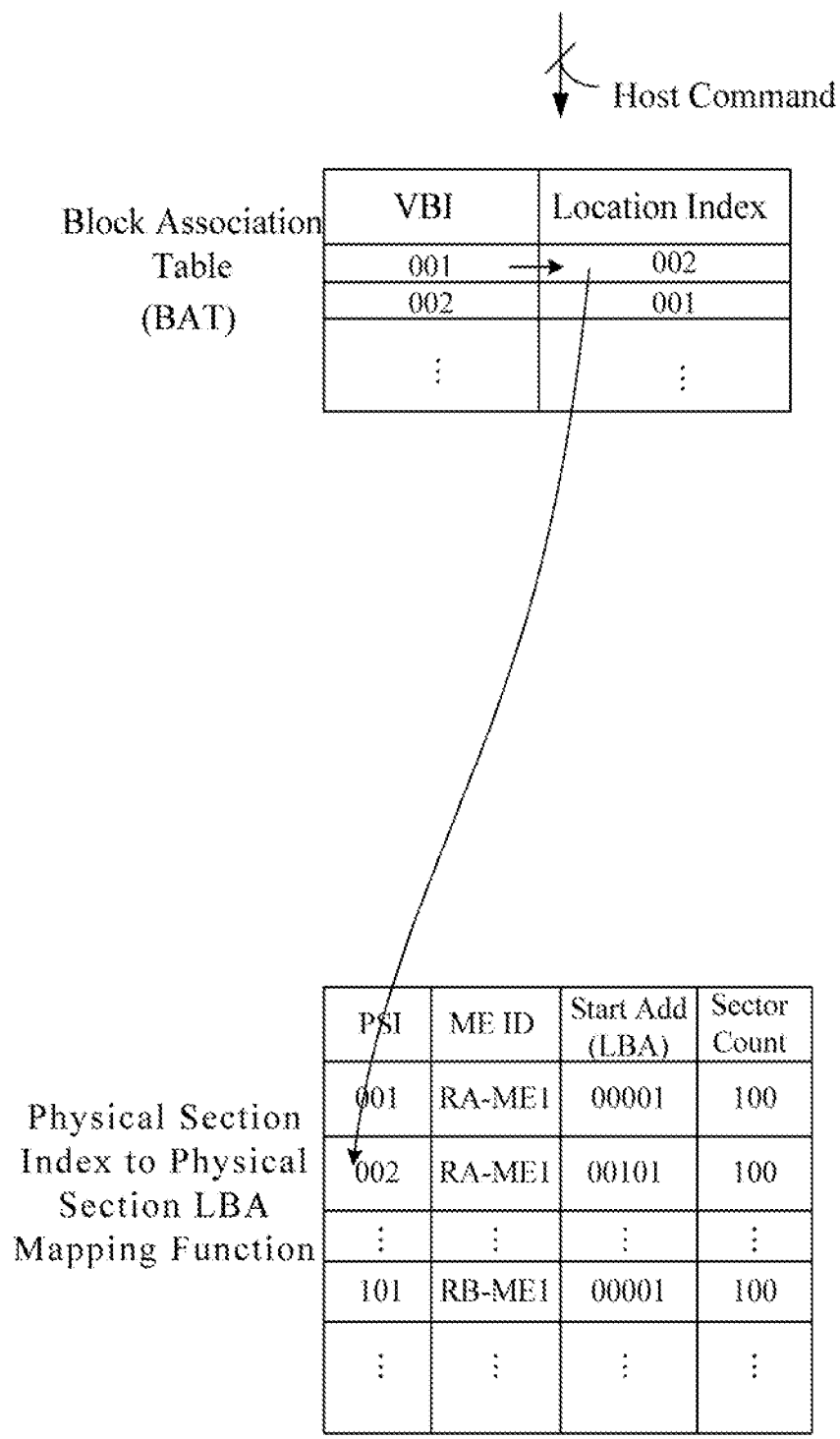
FIG. 12A is a diagram that depicts the mapping relationship between the VBI and its corresponding physical section LBA when the P2V table and the V2P table do not exist.

Please refer to FIG. 12A, which is a diagram that depicts the mapping relationship between the VBI and its corresponding physical section LBA when the P2V table and the V2P table do not exist. In a master subsystem without the P2V table and the V2P table, the virtualization layer uses the block association table (BAT) and the physical section index to physical section LBA mapping function to obtain the mapping relation between the VBI and its corresponding physical section LBA. When a VBI is given, the corresponding location index is found by using the BAT, and the corresponding physical section LBA is found according to the location index by using the physical section index to section physical LBA mapping function.

The following explanations describe how to use the aforementioned the mapping relationship between the VBI and its corresponding physical section LBA to obtain from a LBA in a host command its corresponding physical section LBA and sector address. When a master subsystem receives a command from a host, the LBA carried in the command (for example, the LBA of an IO access command or the LBA to be queried in a data location query command) is converted into its corresponding VBI and related address information (such as section information and/or sector information). Then the physical LBA corresponded to the VBI is found by using the aforementioned method, and the corresponding sector address is found by using the related address information (such as the section information and/or the sector information).

Figure 12B:
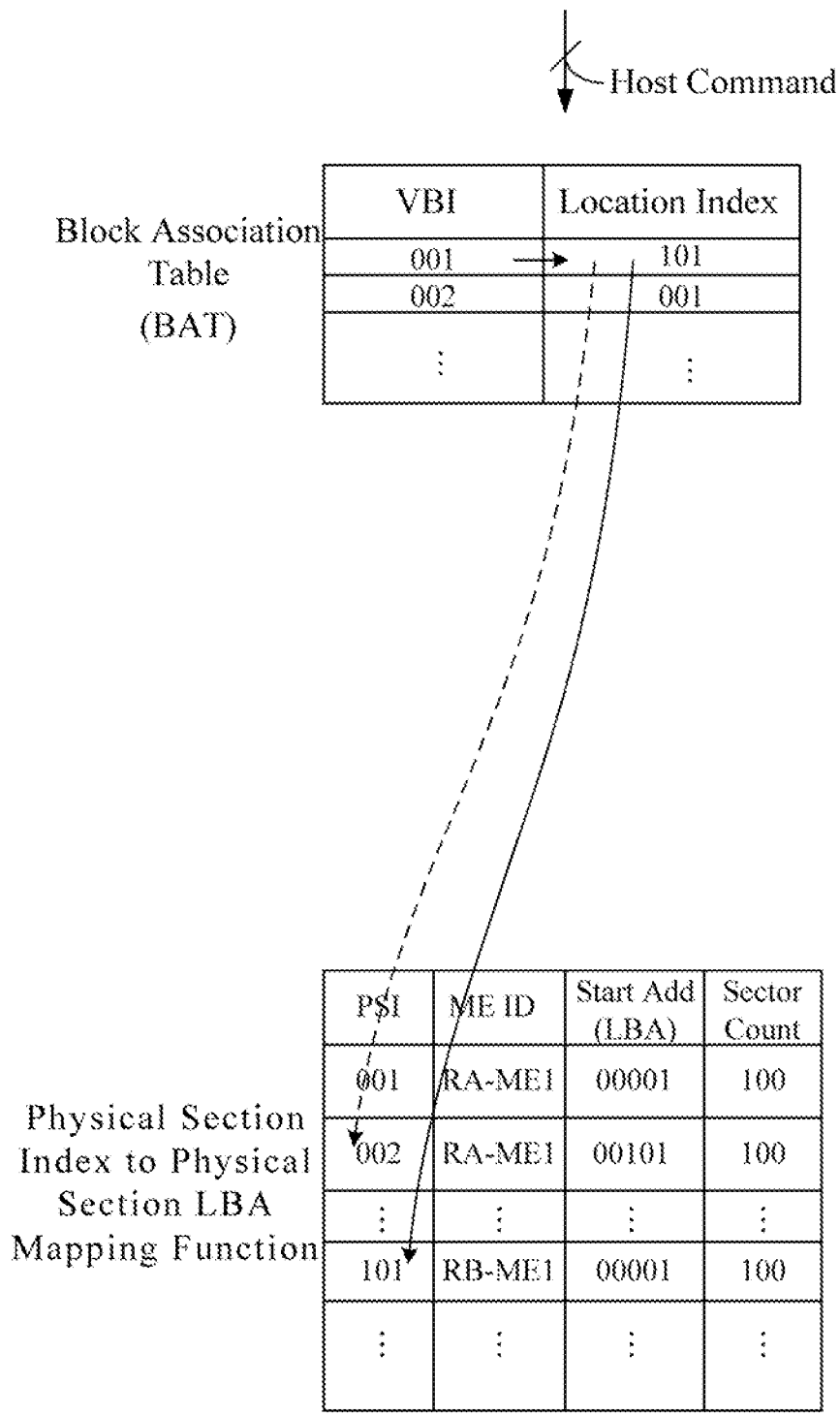
FIG. 12B is a diagram that depicts change of the mapping relationship between the VBI and the physical LBA while the migration of the data section occurs, when the P2V table and the V2P table do not exist.

When it is needed to change the mapping relationship between the VBI and the physical LBA while the migration of the data section occurs, if there is a P2V table or a V2P table, it is needed only to change the mapping relationship between the virtual index and the physical index, in the P2V table and the V2P table, even if there are some other data structures in the SAS that will use the location indices to map physical section LBA, as shown in FIGS. 8B and 8D. It is needed to change the mapping relationship between the VBI and the location index in the BAT when there is no P2V table or V2P table, as shown in FIG. 12B.

However, if there are some other data structures in the SAS which will use the VBI and the location index to map a physical section location (such as another BAT), it is needed to change the mapping relationship between the VBI and the location index in all the data structures. Meanwhile, since there is no specific data structure existed for recording in which data structure (such as a BAT) the location index needed to change is used, the SAS has to scan all the data structures (such as all the BATs) that have the location indexes to find out whether or not there is any location index needed to change, and changes the location index in each data structure after finding it out. Therefore, the system performance will degrade seriously, which could be too low to be accepted by users.

Figure 21:
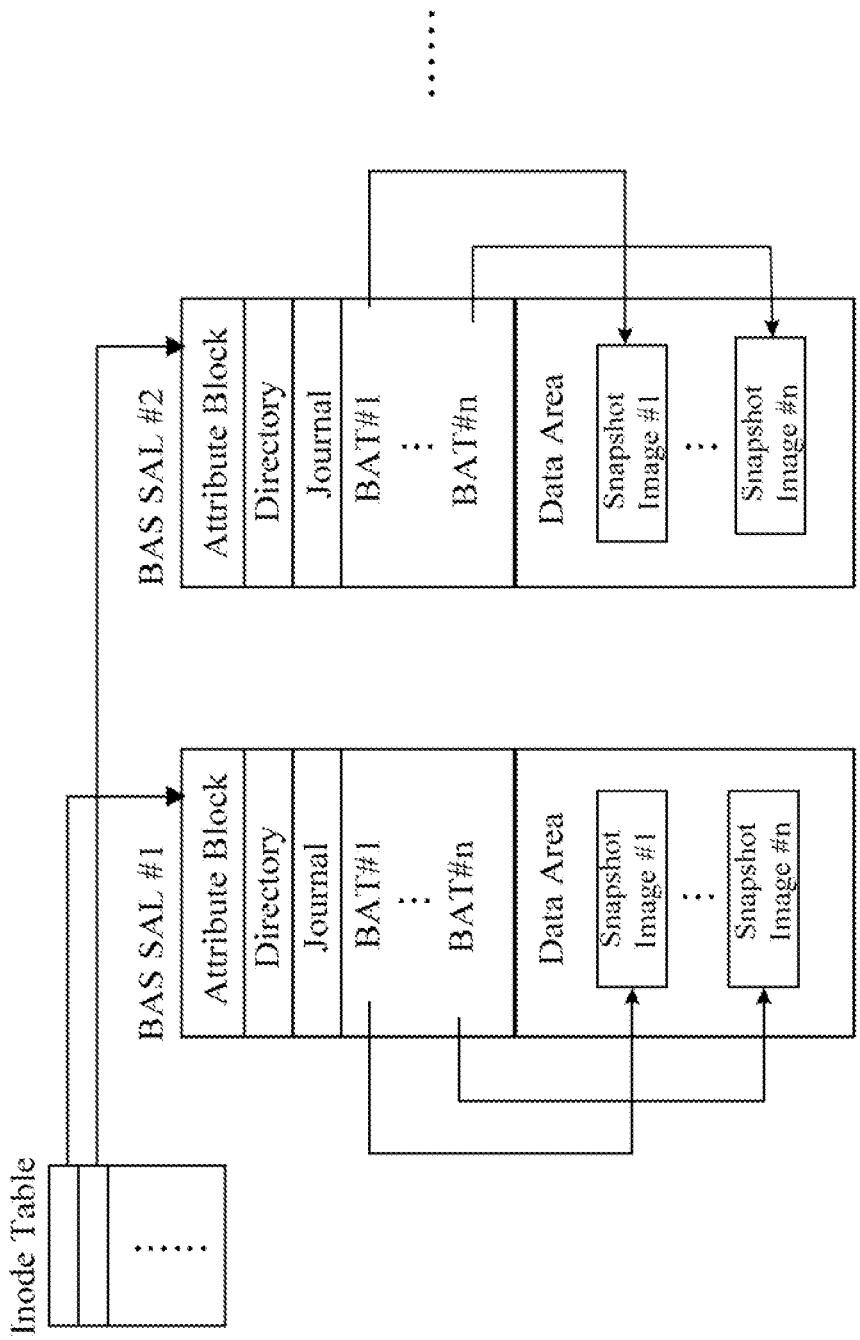
FIG. 21 is a data structure of a virtual volume snapshot according to an embodiment of the present invention.

Please refer to FIG. 21, which is a data structure of a virtual volume snapshot according to an embodiment of the present invention. The SAS 221 may comprise one or more BAS SAL, such as BAS SAL#1, BAS SAL#2, etc., and an inode table, which are the basis for performing point-in-time (PIT for short) image backup. The BATs (block association tables) is stored in the BASs, for storing cross-referencing information in order to correspond to backup data with the original storage addresses. That is, each BAT stores the information on the corresponding PIT Snapshot-Image to which it points. The backup data (Snapshot Image) is also stored in the BAS.

According to one embodiment of the present invention, the BAS SAL further contains: an attribute block which stores information on the BAS SAL ID, BAS SAL size, and BAS SAL-related settings; a directory field which stores reference and management information about the sections in the BAS SAL; a journal field which stores operation journal for data recovery when the system is breakdown or is power failure.

Since the virtual volume snapshot also records the mapping relation between the VBI and the location index by using the BAT, when the migration of the data section occurs and thus the mapping relationship between the VBI and physical LBA changes, all of the BATs have to be scanned again to find out whether or not there is any location index needed to change, and the location index in each data structure has to be changed after finding it out.

The subsystems 20A, 20B, 20C shown in FIG. 10 play both the roles of a master subsystem and a slave subsystem. The ME server layers 203A, 203B, 203C of the respective subsystems 20A, 20B, 20C will record, for each ME in the RAID layer 204A, 204B, 204C of the same subsystem on which the ME server layer resides, the master subsystem with which that ME is associated, and present the MEs in the RAID layer 204A, 204B, 204C of the same subsystem on which the ME server layer resides. The ME server layers 203A, 203B, 203C of the subsystems 20A, 20B, 20C will find out the MEs associated with the virtualization layers 202A, 202B, 202C themselves, respectively, for management and usage by their own virtualization layers 202A, 202B, 202C, respectively. Assume that the virtualization layer 202A generates a VP-A 100A, the virtualization layer 202B generates a VP-B 100B, and the virtualization layer 202C generates a VP-C 100C. Accordingly, the ME server layer 203A records that RA-ME1 is associated with the subsystem 20A, and RA-ME2, RA-ME3, RA-ME4 are associated with the subsystem 20C; the ME server layer 203B records RB-ME1 is associated with the subsystem 20A, and RB-ME5, RB-ME6 are associated with the subsystem 20C; and, the ME server layer 203C records RC-ME1 is associated with the subsystem 20A, and RC-ME2, RC-ME3, RC-ME6 are associated with the subsystem 20B.

The aforementioned storage system architectures are applications for storage virtualization of the present invention. Further, in accordance with an embodiment of the present invention, the storage system architectures may be implemented with the data migration functionality. The descriptions about the data migration functionality in the present invention are provided below.

Although in all the foresaid embodiments, only one host 10 is connected to a master subsystem 20A, a plurality of hosts 10 can be connected to a master subsystem 20A in accordance with other embodiments of the present invention.

Figure 13:
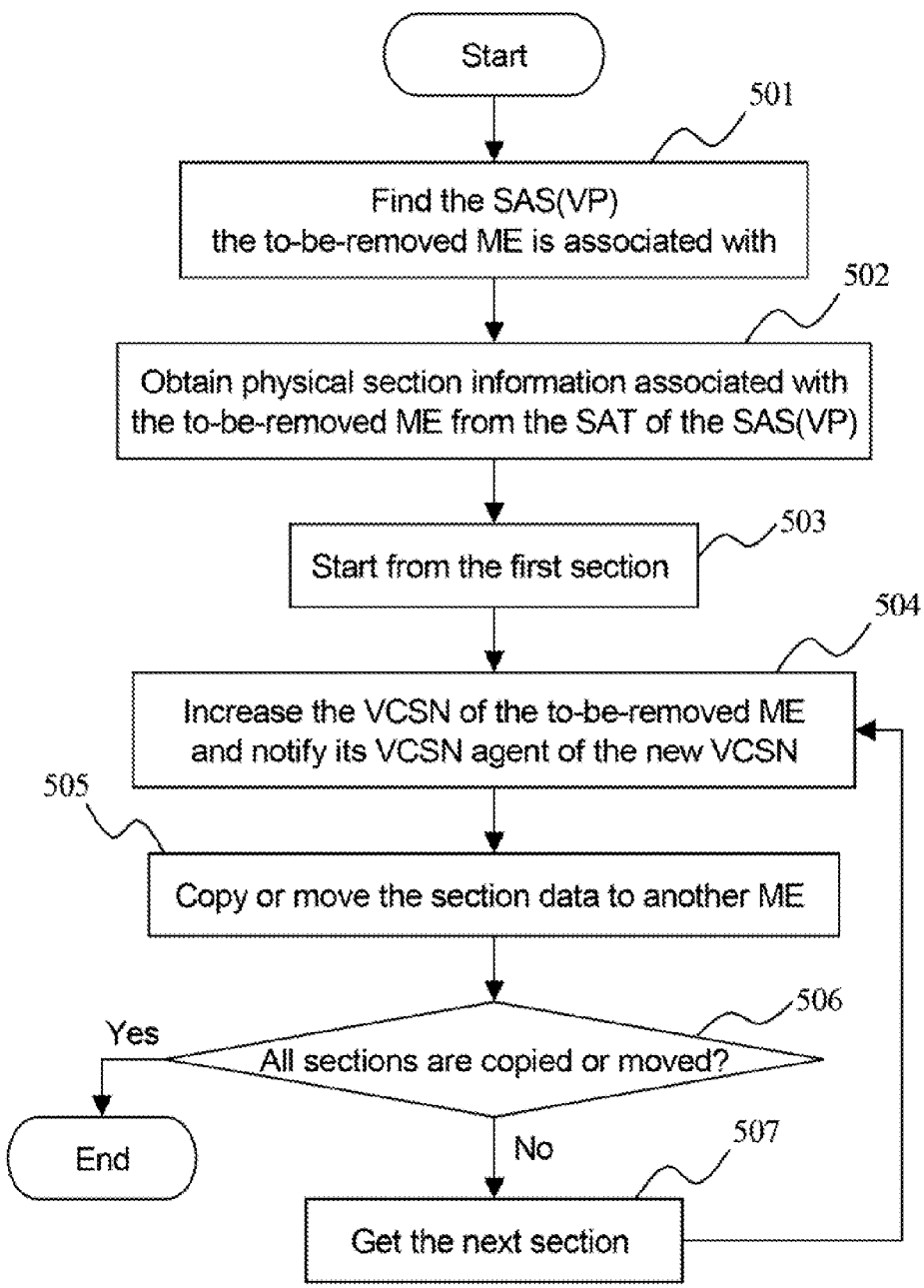
FIG. 13 is a flow chart that depicts a migration operation caused by the removal of ME(s) according to an embodiment of the present invention.

FIG. 13 is a flow chart that depicts a migration operation caused by the removal of ME according to an embodiment of the present invention. In this embodiment, when the virtualization layer 202A of the master subsystem 20A receives a removing message corresponding to a to-be-removed media extent, the following steps will be performed. The first, in step 501, the procedure finds out the SAS (VP) associated with the to-be-removed ME. The search process of step 501 can be started from any SAS (VP). If a SAS (VP) is determined that it is not the search target, the procedure gets a next SAS (VP) to check. In another embodiment, a plurality of SASs (VPs) may be checked at the same time. In step 502, after the SAS (VP) associated with the to-be-removed ME is found out, the physical section information associated with the to-be-removed ME is obtained from the SAT of the SAS (VP). In step 503, according to the physical section information obtained, find a first section for starting the migration operation. In step 504, the virtualization layer first increments the VCSN of the to-be-removed ME by 1 and notifies its VCSN agent of the subsystem associated with the to-be-removed ME, of the new VCSN, before performing the migration operation for the section. In step 505, after finishing the operations relative to updating the VCSN, it is started to copy or move the data in the section contained in the to-be-removed ME to another ME. In step 506, the procedure determines whether all the data in the sections contained in the to-be-removed ME has been copied or moved to another one or more MEs. If the data in all the sections contained in the to-be-removed ME has been copied or moved to another one or more MEs, the to-be-removed ME can be removed and thus the procedure is finished. Otherwise, in step 506, if copying or moving the data in all the sections contained in the to-be-removed ME to another one or more MEs has not been finished, step 507 is executed to get the information about the next section, and then step 504 to step 506 are repeatedly performed.

Figure 14:
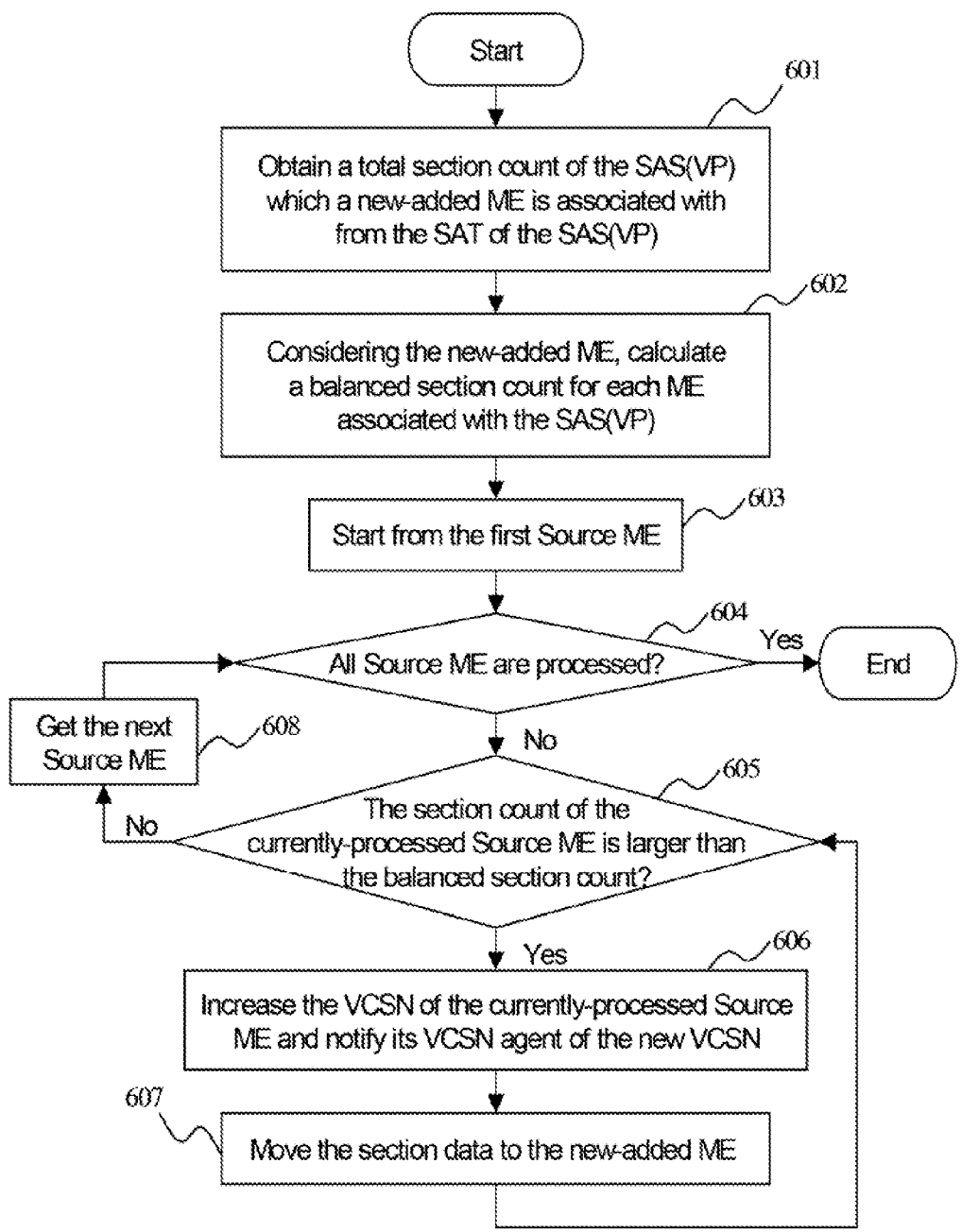
FIG. 14 is a flow chart that depicts a migration operation caused by the addition of the ME(s) according to an embodiment of the present invention.

FIG. 14 is a flow chart that depicts a migration operation caused by the addition of the ME according to an embodiment of the present invention. In this embodiment, when the virtualization layer 202A of the master subsystem 20A receives a new-adding message that a new ME is added into a SAS (VP), the following steps will be performed. First, in step 601, the procedure finds out the SAS (VP) associated with the new-added ME according to the new-adding message. Next, a total section count of the used sections of all the MEs in the SAS (VP) is first calculated. This information can be obtained from the SAT of the SAS (VP). In step 602, the procedure uses the total section count and the physical section count and MEs (including the new-added ME) to calculate a balanced section count for each ME associated with the SAS (VP). In step 603, the procedure selects a source ME to process, in which the source MEs means the original MEs in the SAS (VP). In step 604, the procedure determines whether all the source MEs are processed. If the determination result is YES in step 604, this procedure is ended. If the determination result is NO in step 604, the procedure goes to step 605. In step 605, the procedure determines whether the section count of the currently-processed source ME is larger than the balanced section count. If the determination result is YES in step 605, the procedure goes to step 606 for updating a validity check sequence number (VCSN) of the source ME, including incrementing the VCSN of the source ME and notifying a VCSN agent associated with the source ME, of its incremented VCSN. Then, in step 606, the data in the section of the source ME is copied or moved to the new-added ME (target ME). After finishing the aforementioned operations, the used section count of the ME decreases due to the removal of the data section, and then the operations return to step 605 to continue the procedure of determining whether the section count of the used section is larger than the balanced section count. If the determination result is YES, steps 606 and 607 are repeated. If the determination result is NO, i.e., the section count of the currently-processed ME is not larger than the balanced section count, step 608 is executed to get a next ME. Then, the procedure returns to step 604 to determine whether all the MEs have been finished processing, and then to repeat the determination and the process hereafter.

The flowcharts depicted in FIG. 13 and FIG. 14 are just for the situation that only one ME is removed or added. If the procedure of FIG. 13 or FIG. 14 is still going on when a first ME is removed or added, meanwhile a second ME is further removed or added, according to an embodiment of the present invention, the procedure of FIG. 13 or FIG. 14 will be restarted due to the removal or addition of the second ME. In the procedure of FIG. 14, since the first added ME has received some section data removed from other MEs, the first added ME, relative to the second added ME, may play a role of a source ME for transmitting data.

Figure 15:
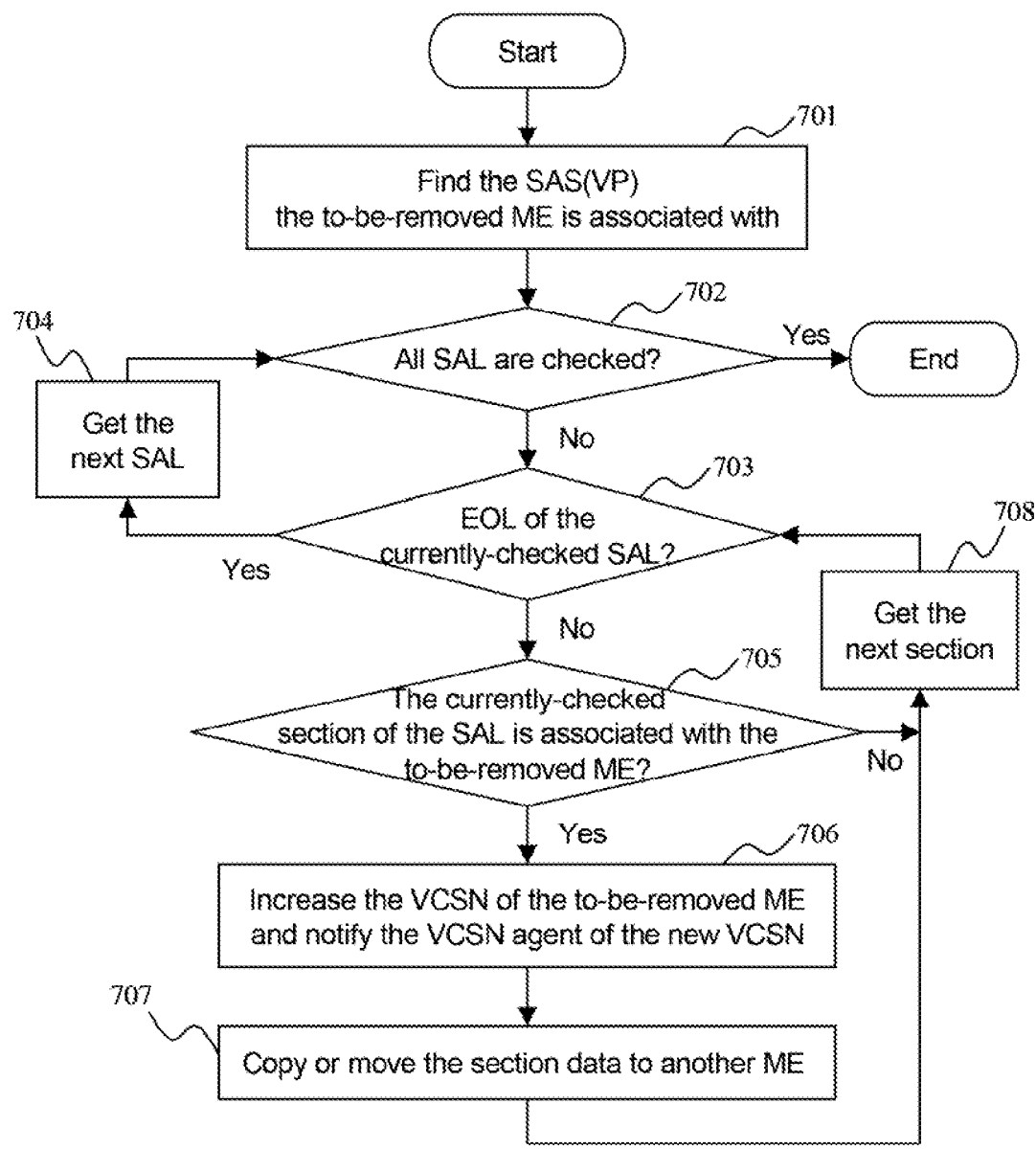
FIG. 15 is a flow chart that depicts a migration operation caused by the removal of ME(s) according to another embodiment of the present invention.
Figure 16:
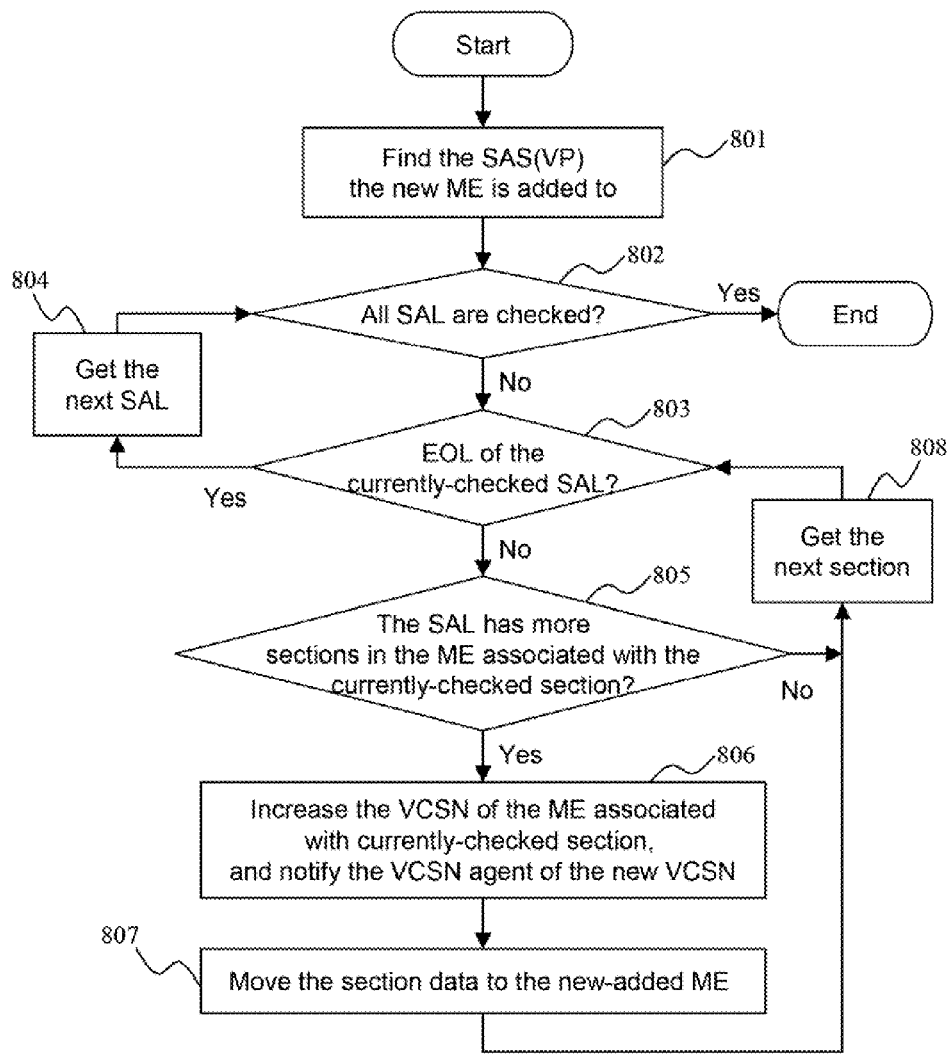
FIG. 16 is a flow chart that depicts a migration operation caused by the addition of the ME(s) according to another embodiment of the present invention.

It is noted that FIG. 13 and FIG. 14 illustrate migration operations based on the ME, while the following FIG. 15 and FIG. 16 illustrate migration operations based on the SAL.

Please refer to FIG. 15, which is flow chart that depicts a migration operation caused by the removal of ME(s) according to another embodiment of the present invention. In this embodiment, when the virtualization layer 202A of the master subsystem 20A receives a removing message corresponding to a to-be-removed ME, the following steps will be performed. The first, in step 701, the procedure finds out the SAS (VP) associated with the removing message. The search process of step 701 can be started from any SAS (VP). If a SAS (VP) is determined that it is not the search target, the procedure gets a next SAS (VP) to check. Alternatively, a plurality of SASs (VPs) may be checked at the same time. In step 702, after the SAS (VP) associated with the to-be-removed ME is found out, determine whether all the BAS SALs associated with the SAS (VP) have been checked. If the determination result is YES in step 702, the to-be-removed ME will be removed and the procedure is finished. If the determination result is NO in step 702, step 703 is executed. That is, when there is one or more BAS SALs which have not been checked, one of the BAS SALs is selected to check. If the determination result is YES in step 703, step 704 is executed to get information about another BAS SAL, and then the procedure returns to step 702. If the determination result is NO in step 703, step 705 is executed to determine whether the currently-checked section in the BAS SAL is associated with the to-be-removed ME. If the determination result is YES in step 705, the currently-checked section is associated with the to-be-removed ME. Then step 706 is executed, and the virtualization layer 202 increments a validity check sequence number (VCSN) of the to-be-removed media extent and notifies the VCSN agent associated with the to-be-removed media extent, of its incremented VCSN. After finishing updating the related VCSN, step 707 is executed, data of the currently-checked section is copied or moved to one of other MEs. Then, in step 708, the procedure gets information of a next section, and returns to step 703, and repeats step 703 to step 708. In step 705, if the determination result is NO, the currently-checked section is not associated with the to-be-removed ME. Then step 708 is executed to get information about a next section and to repeat the process hereafter.

FIG. 16 is a flow chart that depicts a migration operation caused by the addition of the ME(s) according to another embodiment of the present invention. When the virtualization layer 202A of the master subsystem 20A receives a new-adding message that a new ME is added into a SAS (VP), the following steps will be performed. First, the procedure finds out the SAS (VP) associated with the new-added ME. The search process can be started from any SAS (VP). If a SAS (VP) is determined that it is not the search target, the procedure get a next SAS (VP) to check. In another embodiment, a plurality of SASs (VPs) may be checked at the same time. In step 801, the procedure finds out the SAS associated with the new-added ME according to the new-adding message. In step 802, the procedure determines whether all BAS SALs associated with the section allocation system are checked. If the determination result is YES in step 802, the checking of all the BAS SALs is finished and the procedure is ended. However, if the determination result is NO in step 802, the checking of all the BAS SALs is finished and thus step 803 is executed. In step 803, one of the BAS SALs is selected to be checked to determine whether end of link (EOL) of the currently-checked BAS SAL is reached. If the determination result is YES in step 803, step 804 is executed to get information about another BAS SAL, and the procedure returns to step 802. If the determination result is NO in step 803, step 805 is executed and the procedure further determines whether the BAS SAL has more sections in the ME associated with the currently-checked section than the balanced section count. If the determination result is YES, a used section count of a media extent associated with the currently-checked section is larger than a section count of the new-added media extent. Then step 806 is executed to increment a validity check sequence number (VCSN) of the processing media extent and to notify a VCSN agent associated with the processing media extent, of its incremented VCSN. After finishing updating the related VCSN, step 807 is executed, and data of the section is copied or moved to the new-added ME. Then, in step 808, the procedure gets information about a next section, and returns to step 803, and repeats step 803 to step 807. In step 805, if the determination result is NO, the used section count of the media extent associated with the currently-checked section is not larger than the section count of the new-added media extent. Then step 805 is executed to get information about a next section and to repeat the process hereafter.

The flowcharts depicted in FIG. 15 and FIG. 16 are just for the situation that only one ME is removed or added. If the procedure of FIG. 15 or FIG. 16 is still going on when the first ME is removed or added, meanwhile a second ME is further removed or added, according to an embodiment of the present invention, the procedure of FIG. 15 or FIG. 16 will be restarted due to the removal or addition of the second ME. That is, all the BAS SALs in the SAS (VP) have to be re-checked.

During the process of the migration operation, the host may send IO request to the MEs which are proceeding with the migration operation at any time for reading/writing data. In order to avoid error data being accessed during the migration operation, in an embodiment of the present invention, a VCSN (Validity Check Sequence Number) is set for each ME. Each time before the data in a physical section of the ME is migrated, the virtualization layer of the master subsystem has to update the VCSN of the ME first and to notify the VCSN agent of the subsystem associated with the ME, such that the VCSN agent can determine the validity of the IO request according to the VCSN.

Figure 17:
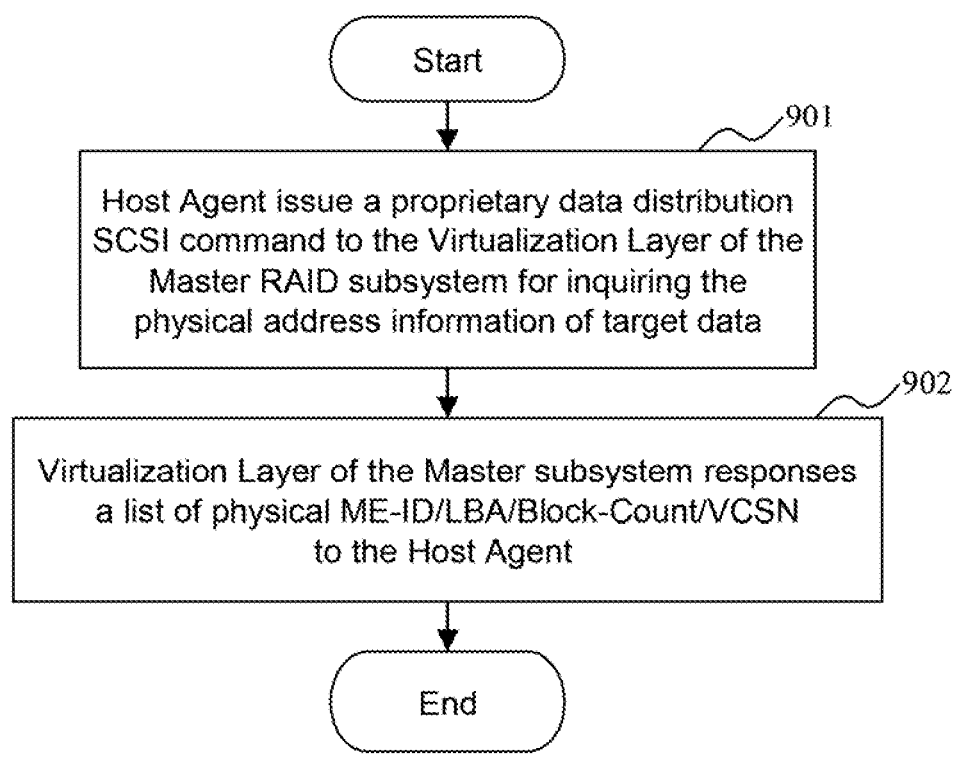
FIG. 17 is a flow chart that the host 10 or the host agent 110 inquires the virtualization layer 202A of the master subsystem 20A about the VCSN according to an embodiment of the present invention.
Figure 18:
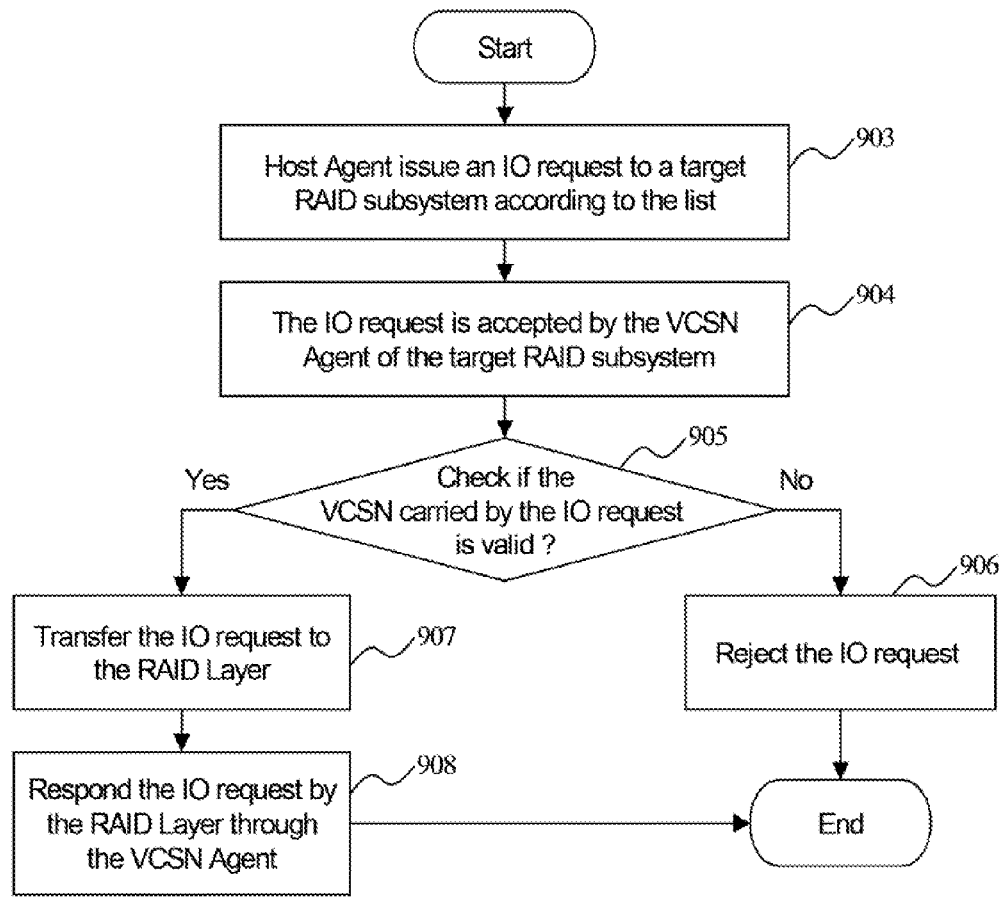
FIG. 18 is a flow chart illustrating that the VCSN agent which receives the IO request check the validity of the VSCN carried by the IO request according to an embodiment of the present invention.

FIG. 17 is a flow chart that the host 10 or the host agent 110 inquires the virtualization layer 202A of the master subsystem 20A about the VCSN according to an embodiment of the present invention. FIG. 18 is a flow chart illustrating that the VCSN agent which receives the IO request check the validity of the VSCN carried by the IO request according to an embodiment of the present invention. It should be noted that the IO request is sent from the host 10 or the agent 110 included in the host 10. The following is an illustration that the agent 110 sends IO request. People skilled in this field would understand that the agent 110 can be replaced by the host 10 to the send IO requests, or, in the view of a RAID subsystem, the IO requests are sent from the host 10.

Please refer to FIG. 17 together with FIG. 9. In step 901, the host agent 110 issues a proprietary data distribution query SCSI command to the virtualization layer 202A of the master subsystem 20A for inquiring the physical location information of the target data to be accessed. In step 902, the virtualization layer 202A responds a list of physical ME-ID/LBA/block-count/VCSN to the host agent 110 after receiving the inquiry command, in which the list cover the inquired range. Then, this inquiring procedure goes to the end. In an embodiment of the present invention, before responding in step 902, it is necessary to check whether the ME containing the target data inquired by the host agent 110 is in the process of a migration operation or not. If YES, the master subsystem 20A either delays the response until the migration operation of the data section is complete and returns a "Busy" message to the host agent 110 indicating it should retry at a later time, or returns an indication (e.g., reserved VCSN) that IO requests should be issued to the master subsystem 20A.

Please refer to FIG. 18 together with FIG. 6. In step 903, the host agent 110 issues an IO request to a target RAID subsystem where the target data is resided according to the list. In step 904, the IO request is received by the VCSN agent of the target RAID subsystem. In step 905, the VCSN agent compares the VCSN carried by the IO request with the VCSN notified by the virtualization layer 202A to determine whether both of them are consistent. If they are consistent, the VCSN carried by the IO request is valid; otherwise it is invalid. In step 907, if the determination result of step 905 shows that the VCSN carried by the IO request is valid, the VCSN agent will transfer the IO request to the RAID layer. In step 908, after completing the IO request, the RAID layer responds to the host 110 through the VCSN agent. In step 906, if the determination result of step 905 shows that the VCSN carried by the IO request is invalid, the VCSN agent will reject the IO request and end the procedure.

In summary, the host agent 110 might have two ways to respond after its request for accessing data is rejected. The first response is that the host agent 110 inquires the virtualization layer 202A of the master subsystem again to obtain a correct VCSN, and sends a new IO request according to the correct VCSN to access data. That is, the procedures of FIG. 17 and FIG. 18 are performed again. The second response is that the host agent 110 gives up directly issuing IO requests to the subsystem where the ME(s) resides and turns to ask the virtualization layer 202A of the master subsystem 20A for assessing data.

It is worth to note that, the procedure for inquiring the VCSN shown in FIG. 17 may occur either before or after the IO request is issued, depending on when the host agent 110 has this demand. For example, if there is an IO request having accessed the data in the same data block in an earlier time, the host agent 110 should already have a previous record of the VCSN associated with the data block. In such a situation, the host agent 110 may directly issue an IO request to the target RAID subsystem according to the previous record, namely directly performing the procedure of FIG. 18, rather than performing the inquiring procedure of FIG. 17. If the VCSN carried by the IO request is invalid and consequently rejected, the host agent 110 may perform the inquiring procedure of FIG. 17 right away or perform it in a later time before issuing the next IO request.

Figure 19:
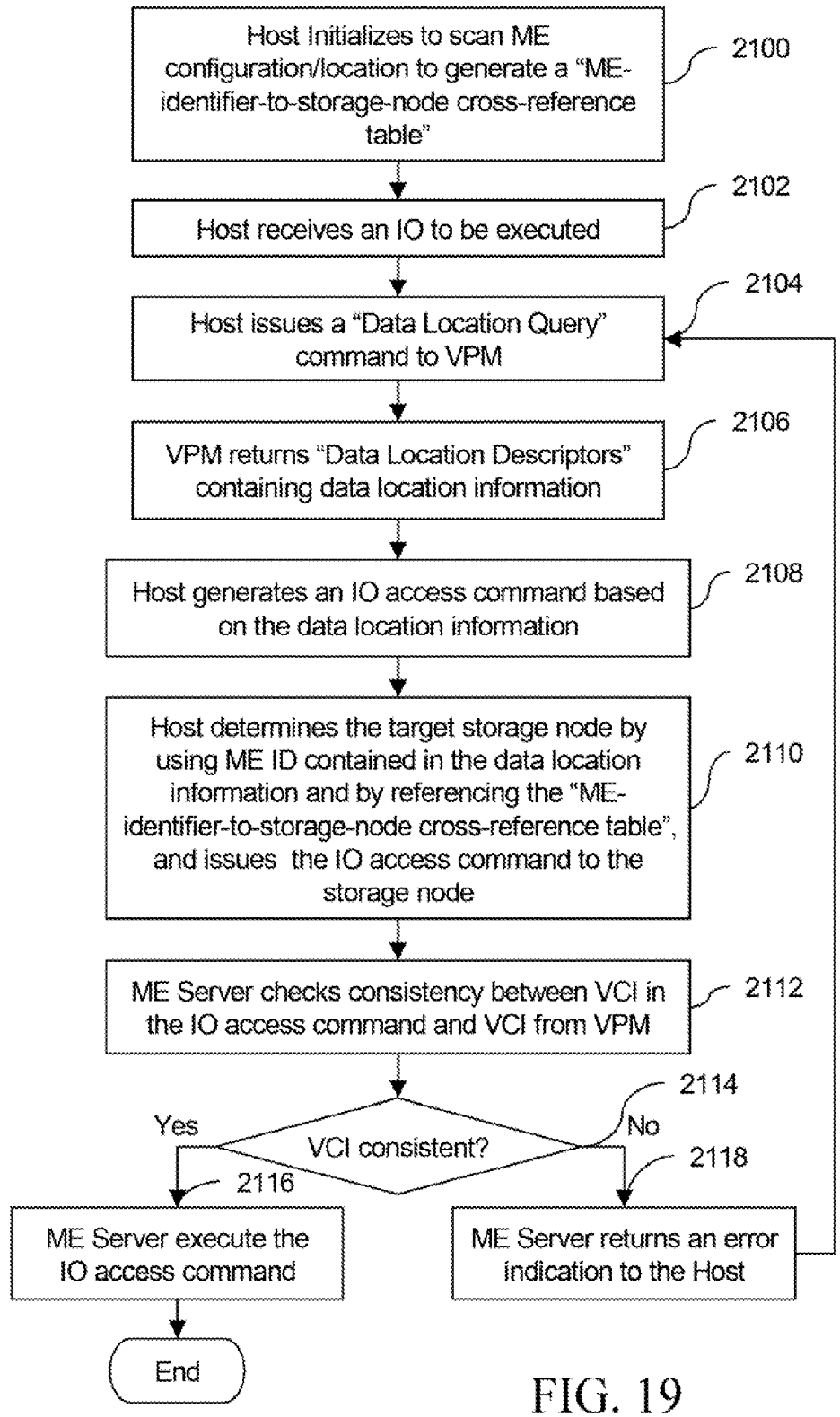
FIG. 19 is a flow chart that depicts a direct media extent (ME) access functionality of the storage system architecture according to an embodiment of the present invention.

Please refer to FIG. 19. FIG. 19 is a flow chart that depicts a direct media extent (ME) access functionality of the storage system architecture according to an embodiment of the present invention. Herein, the host processes the IO request accessing via a host agent. Therefore, the host agent scans the MEs first to obtain information about ME configuration/location, etc., related to the ME, and to generate a list to record ME attribute and the ME server on which the MEs reside, such as the ME-identifier-to-storage-node cross-reference table (step 2100). Then the host agent receives an IO request from the host (step 2102). Next, the host agent transmits a data location query command to a virtual pool master (VPM) to obtain a physical location of the data addressed in the data location query command (step 2104), wherein the data location query command comprises a command code, a virtual volume identifier/handle, a block range to be accessed (such as a base block address and a block count). After the VPM receives the data location query command, the VPM transmits a data location descriptor to the host agent, wherein the data location identifier comprises data location information (step 2106). Furthermore, the host agent generates an IO request according to the data location information (step 2108), wherein the IO request is also called the IO access command, as shown in FIG. 19. After the host agent determines the target storage node to be accessed by using the ME ID and the ME-identifier-to-storage-node cross-reference table, the host agent sends an IO request to the target storage node, wherein the ME ID is included in the data location information (step 2110). The ME server of the target storage node checks validity check information (VCI) in the IO request to determine whether it is consistent with a VCI from the virtual volume master (step 2112 and step 2114). If the VCI in the IO request is consistent with the VCI from the virtual volume master, the IO request is executed by the target storage node of the ME server (step 2116). If the VCI of the IO request is not consistent with the VCI from the virtual volume master, the ME server of the target storage node responds an error indication, and the host agent executes step 2104 again.

In this embodiment, although the host agent does not need to store the VCI from the virtual volume master, each time when the host agent sends an IO request, the host agent has to transmit the data location query command to the virtual volume master first, and then sends the IO request to the target ME.

Figure 20A:
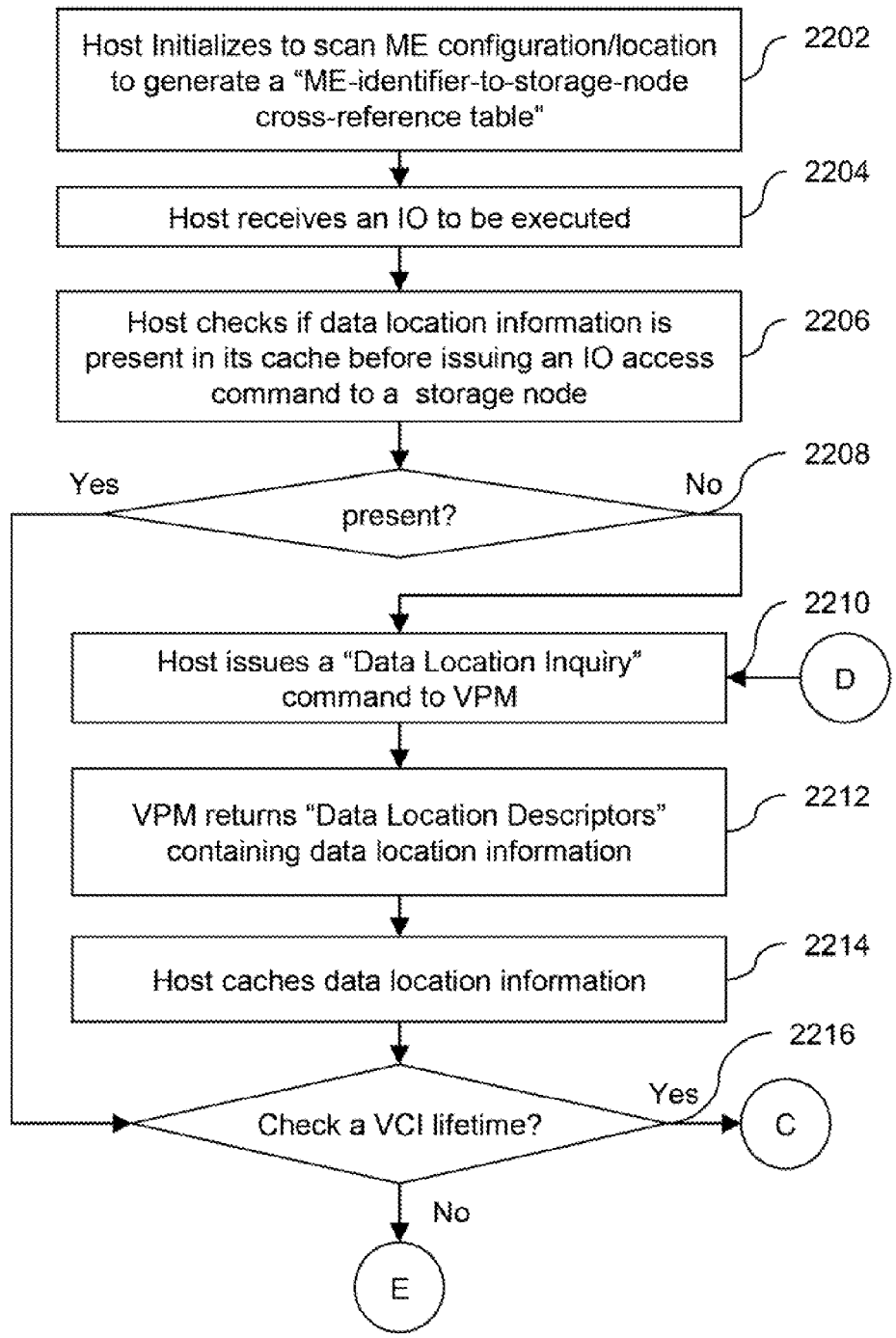
FIG. 20A and FIG. 20B are flow charts that depict a direct media extent (ME) access functionality of the storage system architecture according to another embodiment of the present invention.
Figure 20B:
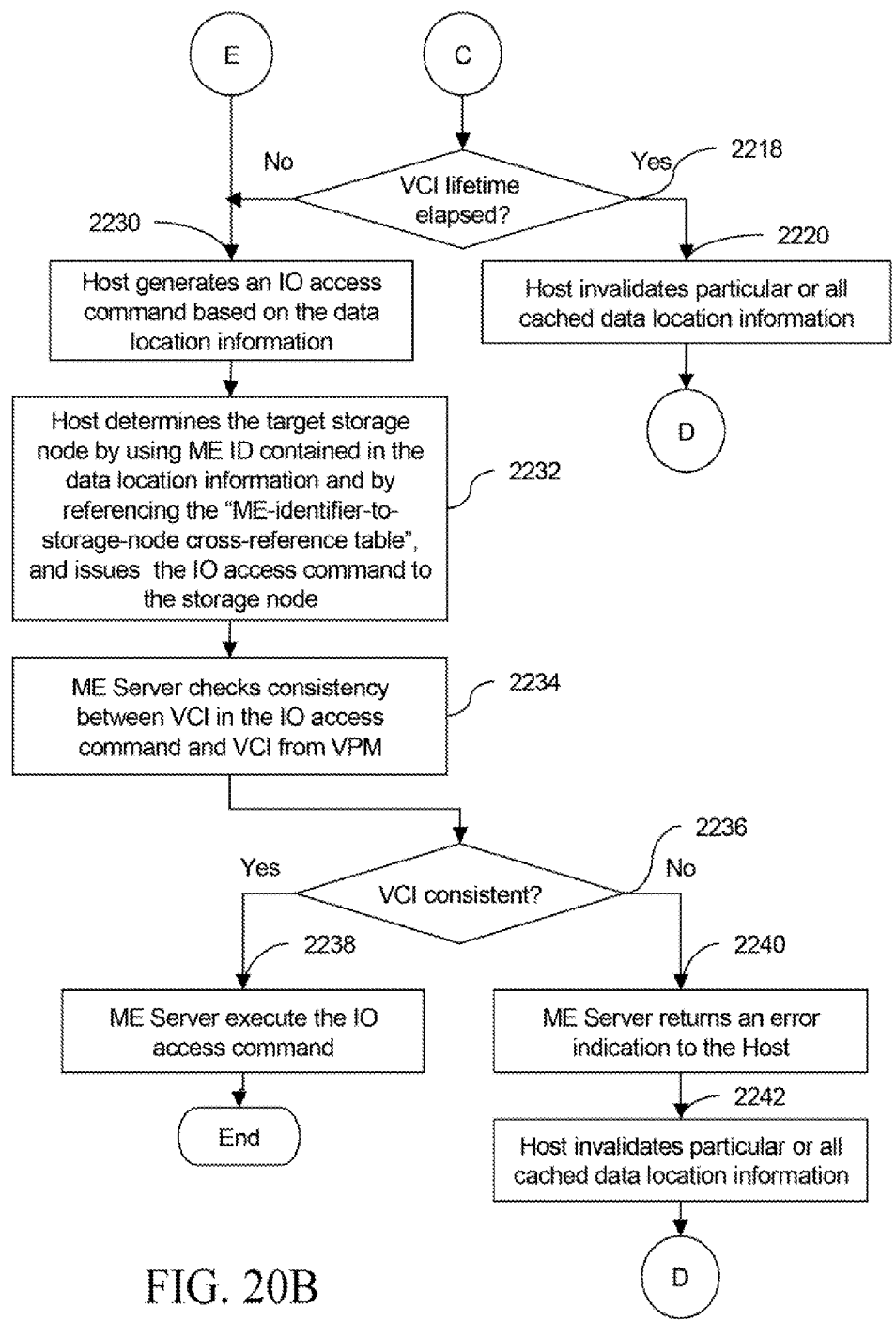

Please refer to FIG. 20A and FIG. 20B. FIG. 20A and FIG. 20B are flow charts that depict a direct media extent (ME) access functionality of the storage system architecture according to another embodiment of the present invention. Herein, the host agent scans the MEs first to obtain information about ME configuration/location, etc., related to the ME, and to generate a list to record ME attribute and the ME server on which the MEs reside, such as the ME-identifier-to-storage-node cross-reference table (step 2202). Then the host agent receives an IO request from the host (step 2204). Next, before sending an IO request to a storage node, the host agent checks whether data location information is in its cache (step 2206 and step 2208). If the data location information is not in the cache of the host agent, the host agent transmits a data location query command to a virtual pool master (VPM) to obtain a physical location of the data addressed in the data location query command (step 2210), wherein the data location query command comprises a command code, a virtual volume identifier/handle, a block range to be accessed (such as a base block address and a block count). After the VPM receives the data location query command, the VPM transmits a data location descriptor to the host agent, wherein the data location identifier comprises data location information (step 2212). Then the data location information is stored by the host agent in the cache of the host agent (step 2216) and whether or not the lifetime of the VCI is to check is determined. (step 2216). According to step 2206 and step 2208, if the data location information is stored in the cache of the host agent, the host agent determines whether the lifetime of the VCI is checked (step 2216).

If the lifetime of the VCI is determined not to be checked according to step 2216, the host agent generates an IO request according to the data location information (step 2230). After the host agent determines the target storage node to be accessed by using a ME ID and the ME-identifier-to-storage-node cross-reference table, the host agent sends an IO request to the target storage node, wherein the ME ID is included in the data location information (step 2232). The ME server of the target storage node checks validity check information (VCI) in the IO request to determine whether it is consistent with a VCI from the virtual volume master (step 2234 and step 2236).

If the VCI of the IO request is consistent with the VCI from the virtual volume master, the IO request is executed by the ME server of the target storage node (step 2238). If the VCI of the IO request is not consistent with the VCI from the virtual volume master, the ME server of the target storage node responds an error indication to the host agent (step 2240). Then the host agent invalids particular data location information or all data location information in its cache, (step 2242), and step 2210 is executed again.

When the lifetime of the VCI is determined to be checked, in step 2216, the host agent determines whether a valid lifetime of the data location information has elapsed (step 2218). If the valid lifetime has elapsed, the host agent invalids particular data location information or all data location information in its cache (step 2220), and step 2210 is executed again. If the valid lifetime of the data location information has not elapsed, step 2230 is executed.

In this embodiment, the VCI from the virtual volume master is stored in a storage device by the host agent, such as a cache memory. The data location information of the IO request that has been stored in the storage device is checked first each time when the IO request is to be sent to the target ME. When the data location information has been stored in the storage device, the IO request is sent to the target ME directly without sending a data location query command to the virtual volume master.

Herein, the check of the VCI for the aforementioned embodiments (i.e., steps 2112 and 2114) will be described in detail as below. In an embodiment with the check of the VCI of present invention, the target storage node further comprises a validity check unit which is configured to execute the following steps to check the validity of each IO request from the host agent.

Firstly, after the validity check unit receives an IO request from the host agent, a ME server associated with the to-be-accessed ME will be selected, wherein the IO request comprises a VCI and the VCI further comprises a VCSN. Each ME server comprises one or more list for recording the sections of the ME and the corresponding VCSN.

Then, the validity check unit retrieves the latest VCSN from the one or more VCSNs in the VCSN recording list of the ME associated with the IO request, and compares the latest VCSN with the VCSN in the IO request. If the validity check sequence number of the IO request is larger than the latest validity check sequence number, the validity check unit does not regard the IO request as a valid IO request and then the aforementioned step 2118 is executed. If the validity check sequence number of the IO request is not larger than (i.e., equal to or less than) the latest validity check sequence number, the validity check unit retrieves a validity check sequence number for the address to be accessed by the IO request (called "the validity check sequence number for the corresponding address" hereafter). Then the validity check sequence number in the IO request is compared with the validity check sequence number for the corresponding address.

If the validity check sequence number for the corresponding address is larger than the validity check sequence number in the IO request, the validity check unit does not regard the IO request as a valid IO request and then the aforementioned step 2118 is executed. If the validity check sequence number of the corresponding address is not larger than the validity check sequence number in the IO request, the validity check unit regards the IO request as a valid IO request and then the aforementioned step 2116 is executed.

Steps 2112, 2114, 2116, and 2118 in this embodiment have been explained earlier with FIG. 19, and therefore will not be described herein.

Under the condition that the host agent is provided, as in the above case, when the host issues the data location query command to obtain the data location information, the master subsystem uses the host LBA in the data location query command to obtain the data location information using the methods shown in FIGS. 8A and 8C.

Although each of the aforementioned embodiments is illustrated with the RAID subsystem, in accordance with an embodiment of the present invention, the RAID subsystem is also replaced by the disk array subsystem without RAID function. In such an embodiment, the physical volume is formed by mapping directly, via the storage virtualization controller 200, from the disk array subsystem without the RAID function.

Detailed Explanation to an Embodiment of the Direct ME Access Functionality

One way of overcoming the performance bottleneck of some traditional storage system architecture is to have the host (including a host agent situated therein, the same hereinafter) issue IOs directly to the storage node to whom the ME in which the data resides belongs, hereafter referred to as "Direct ME Access" functionality, rather than indirectly through a virtual volume master. The storage node that is serving as the virtual pool master (abbreviated VPM) is the aforesaid storage virtualization controller 200 in which the virtualization layer 202 is provided.

In order to implement "Direct ME Access" functionality, the host must first take an inventory of MEs to determine their attributes and find out under which ME Server they reside. This is typically done by a scan operation which collects information relating to ME configuration/location. In a system in which ME configuration/location is fixed, the host need only scan for ME configuration/location once during initialization. However, in systems in which ME configuration/location might dynamically change, as when ownership of an ME may change from one storage node to another, a mechanism is required to inform the host that a change has occurred so that the host can rescan. Simply returning an error condition in response to the first command received from a host following the change (e.g., a "Unit Attention"), may not be sufficient to keep IO access commands that were generated based on the state prior to change from being executed, as concurrently issued IO access commands might already in route to the ME server (containing the functionality of a VCSN agent in the present embodiment, the same hereinafter) by the time the host receives the error notification. Rather, it is preferable to have the ME server reject all IO access commands until it receives acknowledgement of the state change from the host.

One such mechanism consists of having the host request access permissions to an ME before it can issue any IO access commands targeting the ME. If a change in ME configuration/location occurs, access permissions are cleared for all hosts, which would result in all IO access commands targeting the particular ME to be failed with "Access Permissions Not Requested" error information. On detection of this error condition, a host would clear all state information associated with the particular ME, including not only ME configuration/location information but also all data location information associated with the ME that the host may have cached. The host would then rescan to obtain updated ME information and re-request access permissions from the new ME server managing the ME, after which IO access commands could be re-issued to the new ME server.

Detailed Explanation to an embodiment of the Host and ME Server Validity Check Processing and Information Caching.

"Direct ME Access" functionality requires the implementation of a protocol by which the host can determine the current location of the data that is the target of an IO access command. This protocol, referred to as "Data Location Query" protocol, involves issuing a query command (i.e., "Data Location Query Command"), consisting of an command code, virtual volume identifier or handle and block range to be accessed (base block address and block count), from the host to the "Virtual Pool Master" (abbreviated VP Master or VPM) for the physical location of the addressed data range, returned in the form of a set of "Data Location Descriptors" covering the entire range, each such descriptor consisting of a ME identifier, base block address, block count and validity check information (VCI). The host maintains a ME-identifier-to-storage-node cross-reference table that allows it to determine through which storage node an ME identified in a "Data Location Descriptor" can be accessed. On receipt of the set of "Data Location Descriptors" returned in response to the "Data Location Query" command, the host then issues one or more IOs, typically one per "Data Location Descriptor", to storage nodes that it has identified by cross-referencing ME identifiers contained in the "Data Location Descriptors" against storage node identifiers via the ME-identifier-to-storage-node cross-reference table. If a set of descriptors identify the same ME and the block ranges encompassed by the descriptors are contiguous, then rather than issuing one IO per descriptor, a single IO can be used to access all the data covered by the set of descriptors, thereby reducing the overhead involved in accessing the data.

The validity check information in the "Data Location Descriptor" serves to allow the "Media Extent Server" (abbreviated ME Server) to determine if the data location information (ME identifier, block range) contained in the IO access command that the host generates based on the information in the "Data Location Descriptors" returned by the VPM is up-to-date. It is possible that the location of data, due to operations such as data location migration, may change between the time when the VPM returns data location information to the host in response to a "Data Location Query" and the time when the IO access command is received by the ME Server. If, in such a situation, the IO is actually executed by the ME Server, data corruption could occur for the location accessed by the IO access command is different from the actual location of the data that the host intended to access. While this kind of occurrence is far more likely to be encountered if the host caches data location information in an effort to reduce the number of "Data Location Query" commands it issues to the VPM, it is still possible that it could happen even if the host generates and issues IO access commands associated with the results of a "Data Location Query" command immediately upon receipt of the data location information.

"Validity Check Information" typically includes a validity check sequence number (abbreviated VCSN) associated with the ME that is a member of a virtual pool. This sequence number is incremented by one by the VPM each time the actual location of any data in the ME is changed or there is a change in the data or a change in the state of a virtual volume in the VPM or the operational state of the virtual pool itself that requires that the host re-query the VPM before executing an IO access command accessing the data or volume. If it is possible that the VCSN could wrap around such that the same VCSN value could occur after incrementing enough times, the VPM can implement a VCI lifetime that the host monitors. If a time greater than the lifetime of a VCI has elapsed between when the host issues the "Data Location Query" command that returned the VCI and the current time, the host proactively invalidates the VCI and re-queries the VPM for up-to-date VCI associated with the desired data range. This lifetime information could either be a pre-defined value, queried by the host from the VPM via a separate command or set of commands, or returned in the VCI returned in the "Data Location Descriptor" itself.

"Direct ME access" functionality, in its simplest implementation, requires a minimum of two commands to be issued to the storage node group for each IO access to be performed. The first is a data location query command that is issued to the storage node that is serving as the VPM to determine on which media extent the data resides. Then a set of one or more actual IO access command are issued to the storage node that is serving as the particular ME Server. While typically the actual IO access commands will be distributed over several storage nodes in the storage node group, the data location query commands must all be issued to the VPM. The result is that the VPM may end up being a performance bottleneck if its ability to process data location query commands is taxed to the limit.

In order to reduce the number of data location query commands that must be issued thereby reducing the load on the VPM, the host can cache the results of data location query commands for possible later reference. In this case, the host would first look in its cache of data location information to see if data location information corresponding to the block address range being accessed by the IO to be issued is present. If it is, the host needn't issue a data location query command to the VPM for the information needed to determine the location of the data is already on hand. In this case, the host would directly generate one or more IO access commands based on the cached information and issue them directly to the respective storage subsystems in which the respective ME Servers reside.

If an ME Server detects an inconsistency in the information in the IO access command relative to the information it has received from the VPM, it will return an error indication to the host. Based on the error information, the host may invalidate the particular information in its data location information cache associated with the block address that resulted in the error return, or it may invalidate all the information in the cache, independent of the block address. In either case, the host must then issue a data location query command to the VPM to obtain the most up-to-date data location information, which it can then enter into its cache, and then issue one or more IO access commands based on this updated information to the respective ME servers.

Typically, when a information inconsistency is detected between the validity check information (abbreviated VCI) contained in the IO access command and the VCI received from the VPM the ME Server will return error information that indicates that it is only necessary for the host to invalidate cached data location information associated with one or more block addresses contained in the IO access command. This would be the case if, for instance, between the time when the host obtained the data location information from the VPM and the time the IO access command was issued the location of some of the data addressed by the IO access command was changed (e.g., due to a migration operation).

However, there are instances in which the invalidation of an entire set of cached data location information may be indicated. If, for example, the ME Server is unable to determine if the VCI contained in the IO access command is valid or not because it no longer has a record of that particular VCI, it may return error information to the host indicating that all cached data information whose VCI data matches the particular VCI that resulted in the error condition should be invalidated. In another scenario, if a VPM is reset or power-cycled, it may lose all record of previous VCIs that it generated before. In this case, it would be necessary for it to inform all ME Servers that all VCI previously obtained from VPM is to be invalidated and that any attempt to issue an IO access command by a host should be rejected until the host has performed a procedure that includes invalidating any cached data location information.

In addition to invalidating related data location information that it has cached on receipt of an error indication from the ME Server, the host will typically re-issue a data location query command to the VPM to obtain the most up-to-date data location information associated with the block address range covered by the IO access command. If the VCSN in the VCI in any of the data location descriptors returned is the same as a VCSN in a VCI that generated an error return on the part of the ME Server, since the host knows that the ME server does not consider that VCSN to be valid, it can issue an indication to the VPM that it may have discovered an inconsistency between the VPM and the ME Server with regard to the particular block address range. On receipt of this indication, the VPM would typically engage a re-synchronization procedure with the ME Server. One possible embodiment of this procedure might consist of issuing a command to the ME Server to purge its VCI cache and, either in the same command or in a follow-on command, set the newest VCI containing the most up-to-date VCSN to the ME Server to allow it to refresh its cache.

The above-mentioned re-synchronization procedure, referred to as "Validity Check Information Re-synchronization Procedure" would also typically be engaged any time the VPM suspects that the ME Server's VCI cache may not be in sync with its own information. For example, when the VPM is powered on, reset or power cycled, because it is unaware of the current state of the ME Servers that have exported media extents for its management, it would typically engage this re-synchronization procedure to insure that the ME Server's VCI is reset back to the same initial state that it is in on the VPM. A failover from the primary controller in a redundant controller pair that forms a VPM to the secondary controller might also engage this re-synchronization procedure for the same reasons.

It is important that the ME server clear access permissions for all hosts for the targeted ME as part of the "Validity Check Information Re-synchronization Procedure" and that, on detection of "Access Permissions Not Requested" error condition, the host purge all cached data location information associated with the particular ME. This is necessary to cover, among others, the case in which the VPM changes from one storage node to another, as might happen in a redundant controller storage subsystem when the controller that is serving as the VPM fails resulting in the alternate controller taking over its role. Since the alternate controller may not have any record of the VCI state associated with the particular ME, it might have to start updating the ME VCI from VCI initial state. During the Virtual Pool initialization process, the new VPM will engage the above-mentioned re-synchronization procedure with the ME Server associated with the particular ME to insure that the VCI cache on the ME Server is in sync with the VCI on the new VPM. However, if the host continues to issue IO access commands that contain VCI which was obtained from the original VPM, it is possible that the information may appear valid to the ME Server and therefore the IO access command may inadvertently be accepted even though the data location information that was used to generate the IO access command may already be out-of-date. To avoid this situation that could potentially result in catastrophic data corruption, the ME Server can clear access permissions for all hosts for the particular ME as part of the "Validity Check Information Re-synchronization Procedure" and, on detection of the "Access Permissions Not Requested" error condition that would be posted on receipt of any IO access command from a host targeting the particular ME, the host purge all cached data location information associated with the ME and re-issue data location query commands to the VPM prior to re-issuing any IO access commands targeting the ME. This would insure that, following the transfer of VPM role from one storage node to another, IO access commands are re-issued to the ME server based on up-to-date data location information.

To simplify implementation, the VPM typically would always return the current value of the VCSN in the VCI returned in the "Data Location Descriptor" rather than the value of the VCSN when the particular address block range was last subject to change. When the VPM increments the VCSN due to a change associated with a particular block range, it sends updated VCI for the block range to the ME Server of the ME in which the block range resides. The ME server makes a record of the updated VCI for the block range. On receipt of an IO access command from a host, the ME Server compares the VCI in the command against the VCI information it has on record. The VCSN in the VCI contained in the IO access command is compared against the latest VCSN received from the VPM. If it is greater than that VCSN, then it is beyond valid range and the IO access command is rejected. If it is less than or equal to that VCSN, then it is considered within valid range and it is then compared against the VCSN recorded on the ME Server for the particular block range. If it is less than that VCSN, then the block range was subject to change sometime after the host obtained the VCI from the VPM, making the VCI invalid, so the IO access command is rejected. If, on the other hand, it is greater than or equal to that VCSN, then the VCI in the IO access command must have been obtained sometime after the last time the block range was subject to change, which implies that the VCI is valid and the IO access command can be accepted and processed normally.

Typically, because of resource limitations, an ME Server will only be able to keep track of a limited set of VCI received from the VPM. Because of this, an ME Server may implement a caching mechanism to try and maximize the likelihood that it will be able to accurately determine the validity of an IO access command received from the host. One such caching mechanism is simply to keep a record of the VCI most recently received from the VPM. If on receipt of new information, there are insufficient resources to store the new information, then the oldest information currently stored is purged from the cache to make room for the new information. Since the Validity Check Sequence Numbers (abbreviated VCSN) contained within the VCI received from the VPM increments sequentially, the VCI stored in such a cache would include all VCSNs in a particular range. As such, in checking the VCI contained in host IO access commands, only three scenarios would have to be dealt with, namely, the VCSN in the IO access command VCI is either less than the smallest VCSN contained in the ME Server VCI cache, greater than the smallest but less than the largest VCSN in the ME Server VCI cache or it is greater than the largest VCSN in the ME Server VCI cache.

If the VCSN in the IO access command VCI is greater than the smallest VCSN but less than the largest VCSN contained in the ME Server VCI cache then the ME Server checks to see if the block addresses covered by the IO access command are represented in the VCI cache. If they all are and the associated recorded VCSNs are all either less than or equal to the corresponding VCSN in the VCI contained in the IO access command, then the IO access command is considered to be valid and is accepted. If, however, any of the block addresses covered by the IO access command are not represented in the ME Server VCI cache, or the recorded VCSN in the ME Server VCI cache associated with any of the block addresses covered by the IO access command is greater than the corresponding VCSN in the VCI contained in the IO access command, then the particular VCI is determined to be stale or invalid. In such a case, the ME Server would typically return "Invalid Validity Check Information" error information indicating that the data location information associated with the particular block address is invalid and therefore the host need only invalidate that particular information.

Note that there may be multiple sets of VCI for a particular block range in the ME Server VCI cache. This is because the block range may have had its location changed more than once. Therefore, in performing the above check, when there are multiple sets of VCI corresponding to an addressed block range in the ME Server VCI cache, the VCSN in the VCI contained in the IO access command is compared against the matching ME Server VCI cache entry whose VCSN value is the greatest. In an effort to optimize resource utilization, the ME server may invalidate and re-use ME Server VCI cache entries that have a block range that is covered by other cache entries whose VCSNs are greater in value than the subject cache entry. As a result of this reclamation functionality, there may be some VCSN values between the smallest value and the largest in the ME Server VCI cache that are not represented by any entries in the cache.

If any VCSN associated with any block address in the IO access command VCI is less than the smallest VCSN contained in the ME server VCI cache, then the ME server is unable to determine the validity of the VCI in the IO access command, and so it would typically return "Validity Check Information validity undetermined" error information indicating that all cached data location information that have an associated VCSN equal to the VCSN in question should be invalidated.

If any VCSN associated with any block address in the IO access command VCI is greater than the largest VCSN contained in the ME server VCI cache, then the ME Server would typically return "Validity Check Information out-of-range" error information indicating that all cached data location information should be invalidated for there is a serious inconsistency between the host and the ME Server that may indicate a serious lack of synchronization between the host and the storage subsystems.

In one or both of the latter two scenarios, in an effort to reduce the number of cases that the host must handle and thereby simplify the implementation, the ME Server may elect to simply return "Invalid Validity Check Information" error information indicating that the data location information associated with the particular block address is invalid. Alternately, the host could simply not distinguish between different error conditions and only invalidate the data location information associated with the particular block address, independent of the error information returned by the ME Server. Yet another possible implementation in the second scenario is for the ME Server to return "Validity Check Information Out-of-Range" error information indicating that all cached data location information independent of associated VCSN should be invalidated or the host to invalidate all cache data location information on receipt of the "Validity Check Information Validity Undetermined" error information from the ME Server.

Detailed Explanation to an Embodiment of the Data Distribution Across Media Extents When the host issues an IO access command to write data into a virtual volume and no physical block has yet been assigned to accommodate that data range, the VPM must allocate physical blocks on one or more of the MEs that make up the virtual pool. Probably the simplest allocation scheme is to allocate blocks first from one ME, then when that ME is full, start allocating from a second ME, etc. From a performance perspective, however, it is beneficial to have the data accessed by IO access commands distributed over multiple MEs to distribute the load over multiple ME servers and MEs. A virtual pool or virtual volume that is characterized by data being distributed over multiple ME servers and/or MEs hereafter is said to have an attribute referred to as "Distributed Data".

Typically, when a virtual pool or virtual volume has an attribute of "Distributed Data", the VPM will allocate physical space to the virtual volume being written to accommodate data in such a way as to evenly distribute data over all the MEs and/or ME servers in the virtual pool. In most circumstances, the more evenly the data is distributed, the more evenly the load is distributed across MEs and/or ME servers and, therefore, the better the performance.

One data distribution scheme that is both simple and results in IO access distribution that is reasonably even under most IO load conditions is the simple striping of data across the MEs, hereafter referred to as "Striped Data Distribution". Virtual volume addressable space is divided into fixed length blocks, with the first block residing on the first ME, the second on the second ME, etc until the last ME is reached, at which point the next block is located back on the first ME, block after that on the second ME, etc. Under this kind of a distribution, IO access commands that access ranges are smaller than a block size will either only access data on one ME or at most two MEs (if the data range happens to overlap two blocks). Under these conditions, with multiple concurrent independent IO access loads, all MEs in the pool would be accessed approximately evenly, enhancing performance as described above. For IO access commands that each access a large data range that overlaps many blocks, each such command would result in concurrent accesses to multiple MEs which would reduce the time needed to complete the command by virtue of the concurrency of the access and data transfer, thereby resulting in improved performance.

Implementation of "Striped Data Distribution" requires that data be migrated when a new ME is added to a virtual pool so as to distribute some of the data onto the new ME. This migration may not only require moving data from existing MEs onto the new ME, but may also require redistribution of data over existing MEs so as to maintain the striped character of the data distribution over all the MEs in the pool. Therefore, "Striped Data Distribution" implementations not only require that data be migrated when member MEs are removed from a virtual pool but also when new MEs are added to a virtual pool.

What is claimed is:

1. A method for accessing data in a storage system architecture, the storage system architecture comprising a host and a plurality of storage nodes, the method comprising:
   checking whether or not a data location information of a to-be-issued IO access command is in a cache memory of the host, wherein the data location information comprises a first validity check information;
   sending, by the host, the IO access command to a target storage node of the storage nodes according to the data location information when the data location information is in the cache memory, wherein the IO access command comprises the first validity check information;
   checking, by the target storage node, the validity of the IO access command according to the first validity check information; and
   executing, by the target storage node, the IO access command when the IO access command is valid.

2. The method of claim 1, further comprising:
   providing a validity check sequence number agent in the target storage node for checking the validity of the first validity check information of the IO access command.

3. The method of claim 1, further comprising:
   generating, by the host, a data location query command to a master storage node of the storage nodes when the data location information is not in the cache memory;
   returning, by the master storage node, the data location information to the host according to the data location query command;
   updating, by the host, the data location information in the cache memory; and
   sending, by the host, an IO access command to the target storage node of the storage nodes according to the data location information, wherein the IO access command comprises the first validity check information.

4. The method of claim 1, further comprising:
   returning, by the target storage node, an error indication to the host when the IO access command is not valid.

5. The method of claim 1, further comprising:
   generating a media-extent-identifier-to-storage-node cross-reference table by scanning the storage space of the storage nodes when the host is initialized; and
   determining the target storage node according to a media extent ID and the media-extent-identifier-to-storage-node cross-reference table;
   wherein the data location information comprises the media extent ID.

6. The method of claim 1 or claim 3, wherein the step of checking the validity of the IO access command comprises:
   checking, by the target storage node, the consistency between the first validity check information of the IO access command and a second validity check information from the master storage node.

7. The method of claim 6, further comprising:
returning an error indication to the host when the first validity check information is inconsistent with the second validity check information.

8. The method of claim 1 or claim 3, further comprising:
checking, by the target storage node, a life of the first validity check information of the IO access command.

9. The method of claim 8, further comprising:
invalidating, by the host, all data location information or the data location information in the cache memory of the host when the life of the first validity check information exceeds a valid lifetime;
generating, by the host, a data location query command to the master storage node of the storage nodes; and
returning, by the master storage node, the data location information to the host according to the data location query command.

10. A method for accessing data in a storage system architecture, the storage system architecture comprising a host and a plurality of storage nodes, the method comprising:
sending, by the host, a data location query command to a master storage node of the storage nodes;
sending, by the master storage node, a data location information to the host when the master storage node receives the data location query command, wherein the data location information comprises a first validity check information (VCI);
sending, by the host, an IO access command to a target storage node of the storage nodes according to the data location information, wherein the IO access command comprises the first validity check information;
checking, by the target storage node, the validity of the IO access command according to the first validity check information; and
executing, by the target storage node, the IO access command when the IO access command is valid.

11. The method of claim 10, further comprising:
providing a validity check sequence number agent in the target storage node for checking the validity of the first validity check information of the IO access command.

12. The method of claim 10, further comprising:
sending, by the target storage node, an error indication to the host when the IO access command is not valid.

13. The method of claim 10, further comprising:
generating a media-extent-identifier-to-storage-node cross-reference table by scanning a storage space of the storage nodes when the host is initialized.

14. The method of claim 13, further comprising
determining the target storage node according to a media extent ID and the media-extent-identifier-to-storage-node cross-reference table, wherein the data location information comprises the media extent ID.

15. The method of claim 10, further comprising:
comparing, by the target storage node, the first validity check information of the IO access command with a second validity check information from the master storage node.

16. The method of claim 15, wherein the step of comparing the first validity check information with the second validity check information comprises:
determining the IO access command is valid when the first validity check information is consistent with the second validity check information.

17. The method of claim 15, wherein the step of comparing the first validity check information with the second validity check information comprises:
determining the IO access command is not valid when the first validity check information is inconsistent with the second validity check information.

18. The method of claim 1 or claim 10, further comprising:
checking, by the target storage node, the validity of the IO access command according to the first validity check information to determine the correctness of the address of the IO access command.

19. The method of claim 1 or claim 10, further comprising:
providing a physical-to-virtual table (P2V table) or a virtual-to-physical table (V2P table) in the storage system architecture for assisting IO access command handling.

* * * * *